(12) United States Patent
Basin

(10) Patent No.: US 11,070,535 B2
(45) Date of Patent: *Jul. 20, 2021

(54) SYSTEMS AND METHODS FOR SMARTKEY INFORMATION MANAGEMENT

(71) Applicant: PKWARE, INC., Milwaukee, WI (US)

(72) Inventor: Yuri Basin, Thiensville, WI (US)

(73) Assignee: PKWARE, INC., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,025

(22) Filed: Mar. 16, 2020

(65) Prior Publication Data

US 2020/0274858 A1 Aug. 27, 2020

Related U.S. Application Data

(63) Continuation of application No. 16/400,731, filed on May 1, 2019, now Pat. No. 10,630,658, which is a continuation of application No. 15/997,197, filed on Jun. 4, 2018, now Pat. No. 10,326,745, which is a continuation of application No. 15/295,883, filed on Oct. 17, 2016, now Pat. No. 10,015,150.

(60) Provisional application No. 62/242,071, filed on Oct. 15, 2015.

(51) Int. Cl.
| H04L 29/06 | (2006.01) |
| H04L 9/14 | (2006.01) |
| H04L 9/30 | (2006.01) |
| H04L 9/08 | (2006.01) |
| H04L 9/06 | (2006.01) |
| H04L 9/32 | (2006.01) |

(52) U.S. Cl.
CPC ............ *H04L 63/06* (2013.01); *H04L 9/0637* (2013.01); *H04L 9/0643* (2013.01); *H04L 9/083* (2013.01); *H04L 9/0822* (2013.01); *H04L 9/0825* (2013.01); *H04L 9/0863* (2013.01); *H04L 9/0894* (2013.01); *H04L 9/0897* (2013.01); *H04L 9/14* (2013.01); *H04L 9/302* (2013.01); *H04L 9/3226* (2013.01); *H04L 9/3239* (2013.01); *H04L 9/3242* (2013.01); *H04L 9/3247* (2013.01); *H04L 9/3263* (2013.01); *H04L 63/08* (2013.01)

(58) Field of Classification Search
CPC ....... H04L 63/06; H04L 9/0825; H04L 9/083; H04L 9/0894; H04L 9/0897; H04L 9/3247; H04L 9/3263; H04L 9/14; H04L 9/302; H04L 9/0863; H04L 9/0637; H04L 9/0643; H04L 9/3226; H04L 9/3239; H04L 9/3242; H04L 9/0822; H04L 63/08
See application file for complete search history.

(56) References Cited

U.S. PATENT DOCUMENTS

| 2012/0072723 A1* | 3/2012 | Orsini | H04L 63/10 713/165 |
| 2014/0058951 A1* | 2/2014 | Kuppuswamy | G06F 21/6245 705/67 |
| 2014/0281531 A1* | 9/2014 | Phegade | H04L 9/0825 713/168 |

* cited by examiner

*Primary Examiner* — Abiy Getachew
(74) *Attorney, Agent, or Firm* — Barich IP Law Group

(57) ABSTRACT

A system and method are provided for the secure sharing of information across and open network and for performing management of keys used for encrypting and decrypting data.

3 Claims, 24 Drawing Sheets

Derive sproxy data = encrypted sinfo

Derive shash data

SID with private key and URN(shash-private key locator)

SID with private key

Creating encrypted information using .ZIP encrypted file format

Creating encrypted information using OpenPGP encrypted file format

Key Provider Record (byte/binary format):

Key Provider Record Layout (character format):

Sample .ZIP file view of Key Provider Record in Central Directory Header

Sample .ZIP file view of Key Provider Record in Local Directory Header

Sample .ZIP file view of Key Provider Record in file listing

| | | | | | | | | | | | | | | | | | | | | | | | | | | | | | | | | | 2310 |
|---|---|---|---|---|---|---|---|---|---|---|---|---|---|---|---|---|---|---|---|---|---|---|---|---|---|---|---|---|---|---|---|---|---|
| | | | | | | | | | | | | | | | | | | | | | | | | " | s | v | | | | | | | |
| | | | | | | | | | | | | | | | | | | | | | | | | - | s | U | | | | | | | |
| | | | | | | | | | | | | | | | | | | | | | | | | t | 9 | x | | | | | | | |
| | | | | | | | | | | | | | | | | | | | | | | | | p | 6 | 3 | | | | | | | |
| | | | | | | | | | | | | | | | | | | | | | | | | y | b | 1 | | | | | | | |
| | | | | | | | | | | | | | | | | | | | | | | | | r | 5 | c | | | | | | | |
| | | | | | | | | | | | | | | | | | | | | | | | | c | 0 | 6 | | | | | | | |
| | | | | | | | | | | | | | | | | | | | | | | | | t | 4 | 6 | | | | | | | |
| | | | | | | | | | | | | | | | | | | | | | | | | r | 3 | x | | | | | | | |
| | | | | | | | | | | | | | | | | | | | 2300 | | | | | a | 0 | | | | | | | | |
| | | | | | | | | | | | | | | | | | | | | | | | | m | 5 | | | | | | | | |
| | | | | | | | | | | | | | | | | | | | | | | | | s | d | | | | | | | | |
| U | m | H | z | 6 | H | x | C | W | 9 | x | U | S | l | y | E | J | O | u | 3 | P | Q | 4 | J | l | k | = | "

```
22 00 0A 01 00 7B 22 61 73 73 65 74 73 22 3A 5B
7B 22 73 6D 61 72 74 63 72 79 70 74 2D 73 76 53
61 4A 48 76 79 48 7A 69 4D 34 32 47 7A 56 33 4C
48 4F 6A 6E 6B 61 36 4B 68 4C 73 52 73 2D 70 55
6D 48 7A 36 48 78 43 57 39 78 55 53 49 79 45 4A
4F 75 33 50 51 34 4A 49 6B 3D 3A 31 22 3A 22 56
37 2D 34 36 32 30 34 64 35 62 64 30 35 30 33 34
35 30 35 62 36 33 31 62 38 63 61 36 62 38 32 37
37 64 37 36 34 62 31 65 64 63 63 33 37 62 33 32
39 61 65 35 32 31 36 30 62 39 33 64 30 38 39 36
39 34 63 65 33 33 39 63 62 62 32 32 62 65 35 35
30 35 30 30 38 35 62 34 36 30 31 32 31 33 37 32
64 38 38 31 66 32 34 64 35 33 37 33 31 36 36 63
37 62 62 64 32 62 36 30 63 32 35 36 66 65 61 65
34 38 22 7D 5D 2C 22 6F 77 6E 65 72 22 3A 22 70
55 6D 48 7A 36 48 78 43 57 39 78 55 53 49 79 45
4A 4F 75 33 50 51 34 4A 49 6B 3D 22 7D 0A
```

Sample key provider Record for Key Provider (binary)

FIG. 24

Encryption Device System Components

Creating a key

Encrypting/Decrypting a file

Key Provider System Components

SYSTEMS AND METHODS FOR SMARTKEY INFORMATION MANAGEMENT

CROSS-REFERENCE TO RELATED APPLICATIONS

This application is a continuation of U.S. patent application Ser. No. 16/400,731, filed May 1, 2019, entitled "Systems and Methods for Smartkey Information Management," which is a continuation of U.S. patent application Ser. No. 15/997,197, filed Jun. 4, 2018, entitled "Systems and Methods for Smartkey Information Management," now U.S. Pat. No. 10,326,745, which is a continuation of U.S. patent application Ser. No. 15/295,883, filed Oct. 17, 2016, entitled "Systems and Methods for Smartkey Information Management", now U.S. Pat. No. 10,015,150, which claims the benefit of U.S. Provisional Application No. 62/242,071, filed Oct. 15, 2015, entitled "Computerized Multiple Key Provider Encryption System", which are hereby incorporated by reference in their entirety.

BACKGROUND OF THE INVENTION

The present invention generally relates to computerized data security and encryption key management systems and methods. More particularly, the present invention relates to such systems and methods operating over private or public open networks.

The "cloud" is a new model for distributed computing. The National Institute of Standards and Technology (NIST) defines "cloud computing" in the document titled "The NIST Definition of Cloud Computing" (NIST Special Publication 800-145, September, 2011) as "a model for enabling ubiquitous, convenient, on-demand network access to a shared pool of configurable computing resources (e.g., networks, servers, storage, applications and services) that may be rapidly provisioned and released with minimal management effort or service provider interaction".

Increasingly, electronic information that has been previously stored or transmitted on private local or network connected computing systems is moving to "cloud" storage and transmission systems. In addition to this movement of existing information to the cloud, users are creating vast amounts of new information placed directly into cloud storage. These cloud storage systems include information storage that is provided by service or storage providers that provide a method of folder replication such as Dropbox, Box, SugarSync, Google Drive, nCrypted Cloud, and the Microsoft Onedrive service. Other sources and providers of cloud storage exist.

Users of these services are provided authorized access to this storage after obtaining a subscription or membership offered to them by a storage provider. Alternatively, membership may be obtained in other ways. Upon obtaining a membership a user becomes a member. Storage is then accessible to members through the internet. However, the storage available through the internet is provided on an open network unprotected by the traditional perimeter defenses such as corporate firewalls, SSL connections, and access authentication mechanisms that may be used to protect local or network connected storage systems.

Cloud storage may also be available through private storage services and systems such as may be maintained using both local and cloud storage systems. Subscriptions may not be required to access these storage services and a user instead may be granted access through access management such as Windows login and Active Directory authentication. Authentication may include methods that include "multi-factor" authentication requiring at least two items of identity verification where one item may be an user ID and the second may be a security PIN or token such as may be provided by Google Authenticator. Other "multi-factor" methods may be used. Private storage systems may include both open network and private network storage services.

These open network storage systems provide only limited protections to users regarding the confidentiality or integrity of their information that they place onto these storage systems. For example, some storage systems may provide no protections at all. Further this information is often shared between multiple users that have all been granted membership access to the same stored information, giving rise to further security concerns.

Common methods in use today to protect access to information stored on open networks include basic authentication which relies on a user ID and password, or methods such as Oauth as presented by the OAuth group (www.oauth.net) or OpenID as presented by the OpenID Foundation (www.openid.net). These methods may authenticate user and application identities but they do not directly authenticate user data files and they do not provide encryption of these files.

Other methods for information protection available today may provide some limited protections for the information stored on open networks. Some examples of other methods currently deployed are digital timestamps, digital signatures, or file and folder access permissions as may be in use today. For example, digital timestamps provide a way for determining the content of a file at a point in time. This method requires an available timestamping authority (TSA) or server to provide the digital timestamp. This method has a high degree of complexity and requires sufficient timestamp infrastructure to implement.

Digital signatures may provide a record of who applied a signature to a file, but digital signatures do not provide a way for establishing a time sequence or chronology and therefore may not maintain integrity over a time interval. Additional ways of protecting information such as setting file and folder access permissions may prevent access to a file on an open network, but today these methods may often be circumvented and they do not provide any way for data integrity or prevention of replay attacks.

Using these available methods, users must place their information onto these cloud storage systems at their own risk with no certainty that their information will not be intercepted or altered by unauthorized users. In the event that this information is improperly accessed or altered, in an unauthorized manner, the authorized users of this information may never detect that this information has been improperly accessed, or altered.

In some instances, encryption may be available to these users from the storage provider, by their own methods, or through other methods available to them for protecting information. This encryption may be applied to the files and other information placed into storage. However, the use of encryption, which makes information unreadable without the use of an electronic key, may not ensure that data has not been inappropriately accessed or altered. Electronic keys protecting encrypted information may be intercepted or in some cases even guessed allowing unauthorized users to access information they are not otherwise allowed to access.

Once this unauthorized access is obtained, the information may be used inappropriately, altered, and even re-encrypted by the unauthorized user without the knowledge of the authorized users. This may lead the authorized users to come to rely on this altered information as if it was correct, when actually it is not.

Further, the use of encryption does not prevent an unscrupulous user who is allowed access to information stored in the cloud from disregarding any rules established for accessing this stored information. The unscrupulous user may properly access this information, but then improperly use or alter this information to harm or deceive the other authorized members using and relying on the information.

Another method of placing information into the cloud is using information transfer systems. Information transfer systems provide for delivery of information or files between users, organizations, computers, or between other types of information endpoints that may reside in the cloud, in personal or private networks. One example of an information transfer system is electronic email where information comprised of a message and one or more message attachments. Examples of electronic email systems that can be used for the transfer information using the cloud is Google gmail, Microsoft Exchange, and others. Another example of an information transfer system that may be used to transfer information using the cloud is file transfer software programs. Examples of file transfer programs include FTP, SFTP, IBM Connect:Direct, and others.

BRIEF SUMMARY OF THE INVENTION

One or more embodiments of the present invention provide systems and methods to improve upon the encryption key management used for secure sharing of information stored and transferred using private and cloud storage or transfer services by providing a system and method of encryption key management for information stored on an open or private network.

BRIEF DESCRIPTION OF THE DRAWINGS

FIG. 23 illustrates an exemplary .ZIP file view of a Key Provider Record located in the end of the central directory header.

FIG. 24 illustrates a binary embodiment of a Key Provider Record.

DETAILED DESCRIPTION OF THE INVENTION

Figure 1:
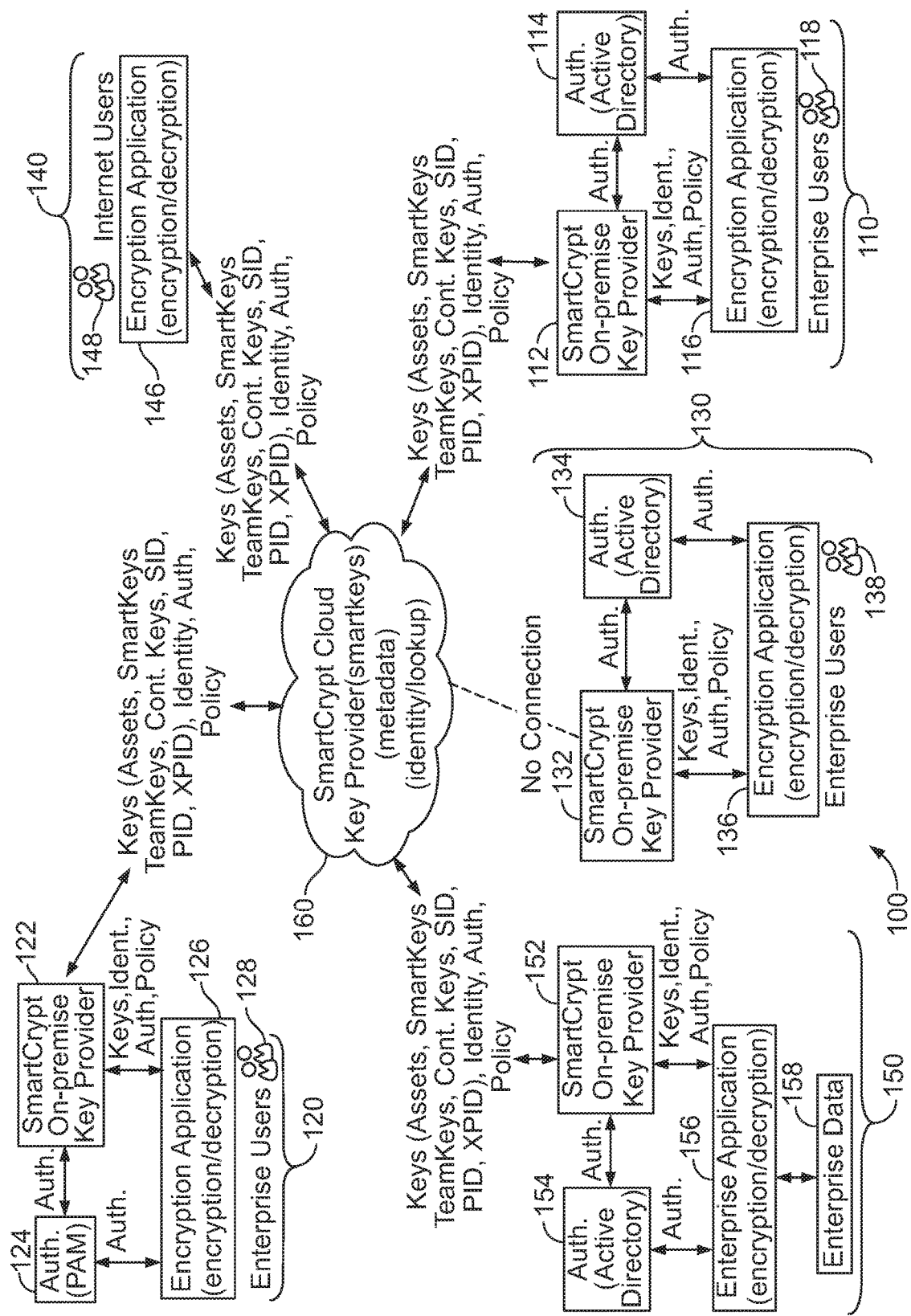
FIG. 1 illustrates a Smartkey Information Management System according to an embodiment of the present invention.

FIG. 1 illustrates a Smartkey Information Management System 100 according to an embodiment of the present invention. As shown in FIG. 1, the Smartkey Information Management System 100 includes a first enterprise system 110, a second enterprise system 120, a third enterprise system 130, an internet user system 140, an enterprise data system 150, and a Smartkey Key provider 160.

The first enterprise system 110, second enterprise system 120, and third enterprise system 130 all include a Smartkey on-premises key provider 112, 122, 132, an authorization system 114, 124, 134, an encryption/decryption application 116, 126, 136, and one or more enterprise users 118, 128, 138. The internet user system 140 includes an encryption/decryption application 146, and one or more internet users 148. The enterprise data system includes a Smartkey on-premises key provider 152, an authorization module 154, an encryption/decryption application 156 and enterprise data 158.

In operation, as further described below, the Smartkey Information Management System 100 employs a Smartkey to manage information stored on and/or transferred between one or more of the enterprise systems 110, 120, 130, the internet user system 140, the enterprise data system 150, and the Smartkey provider 160. As shown in FIG. 1, one or more of the enterprise systems 110, 120, 130, the internet user system 140, and the enterprise data system 150 may exchange information with the Smartkey provider 160 including assets. Assets may be keys that are used in encryption or decryption operations. Examples of keys are Smartkeys, TeamKeys, Contingency Keys, Private Keys, SID, SID with URN, Public Keys, PID, PID with URN, Email verified Public Keys (XPID). Other types of keys may be used as assets. Assets may include information about a user, a device, or an application that may request or receive assets. Examples of information include user name, device address, application name, company, location, internet address, email address, permissions. Other characteristics of users, devices or application may be used. Assets may include metadata used for encryption or decryption operations or to request or retrieve keys. Examples of metadata include hash, initialization data, random data, encrypted random data, sinfo, shash, and sproxy. Other metadata may be used.

In one example, and as further described below, using the first enterprise system 110, an enterprise user 118 may interact with the encryption/decryption application 116. The encryption/decryption application 116 may query the authorization system 114 to confirm that the enterprise user 118 is authorized. In the first enterprise system 110, the authorization system 114 may be an active directory system 114. Once the authorization is confirmed, the authorization system 114 may pass an authorization to the Smartkey on-premises key provider 112. The Smartkey on-premises key provider 112 may then interface with the encryption/decryption application 116 to allow the enterprise user 118 to create or modify Smartkeys, encrypt or decrypt files, and/or transfer files to other users using one or more Smartkeys that may be locally stored at the Smartkey on-premises key provider 112. Further, the Smartkey on-premises key provider 112 may allow the encryption/decryption application 116 to communicate and/or store files or Smartkeys to or from the Smartkey provider 160.

The second enterprise system 120 operates generally similarly to the first enterprise system 110, except the authorization system 124 for the second enterprise system is a Pluggable Authentication Module (PAM) system.

The third enterprise system 130, as illustrated in FIG. 1, operates generally similarly to the first enterprise system 110, except it has lost its connection to the Smartkey provider 160. Consequently, the encryption/decryption application 136 currently only has access to the Smartkeys that are stored locally at the encryption/decryption application 136. Local storage may occur by writing the smartkey to memory or disk storage on a computer.

The internet user system 140, as illustrated in FIG. 1, includes the encryption/decryption application 146, but does not include an authorization system or on-premises key provider. In this case the encryption/decryption application 146 communicates directly with the Smartkey provider 160 and the Smartkey provider 160 performs authorization actions and stores keys associated with the internet users 148 instead of having the keys stored at an on-premises key provider.

The enterprise data system 150 operates generally similarly to the first enterprise system 110, but instead of an enterprise user 118, the enterprise data system 150 interacts with enterprise data 158. As further described below, enterprise data may be information pertaining to users or resources such as team information, contingency access information, or master key information that may be used during the creation of Smartkeys either at the encryption/decryption application 156 at the enterprise data system 150 or at one of the other encryption/decryption applications 116, 126, 126, 146. In one embodiment, enterprise data may be business information that may be encrypted or used to encrypt/decrypt automatically rather than with user input.

Figure 2:
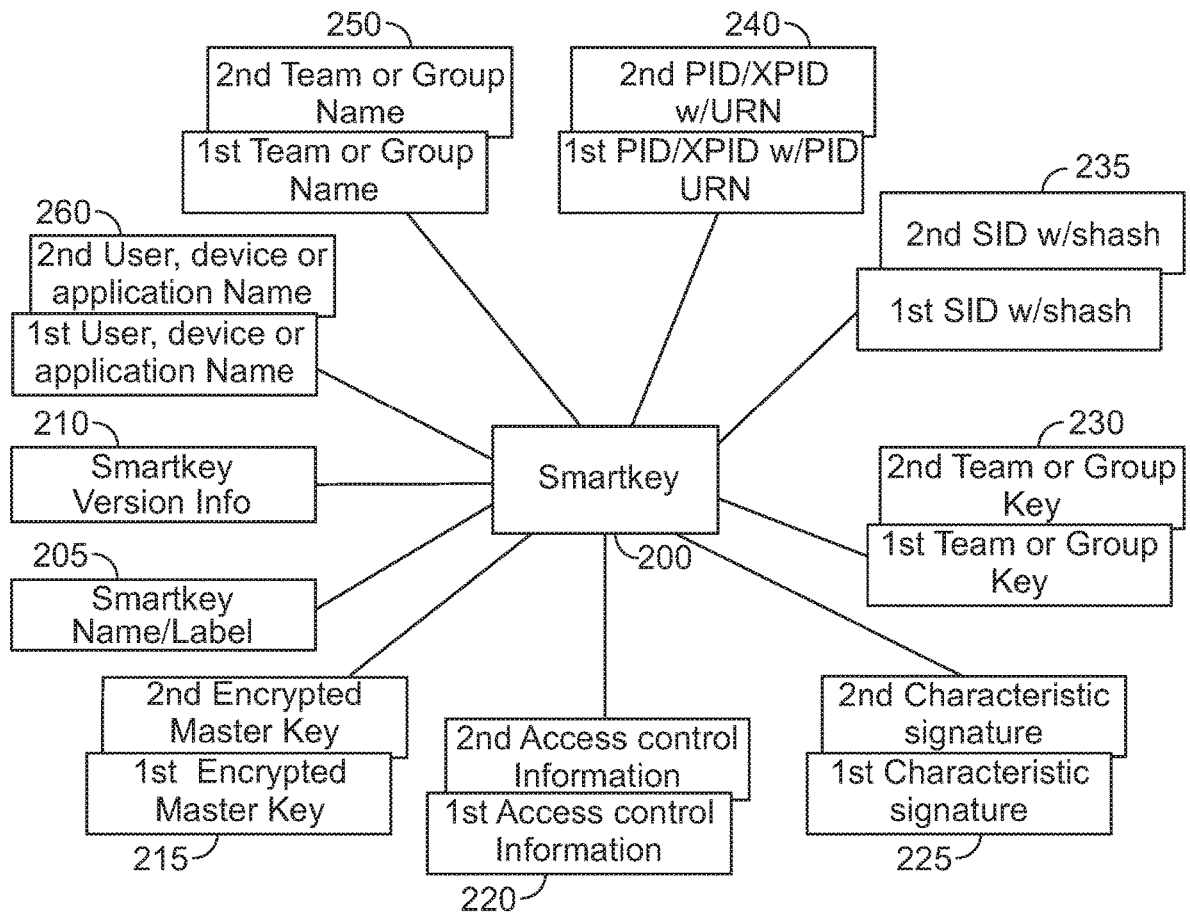
FIG. 2 illustrates an exemplary embodiment of a Smartkey.

FIG. 2 illustrates an exemplary embodiment of a Smartkey 200. As shown in FIG. 2, the Smartkey 200 may include a Smartkey Name or Label 205 that identifies the Smartkey, a Smartkey Version Info 210 that provides version information about the Smartkey, one or more encrypted master keys 215, one or more access control information data structures 220, one or more characteristic signatures 225, one or more team or group keys 230, one or more private keys (SID) with shash 235, one or more public keys (PID/XPID) with Uniform Resource Names (URN) 240, one or more team or group names 250 which are the names associated with the team or group keys, and one or more user, device, or application names 260, which may be used to identify assets to which the Smartkey provides access.

Figure 3:
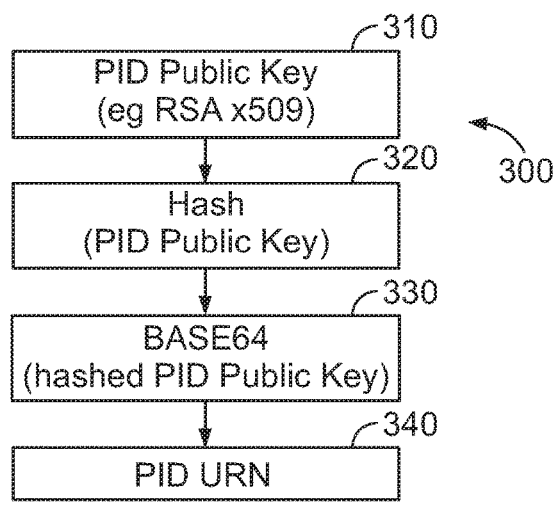
FIG. 3 illustrates a flowchart of a method for forming the PID URN.

FIG. 3 illustrates a flowchart 300 of a method for forming the PID URN. First, at step 310, a public key such as an RSA x509 key is received. For example, the key may be entered by a user or may be generated by one of the encryption/decryption applications in FIG. 1. The PID may then be hashed by the encryption/decryption application at step 320. The hashed PID may then be converted to text at step 330 using BASE64 in order to form the PID URN at step 340.

Figure 4:
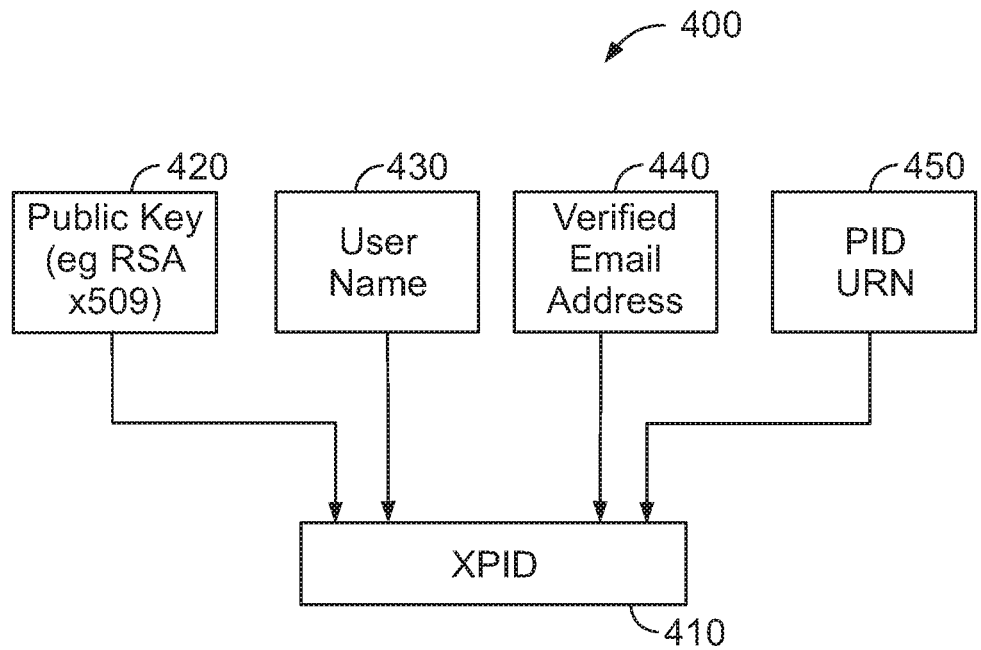
FIG. 4 illustrates a flowchart of a method for forming the XPID 410.

FIG. 4 illustrates a flowchart 400 of a method for forming the XPID 410. As shown in FIG. 4, the XPID may be composed of a public key 420, a user name 430, a verified e-mail address 440, and a PID URN 450.

Figure 5:
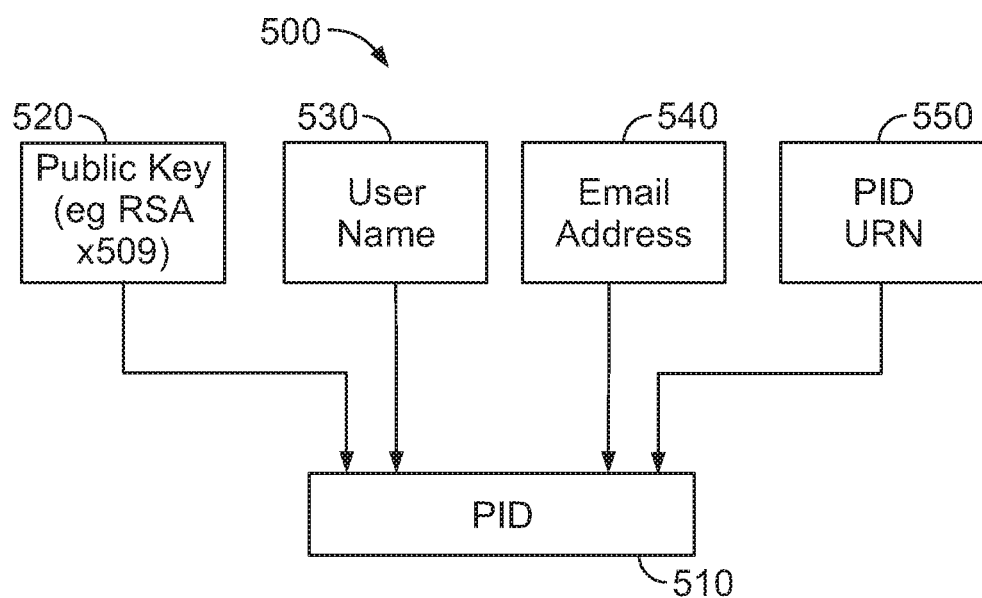
FIG. 5 illustrates a flowchart of a method for forming the PID 510.

FIG. 5 illustrates a flowchart 500 of a method for forming the PID 510. Similar to FIG. 4, the PID may be composed of a public key 520, a user name 530, an e-mail address 540, and a PID URN 550. In one embodiment, the XPID may include an e-mail address that has been verified, and a PID may just store an e-mail address that is provided by a user without verification. E-mail verification methods may include receiving an initial e-mail address from a user, transmitting a verification e-mail to the e-mail address, and receiving and tracking an affirmative response to the verification e-mail in order to consider the e-mail address to be verified.

Figure 6:
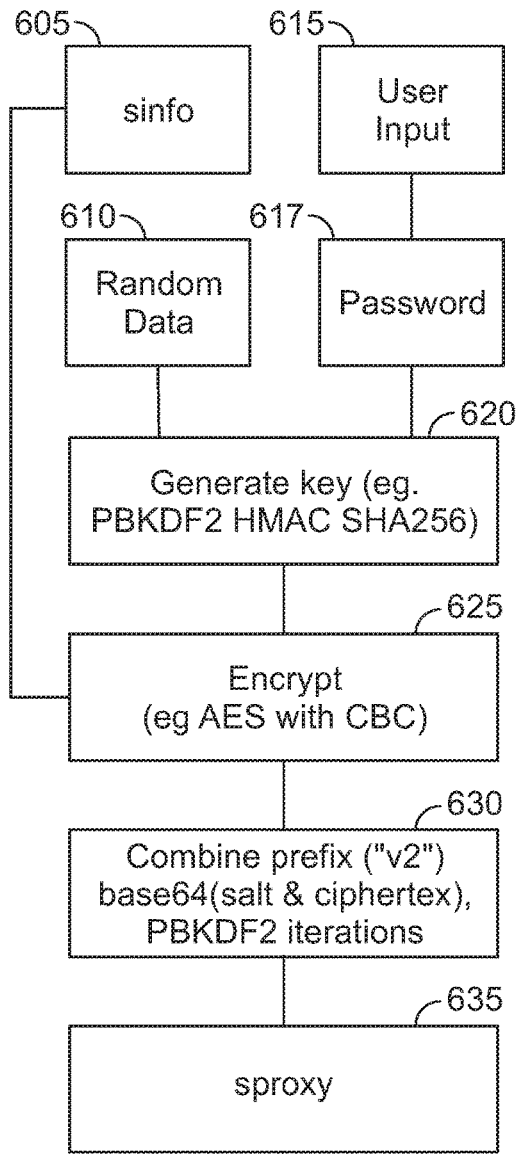
FIG. 6 illustrates a flowchart of a method for forming the sproxy.

FIG. 6 illustrates a flowchart 600 of a method for forming the sproxy. First, at step 605, sinfo is generated using random data. At step 615, a user input such as a password 617 is received. Next, at step 620, the password 617 is combined with random data 620 and used to generate a key using one or more of PBKDF2 (Password-Based Key Derivation Function 2), HMAC (keyed-hash message authentication code) or SHA256 (Secure Hash Algorithm of an exemplary length of 256 bits). Preferably PBKDF2 is used with 50,000 iterations. Other iteration values may be used. Preferably a salt value may be random data 610. Other random data may be used. Cipher text used is the result of the encryption operation 625.

At step 625, the key is encrypted, for example using Advanced Encryption Standard (AES) or Cipher Block Chaining (CBC). Then, at step 630, the encrypted key that will include characters having values not within the ASCII range of character values is converted to text a text string including characters within the range of ASCII character values using BASE 64 and the text "v2" is prepended to the text string. The prepending of the substring characters "V2" provides in indicator of the version of the sproxy value that is created. Other version indicators may be used. The processed text string is known as the sproxy 635.

Figure 7:
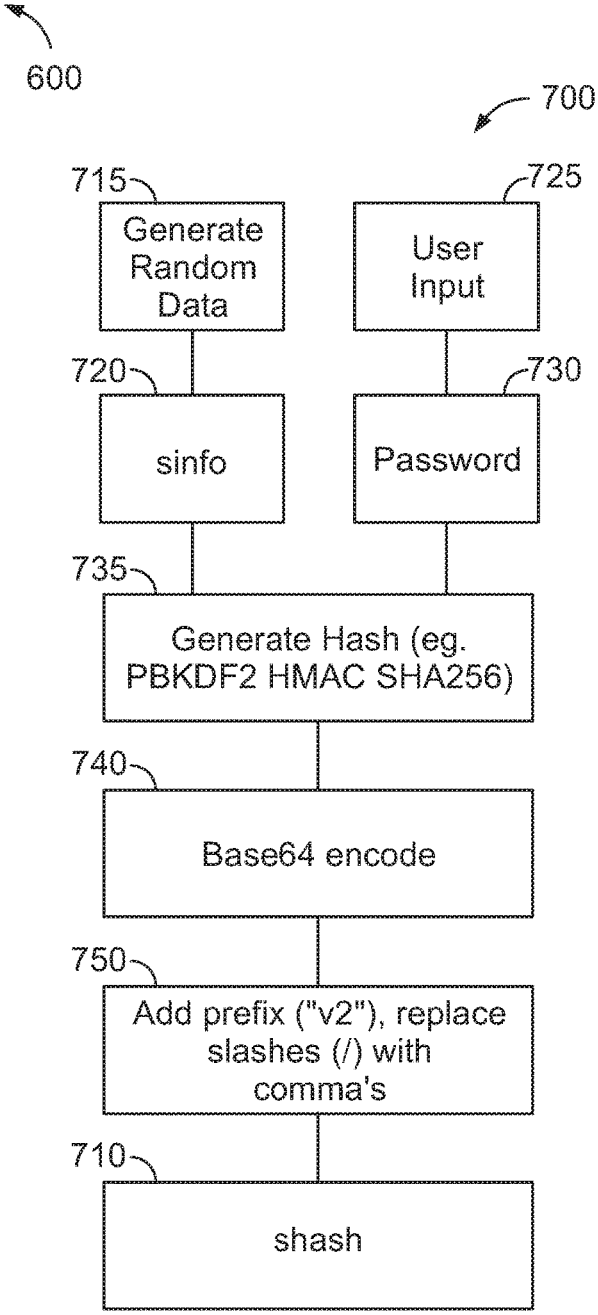
FIG. 7 illustrates flowchart of a method for forming the shash.

FIG. 7 illustrates flowchart 700 of a method for forming the shash 710. First, at step 715, random data is generated by the encryption/decryption application. This random data is labeled as sinfo at step 720. Additionally, a user input is received at step 725 that constitutes a password 730. The sinfo 720 and password 730 are then hashed at step 735 using one or more of PBKDF2 (Password-Based Key Derivation Function 2), HMAC (keyed-hash message authentication code) or SHA256 (Secure Hash Algorithm of an exemplary length of 256 bits). At step 740, the hash is converted to text using BASE 64. Next, at step 750, the text "v2" is prepended to the text string generated at step 740 and any slashes are replaced with commas to form the shash 710. The shash may then be used as a value for searching to locate a private key. In one example, an automated process attempting to locate keys may perform a text for the text "v2" to identify a text string as a text version of a hash and may then read the text sting and return the text string, or may de-convert the text string of the shash back into a hash and return the hash. In another example, a Key Provider may manage a collection of smartkeys. When an encryption application requests a smartkey, the shash value is provided to the Key Provider to use as a search value. Smartkeys may be stored by a Key Provider as files. Using the shash value as a search value, the Key Provider may read each smartkey file and return the one that includes the matching shash value. Alternatively, a Key Provider may store smartkeys within a Database Management System (DBMS). Using a search function of a DBMS, the requested smartkey may be located that contains the matching shash.

Figure 8:
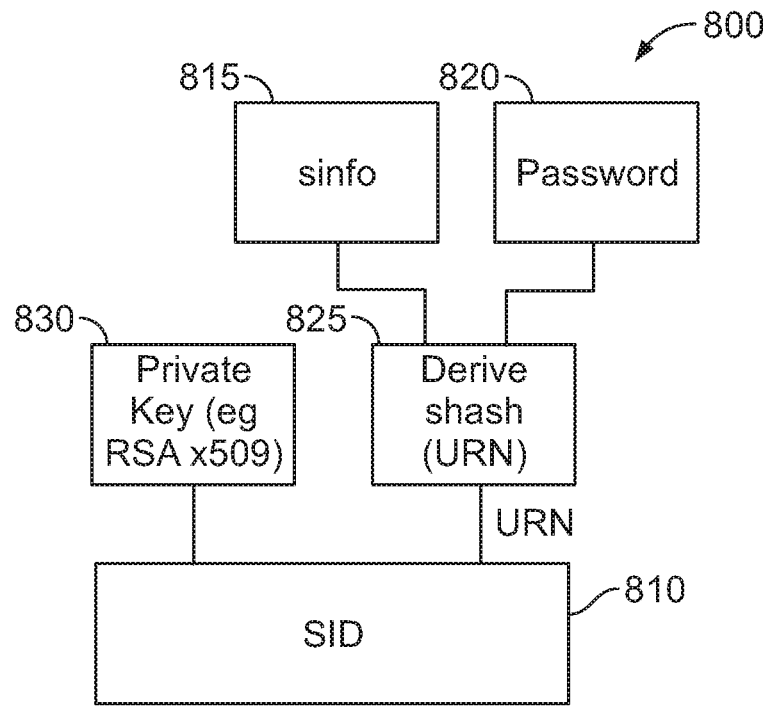
FIG. 8 illustrates a flowchart of a method for forming a private key with a URN (SID).

FIG. 8 illustrates a flowchart 800 of a method for forming a private key with a URN (SID) 810. First, at step 815, the sinfo is received and at step 820 a password is received from a user. The sinfo and password are then used to derive an shash at step 825. Finally the URN is combined with a private key such as a RSA x509 key 830 to form the SID 810.

Figure 9:
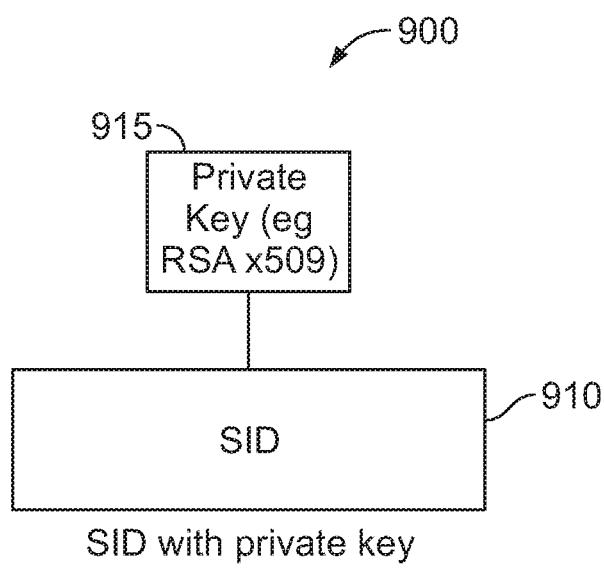
FIG. 9 illustrates a flowchart of an alternate method for forming the private key (SID).

FIG. 9 illustrates a flowchart 900 of an alternate method for forming the private key (SID) 910. As shown in FIG. 9, the SID 910 is simply composed of a private key 915 such as a RSA x509 key One example of a key that may be stored or used within a Key Provider system to identify a Key Provider providing encryption keys for use by encryption and decryption applications is a Smartkey. A smartkey is a new encryption or decryption key information format created by PKWARE, Inc., the assignee of the present application. One benefit of a smartkey is that is can be shared by more than one user. Another benefit of a smartkey is that when using a smartkey key management system it can be automatically exchanged between users, devices and application avoiding a need to manually deliver a key to another user for encryption or decryption operations. Another benefit of a smartkey is that it can be referenced using a name or label of the smartkey without revealing the identity or keys of the one, or more users of the smartkey. Another benefit of a smartkey is access to existing encrypted data can be changed to allow or remove user access without requiring the encrypted data to be reencrypted.

In one embodiment, characteristics of a smartkey include a name identifying the smartkey to users, devices, key providers and encryption/decryption applications. At least one encrypted master key used to encrypt session keys, and information about the identity of at least one user, application, or device that can encrypt or decrypt information using the smartkey. Additional characteristics may be present. Additional characteristics may be added, changed, or removed.

Another characteristic of a smartkey may be access control information about the users, devices, or applications that may be allowed to use a smartkey and how they may use it. Access control information identifies what actions each user of a smartkey may perform when using a smartkey. Actions include whether a user can use the smartkey for both encryption and decryption operations on files, for only one of encryption or decryption but not both operations, and/or how long the can use the smartkey or whether they are granted owner access for the smartkey Access control information may include the range of encryption algorithms a user is allowed to use including one or more encryption algorithms. Access control information may include the encryption key sizes allowed for use by a smartkey user. Access control information may include the types of keys a user may use, for example, a user may only use OpenPGP keys. Another type of key allowed for use may be an X.509 key pair. Another type of key that may be allowed for use may be an Elliptic Curve key. Another type of key that may be allowed for use may be a password. Access control information may include information indication a user may use one, some, or all types of encryption keys, encryption key sizes or encryption algorithms. Other access control information may be used. Access control information for a first user of a smartkey may allow different actions than are allowed by the access control information for a second user of a smartkey. For example a first user access control information may indicate through a flag or a setting in the access control information that the first user may encrypt and decrypt data using the smartkey. Access control information for a second user may allow the second user to only decrypt information using the smartkey.

Another characteristic is information about each user of a smartkey. This information may include their name, device name, their email address, verified email address, geographic location, organization, IP address, device MAC address, application name, team or group membership. Other access control information may be used.

Another characteristic of a smartkey may be a PID, PID with PID URN (PID with URN), or a public key. Preferably a PID for each of the one or more users allowed to use the smartkey may be present. A PID within a smartkey may be used to encrypt information so it can be decrypted using a private key held in a SID.

Another characteristic of a smartkey may be a SID, SID with shash, or a private key. Preferably a private key or a private key placed within a SID is encrypted. One method of encrypting a private key combines an sinfo and a password using a key generation function to produce an encryption key. The resulting encryption key is then used with an encryption algorithm as a key encryption key for encrypting the private key. In one embodiment, a SID, SID with shash, or a private key for each of the one, or more users allowed to use the smartkey is present. The private key of each of the one, or more users allowed to use the smartkey may use a different sinfo used for generating the key encryption key. Preferably the password combined with an sinfo is known only by the user whose private key is encrypted using the key encryption key.

In another embodiment, a set of users may be defined in a smartkey characteristic as a group or team. Preferably, when a team is added to a smartkey, a key pair is generated for shared use by each of the members of the team that is allowed to use the smartkey. Using the public key of the team key, a PID or a PID with URN is generated. Preferably a PID with URN is generated if the smartkey is to be placed into a Key Provider. Using the private key of the team key pair, a SID or a SID with shash is created. Preferably a SID with shash is created if the smartkey is to be placed into a Key Provider. The private key of the SID of the team key is used by each team member to decrypt a master key needed to decrypt each session key used to encrypt information.

Additionally, an individual key pair is generated for each member of the team. A PID with URN and a SID with shash are created to hold the individual public and private key of a first member of the team. A PID with URN and a SID with shash are created to hold the individual public and private key of a second member of the team. Each member allowed to use a team key of a smartkey uses their individual private key to gain access to the public or private key shared by the team.

A team key used within a smartkey provides a method for all members of the team to be automatically allowed access to unencrypted data encrypted using the smartkey of the team. One example of a team may be a security department responsible for making sure the appropriate use of information and encryption occurs. Members of a security department team may need to open files encrypted by other users to ensure appropriate use of information. A smartkey used by a user not a security team member may include a key for the user not on the security team and a key for the security team. Whenever the user not on the team encrypts a file, the team key automatically included will be used so each of the security team members can review the encrypted data of the user.

In one embodiment a smartkey includes a team key and a key of a user that is not a team member. In another embodiment a smartkey includes a key for a first team and a key for a second team.

In another embodiment, a team key is created for a smartkey. Each member of the team is identified as part of the team using their email address, or alternatively using an Active Directory (AD) group name that is used to identify and authenticate each member of an AD group. Other methods of identifying members of a team may be used.

A first member of a team may use an encryption or decryption application to create a smartkey. A first user defines a team name and identifies all the team members. The team member information and team key information is placed into team name and team key characteristics of the smartkey. The smartkey is sent to a Key Provider shared by the team.

The team smartkey can also be called a team key. A first team member uses an encryption application to create a .ZIP file that includes an encrypted file encrypted using the team key. A second team member receives the .ZIP file. Using a decryption application on a device of the second team member, the second team member authenticates to the Key Provider shared by the team. After authentication, the Key Provider sends the team key to the decryption application of the second team member. After receiving the team key, the decryption application of the second team member is able to use the team key for the second team member to automatically decrypt information using the team key. In another embodiment a second team member may use an encryption application for creating encrypted files using the team key that can be automatically decrypted by all members of the team.

Authentication may occur using Active Directory. After successful user authentication of a team member, the team member may encrypt and decrypt information encrypted for the team.

If a Key Provider is present to provide key management the key pairs, PID, PID with URN, SID and SID with shash do not need to be created at the time a smartkey is created or when a user or team is added to a smartkey. One function of a Key Provider is to store keys. Users that can authenticate to a Key Provider using either an enterprise login or a public login may already have a key pair, PID, SID, or SID with shash stored on the Key Provider storage facility. The Key Provider storage facility may use files to store assets. Alternatively, a Key Provider storage facility may use a DBMS to store assets. Other types of storage facilities may be used.

If a key pair, PID, PID with URN, SID, or SID with shash is already stored as an asset on a Key Provider an encryption or decryption application may retrieve the asset for use in creating or modifying a smartkey characteristic for a user.

Either a PID or a SID may include a form of a URN. A URN is a term for a Universal Resource Name. A URN may be used to locate a PID or a SID. A URN provides a method for searching to locate either a PID or a SID. One example of a method of searching to locate a PID or a SID using a URN is to search a set of files for a file containing a field or a record in the file matching the URN used to search. This may occur when a collection of smartkeys are stored on a Key Provider. The Key Provider may store the smartkeys as files. Another method of searching may be performed by a Key Provider that may store a collection of smartkeys as records and fields within in a Database Management System (DBMS). The DBMS search functions may receive the URN from the Key Provider and search for a record having a field matching the URN. Other methods of searching may be used.

In one another embodiment, an automated system may use a URN to search for an locate one or both of the PID and SID. For example, an encryption application seeking a PID may transmit a URN to a key provider. At the key provider, multiple keys are organized into a database or data structure that is searchable using the text version of the URN. The automated processes at the key provider may then receive the desired URN and perform a text search of the multiple available keys to locate the desired key. The desired key may then be returned to the encryption application.

Another characteristic of a smartkey is an sinfo. Sinfo is used to protect a private key, SID, or other sensitive key material that may be used in an encryption or decryption operation. An sinfo is generated using random data and is combined with another encryption element such as a password presented by a user. Creating an sinfo is preferably done when creating a smartkey. The combined sinfo and password data is used to encrypt a key that is part of a smartkey. The key may be a PID, SID, masterkey or other key that may be contained in a smartkey. When a key is encrypted using the combined sinfo and password, the encrypted key may be securely protected while when it may be stored or exchanged with a Key Provider.

An sinfo may be encrypted to prevent disclosure of the key material needed to recreate an encryption key. An encrypted sinfo is called an sproxy. To create an sproxy, random data is generated. This random data is combined with a password. The password may be presented by a user. The password to create an sproxy may be the same password that is combined with an sinfo when and sinfo is used to encrypt a key. Sproxy data may be received from a Key Provider when an shash is used to locate a private key.

In another embodiment, an sproxy is stored on a Key Provider. A sproxy can be used to securely transmit a private key, SID, or SID with shash to one or more devices of a user. A user may create encrypted data on a laptop using an encryption application. A user may also use another device that is a smartphone. Using an encryption or decryption application on a smartphone provides the user with a method for using the encrypted data created on a user's laptop on a different device of the user. Using an sproxy an encryption or decryption application can connect to a Key Provider and send or retrieve a private key automatically to a new device on which a user will use encrypted data. An sproxy may be created by an encryption or decryption on a first device. The first device authenticates to the Key Provider that both a first and a second device will use to manage keys. After a key pair is created for a user and the private key is encrypted using an sinfo and a user provided password, an sproxy is created to hold the encrypted form of the sinfo.

The encryption application on a first device sends a message to the Key Provider. The message may include a PID, XPID, PID with URN, SID, SID with shash, and an sproxy. Other information may be included.

A user of a first device may then access a second device. Using an encryption or decryption application a user may encrypt or decrypt files using the key pair created on the first device. To use the key pair created on a first device on a second device, an encryption or decryption application may connect to a Key Provider managing keys for a first device and a second device. A user authenticates to a second device and after authentication is complete, the encryption or decryption application on the second device automatically receives a message from the Key Provider. The message may include a PID, XPID, PID with URN, SID, SID with shash, and an sproxy. Other information may be included.

Using the password, the sinfo data of the sproxy is decrypted. Using the decrypted sinfo data, the encrypted private key is decrypted. Using the decrypted sinfo data, the public key may be decrypted if an encrypted form of the public key was provided by the Key Provider. The unencrypted public key and the unencrypted private key may now be used for encryption and decryption operations.

An sinfo may be converted into an shash. An shash can be used as a private key locator to locate an sinfo that is needed to encrypt or decrypt a key. An shash preferably is composed of characters in the range of the ASCII character set to facilitate searching for an shash. One example of a search for an shash used as a private key locator is a Key Provider that stores smartkeys as files. Using the shash as a search value, the Key Provider reads each file until a smartkey containing a match of the shash value is found. Another method for a Key Provider to locate a smartkey using an shash as a search value used as a database search for a Key Provider that stores smartkeys using a Database Management System (DBMS). After a search is performed to locate an shash that resides in a SID, the shash is transformed to obtain an sinfo which may be used to decrypt a key.

A smartkey combines one or more of the characteristics of a smartkey into a data object that may be stored or shared. One method for storing a smartkey is to write the smartkey data to a file. A smartkey file may be stored on a computer having an encryption or decryption application. Another method for storing a smartkey is to write the smartkey data as a collection of records and fields in a Database Management System (DBMS). Other methods of storing a smartkey may be used. Alternatively, a smartkey data object may be stored on a Key Provider that supports storing smartkey objects as files. In another embodiment a Key Provider may store smartkeys using a DBMS. Preferably the format of a smartkey data object combines one or more characteristics following the JavaScript Object Notation (JSON) data interchange format.

One method for sharing a smartkey is to transfer the smartkey data object across a network connection between a computer having an encryption or decryption application and a computer having a Key Provider. Transferring a smartkey data object may be done using a standard network transfer method such as FTP, SFTP, or HTTP. Other network transfer methods may be used.

One or more characteristics placed into the smartkey data object may optionally be digitally signed using one or more of the private keys that may be present within the smartkey. A signature may be applied using a signature format following the X.509 or OpenPGP signature formats. For example, a PID stored within a smartkey may be digitally signed using a public key of the PID and consequently may be used by a system such as a decryption application to verify the PID information belongs to the user of the PID. Each PID within a smartkey may be signed using the public key of a PID than may be present for each user of the smartkey. The combined signatures may be used by a system such as a decryption application to verify the integrity of the PID information in the smartkey. Other characteristics of a smartkey may be digitally signed.

One method of using a smartkey within an encryption or decryption application includes a user providing the name of a smartkey to be used in an encryption or decryption operation. The name of the smartkey is used by the encryption or decryption application to make a request to a Key Provider to return a smartkey having the name requested. After the smartkey is returned by name, the keys contained in the smartkey are used by the encryption or decryption operation. A smartkey requested for an encryption or decryption operation may already exist in a Key Provider. Alternatively, a user may create a new smartkey. To create a new smartkey a user defines the users, devices or applications that can use the smart key within an encryption application present on the device. A smartkey is used by an encryption or decryption application by a user, a device, or an application to provide keys, key material, identity information, and other information available information that is present in the characteristics of the smartkey that may be used during an encryption or decryption operation. Users may be combined into teams or groups. A group is an alternate name for a team. A group is a set of users that may be defined within the smartkey as having access to the smartkey to use for encryption or decryption operations. Teams may be identified using group names of preexisting groups such as may reside within a user information repository such as Microsoft Active Directory. For example, and Active Directory (AD) group named X may be defined within a smartkey. The AD group may include all the users of a single department of a company. Using the smartkey to encrypt information will automatically encrypt the information so each member of group X can use the smartkey to decrypt the information.

Access control information for user and other characteristics for a smartkey may be defined for a smartkey when a smartkey is created. Information defined when a smartkey is created may be entered by the user using forms and dialogs presented by an encryption or decryption application that prompts the user to enter the information about the smartkey.

Using the characteristics present in a smartkey, the encryption application may encrypt files without requiring a user to specify the users, devices, or applications that may decrypt the encrypted information. The characteristics of a smartkey that may be used to encrypt files without requiring a user to specify other users include a PID that may be present in the smartkey. Each user for which a PID is present in a smartkey will be able to decrypt the encrypted information. When a file is encrypted using a smartkey, the master key that is used to encrypt each session key may be encrypted using a public key for a PID of a user of a smartkey forming an encrypted master key for a first user. If additional PID's are present as characteristics of a smartkey, the master key is encrypted to form an encrypted master key using the pubic key of each PID. Each PID may be for a different user of a smartkey. Each encrypted master key is placed into an encrypted file according the encryption specification of the encrypted file format.

Each user of a smartkey may be called an owner. The owner may be the first user to use or create the smartkey. Other users may be owners. Other users may become owners when an existing user of the smartkey that is an owner changes the characteristics about a user to include an owner indicator. An owner may add or delete other user's keys to the smartkey. The information about users that may decrypt the encrypted information is accessed using the characteristics within the smartkey. Use of a smartkey by a user may be changed by changing any of the characteristics of the user that are present in the smartkey. Removing all the characteristics of a user removes the user's ability to further use the smartkey to encrypt or decrypt data.

One method for adding or deleting users that can use a smartkey is for the encryption or decryption application to display a list of the users and groups that can use the smartkey. An owner of the smartkey may view the list and select one or more users or groups to be removed from list of users and groups of the smartkey. Alternatively, the owner may enter a user or group name that is added to the list of users that can use the smartkey.

In one embodiment, a smartkey is created for a user, a device, or an application using an encryption or decryption application. A user, a device, or an application may be referred to as a user for the purposes of this discussion. In one method of creating a smartkey, a user that authenticates to a Key Provider using either a public login or an enterprise login will have a key pair generated within the encryption or decryption application.

Information in a smartkey preferably is placed into a smartkey data object using JSON notation. JSON notation defines elements using a "name":"value" pair. Each pair may be combined into a set of relate element using braces "{ }". Elements having multiple values may be separated using commas ",".

The key pair may be generated using any standard key generation functions available to the encryption or decryption application. One example is a function that generates a key pair according to the X.509 V3 digital certificate specification (https://tools.ietf.org/html/rfc5280). Another example is a function that generates a key pair according to the OpenPGP message format (https://tools.ietf.org/html/rfc4880). Other key pair formats may be used. Alternatively, an encryption or decryption application may receive a key pair for the user from a Key Provider.

The public key of the key pair is placed into a first PID along with the additional information about the user. Additional information may include a name, an email address, a company name, address, phone number, employee ID, an IP address of a device, a department name. Other information may be used.

A password may be entered into the encryption and decryption application by a user. A random data function is used to create an sinfo. The password and the sinfo are combined using a key generation function to create a key encrypting key. An example of a key generation function is a function that creates a key having a size of 256 bits such as may be used with the Advanced Encryption Standard (AES) encryption algorithm. Other key generation functions may be used. Other key sizes including 168 bits, 192 bits, 512 bits, and other sizes may be used. Other encryption algorithms including 3DES, Blowfish, Twofish, and others may be used.

A key encrypting key is an encryption key used to encrypt another encryption key. Encrypting a key using a key encryption key provides a benefit of protecting the encryption key from exposure if the key is stored or transmitted. A key encryption key may be used to encrypt the public or private key of a key pair. A key encryption key may be used to encrypt a master key. A key encryption key may be used to encrypt a session key. A key encrypting key may be a key pair such as an X.509 or OpenPGP asymmetric key pair. A key encrypting key may be a symmetric key such as may be generated using random data, or that may be generated using an sinfo combined with a password from a user.

Preferably, each characteristic placed into a smartkey is authenticated. Authentication is used to verify the information of a signed characteristic has not been altered. Authentication may be applied to a smartkey characteristic using authentication methods including but not limited to digital signatures such as may be applied using a public/private key pair as may be performed using an X.509 or OpenPGP signature, cyclic redundancy checks such as CRC-32, secure hash functions such as MD5, RIPEMD, SHA-1, SHA-256, SHA-384, or SHA-512, or HMAC. Other secure hash algorithms may be used. Other authentication methods may be used to digitally sign a characteristic of a smartkey. After a characteristic is digitally signed, the characteristic signature is placed into the smartkey object.

A smartkey label may be generated by a user when a smartkey is created. The terms name and label may be used interchangeably to describe a name of a smartkey. A label may be entered using a user interface where a name for the smartkey may be typed. A smartkey label may be any name a user chooses to identify a smartkey. Names of smartkeys do not need to be unique. If a user does not provide a name for a smartkey and a random series of characters will be generated for the smartkey by the encryption or decryption application. One method for randomly generating a smartkey label is to use a random data function to generate a random value. The random value may be transformed using a BASE64 transformation to transform the random value to the range of ASCII characters. The transformed smartkey label may be truncated to a number of characters that may file within the storage defined within a Key Provider for storing a smartkey name. the generated smartkey label is then placed into the smartkey object. A smartkey label characteristic may be placed into a smartkey using a JSON notation. One example of a smartkey characteristic placed into a smartkey is {"label":"smartkey-name"}. Preferably, a signature is generated for the label characteristic that is stored in the smartkey as another characteristic signature.

New types of characteristics of smartkeys may be created over time. New types of characteristics created may not be compatible with smartkey charcteristics already in use by encryption or decryption applications. To ensure appropriate operation of an encryption or decryption application that uses smartkeys, version information may be included in a smartkey. A version defines the set of available characteristics that can be used within a smartkey at the time a version was applied to a set of smartkey characteristics. A version may be defined using a number. Alternatively, a version may combine a number with a string of one or more characters. One example of a smartkey version combining a number and a string is "V2". This identifier present in a smartkey informs an application that the characteristics of version V2 are available for use with this smartkey.

Smartkey versions are defined by developers of smartkey characteristics and encryption and decryption applications that use smartkeys. An encryption or decryption application can use a version in a smartkey to determine if it can support the version found. If the version cannot be supported by the encryption or decryption application, the encryption or decryption application can inform the user it cannot provide support for the version of the smartkey. This determination allows to application to avoid unexpected or erroneous behavior if a smartkey includes characteristics the application does not support. Version information is placed into a smartkey by the encryption or decryption application that is used to create the smartkey. For example a version characteristic for a smartkey may appear as follows using JSON notation {"Version":"V2"};

User information may be placed into a first user name characteristic when a smartkey is created. Information about a first user may be entered into a form or dialog presented by an encryption or decryption application. User information may include a user first or last name, email address, physical address, phone, company, account or employee id, IP address, device ID such as a MAC or UUID, or other information about a user may be included. User information may be placed into a first user name characteristic using JSON notation. For example, a first name information for a user named John Smith may be placed into a first user name characteristic in a form similar to {"Name": "John Smith"}. Adding a second user information including an email address may appear as follows. {"Name": "John Smith", "Email":JohnSmith@xyz.org}. User information for a second user allowed to use a smartkey may be entered. A second user characteristic may be formed using the second user information. The first and second user name characteristic may be placed into a smartkey.

A private key of a key pair for a first user of a smartkey may be formed into a SID with shash data object. A SID with shash characteristic may be placed into a smartkey using JSON notation as follows. {"SID":"bytes of SID with shash data"}.

A public key of a key pair for a first user of a smartkey may be formed into a PID with URN data object. A PID with URN characteristic may be placed into a smartkey using JSON notation as follows. {"PID":"bytes of PID with URN"}.

Each smartkey characteristic may optionally be digitally signed. A signature characteristic may be formed for each signed characteristic. A signature may be attached to the signed characteristic within a smartkey, or placed separately in the smartkey. Preferably a signature characteristic is attached. For example, an attached signature characteristic for a PID with URN characteristic may be formed as follows {"PID":"bytes of PID with URN", "Signature":"<bytes of signature>"}.

Encrypted master key may be present at the time a smartkey is created. An encrypted master key holds the master key used by an encryption or decryption application to encrypt or decrypt a session key that is used to encrypt or decrypt file data. If a smartkey is created by an encryption or decryption application at the time a file is being encrypted, an encrypted master key will be available to be placed into the smartkey as an encrypted master key characteristic of the smartkey.

Alternatively, a smartkey may be created using an encryption or decryption application at a time separate from an encryption or decryption operation on a file. In this case no session key or master key is present and no encrypted master key can be formed and no encrypted master key characteristic will be placed into the smartkey.

An encrypted master key characteristic may be added to a smartkey when the smartkey is used as part of an encryption or decryption operation. A first encrypted master key characteristic is formed using a first encrypted master key data. A first encrypted master key data includes the data resulting from an operation that encrypts a master key using an encryption key present in a smartkey. The public key of a first PID within a smartkey is used to encrypt a master key to form a first encrypted master key data. The public key of a second PID within a smartkey is used to encrypt a master key to form a second encrypted master key data. The first and second encrypted master key data are placed into the smartkey as first and second encrypted master key characteristics. For example, for first encrypted master key may be placed into a smartkey using the following form. {"user": "John Smith", "MasterKey":"<bytes of the encrypted master key for John Smith>"}.

A first access control characteristic may entered by a user and be placed into a smartkey using a form {{"User":"John Smith","Type":"Owner", "Actions": {"Encrypt","Decrypt"},"KeyTypes": {"X509","OPGP","password"}, "Algorithms": {"AES","IDEA"}, "KeySizes":{"256", "512"}, "Expiration":"12-31-2017"}

When a team is defined for a smartkey, a characteristic may be formed to hold the team name that is used to define the team. More than one team may be used within a smartkey. Each team may include at least one member. A member is a user that is defined to be part of a team and is allowed to use the smartkey to encrypt and decrypt data using a team key. A member of a team may be a member of another team defined in the same smartkey. A team may include a team key. A team key may be used by each team member to encrypt or decrypt encrypted information. Information a team key may encrypt or decrypt includes files and master keys. Other information may be encrypted or decrypted with a team key. Each team member may have an individual key pair within an individual PID with URN and SID with shash. An individual key pair for a member may be a key pair used by the member when not a part of the team. The individual key pair is used to encrypt and decrypt a copy of the team key used to encrypt data. An individual key pair for a member is identified using a PID URN or a SID shash.

A team may be formed using information entered by a user. A key pair is generated for the team. A Team SID with shash is formed for the team private key. A Team PID with URN is formed for the team public key. One example of using a team key to encrypt a file is as follows. A session key is generated to symmetrically encrypt the file data. A master key is generated to encrypt a session key. A team PID (public key) is used to encrypt the master session key. Public keys of other users not part of the team may also be used to encrypt the master session key allowing both team members and non-team members to share an encrypted file.

The public key from each team members PID with URN is used to encrypt the team SID and team PID. An encrypted copy of the team SID and team PID is provided to each team member using the Key Provider to deliver a copy of the encrypted team SID and encrypted team PID to each member. A first team key characteristic is formed using the encrypted team SID data and the encrypted team SID data. A first team name characteristic is formed to include the first team key characteristic and a list of member names. Along with each member name is a PID URN and a SID that is used to search for a team members individual key pair. The individual key pair is used to decrypt the team private key that is then used to decrypt the encrypted master session key.

A team name characteristic may appear as follows {"Team":"Smiths", "TeamPID":encrypted team PID data>, "TeamSID":<encrypted team SID data>,{"Member":"John Smith","PID URN":<PID URN data>","SID":<shash data>}, {"Member":"Bob Smith","PID":<PID URN data>, "SID":<shash>}}

Characteristics may appear in a smartkey in any order. Different labels may be used for the "name" portion of each element of a characteristic. Different values may be used for the "value" portion of each element of a characteristic. Notation formats other than JSON may be used to define a smartkey data object. For example, XML may be used. After a smartkey is created, it may be used to encrypt or decrypt information. One method for encrypting a file using a smartkey is as follows.

When a file is encrypted using a smartkey, an encryption application may create a session key for the file. Preferably a session key is symmetric key data. Each file encrypted will have a different session key generated. Each session key may be generated using a random data generation function. The session key is generated for a key length suitable for the selected encryption algorithm used to encrypt a file. One example is a session key length of 256 bits that may be used with the Advanced Encryption Standard (AES) algorithm for encrypting information. Other encryption algorithms and key lengths may be used.

Each session key is used to encrypt the file information for which the session key was generated. Then each session key is encrypted using the smartkey master key. A smartkey master key may be another smartkey. A smartkey master key may be a symmetric key generated using random data. Other types of keys may be used as a master key for encryption. If a smartkey holds more than one master key, the sessions key(s) may be encrypted using each master key. A master key may also be referred to as an asset key.

Each encrypted session key is preferably be stored within the container in which the encrypted file data is placed. The container may be a file constructed according to the .ZIP file format. Encrypted session keys may be placed into a file separate from the file in which the encrypted file data is placed.

Identity information within a smartkey for a user, device, or application may include an email address, a device ID such as a MAC address, a program name, a location for a public or private key. Other information may be used for identification. This identity information is used to locate an encryption key for the identified user, device, or application. This key may be another smartkey, a public key such as is defined by the X.509 or OpenPGP encryption key formats. Other types of keys may be used. The encryption application may locate an encryption or decryption key for an identified user, device or application from a Key Provider using one or more of the characteristics of the smartkey.

One method of locating a smartkey is to search for the smartkey that contains a characteristic that has a PID URN matching to the PID URN used for the search. Another method uses the SID URN to search for the smartkey that contains a characteristic that has a SID URN matching to the SID URN used for the search. A search may be performed by a Key Provider on a set of smartkeys management by the Key Provider. The Key Provider may manage the smartkeys as a set of files. To locate a smartkey using a search, the Key Provider reads each file until file with a matching search value is found. Alternatively a Key Provider may manage a collection of smartkeys by storing them and fields an records in a Database Management System (DBMS). A Key Provider using a DBMS may pass the search value to the DBMS search functions to find the matching smartkey.

One example is to use a PID URN that may be present as user information in a PID file, or PID list to locate a public key that may be used to encrypt an encrypted master key. A PID URN may be used as an element in a search performed on the available smartkeys on a Key Provider. Another example is to use an email address to match an email address within and PID file or PID list. Using the PID URN or email address will identify the PID matching to the PID URN or email address of the storage location where a public key for a user is located. A PID URN may also be called a PID hash. Another example is to use an shash value to locate a private key.

After an encryption key is located for an identified user, device, or application, the encryption key is used to encrypt the master key that was used to encrypt the one, or more sessions keys used to encrypt information. A master key encryption key may be a symmetric key generated from random data. A master key encryption key may be a symmetric key generated from sinfo data combined with a user password. A master key encryption key may be a public key matching to a private key belong to a user, device, or application. A public key may be constructed using the X.509 or OpenPGP asymmetric public/private key formats.

If a smartkey holds more than one master key, this master key encryption process may be repeated to encrypt each master key. If more than one encryption key is located, the master key encryption process may be repeated using each located key to encrypt each master key of the smartkey.

A smartkey is constructed by combining the encrypted master keys along with the identity information of the users, devices, or applications that may decrypt the encrypted master key needed to decrypt each session key needed to decrypt file formation.

Smartkeys may be stored directory on a user's local computing machine. In this case when a key is needed for encryption or decryption operations, the key does not need to be retrieved from a Key Provider. One method of storing a smartkey on a users's local machine is to place the smartkey into a file. Other methods of storing smartkeys may be used.

Storage of smartkeys may occur on a Key Provider that provides smartkeys. Smartkeys may be stored as files on a Key Provider. Smartkeys may alternatively be stored as records in a database management system (DBMS) on a Key Provider that provides a DBMS for storing keys.

Smartkeys may be located on a user's local computing machine. In this case when a key is needed for encryption or decryption operations, the key does not need to be retrieved from a Key Provider. Other methods of storing smartkeys may be used.

A team key that may be placed within a smartkey defines a set of users, devices, or applications, collectively members, that may use the smartkey for encryption or decryption operations.

In one example of using a smartkey to encrypt information, a first user of a device that is commonly referred to as a smartphone, opens a first encryption application that is present on the device. Another example of a device is a laptop or PC computer. Other computing devices may be used. Using the first encryption application, the first user will choose a Key Provider from a list of Key Providers known to the first encryption application. The first encryption application will present a list of known Key Providers. The first user selects a Key Provider from the list. This selection will initiate a prompt to the use to authenticate to the Key Provider. The first user will authenticate to the Key Provider using either a public login or enterprise login.

After authentication is complete, the Key Provider will automatically read all of the smartkeys it manages that can be used by the authenticated user as indicated in the access control characteristics contained in smartkey. A data object for each smartkey will be automatically transferred to the encryption application. A data object for a smartkey includes all of the characteristics of the smartkey.

After receiving the one, or more smartkey data objects from the Key Provider, the first user will select an unencrypted file for encryption from the set of files present on the device of the user. Additional files may be selected for encryption.

Next the first encryption application will present the first user with a list of the smartkeys received from the Key Provider. One or more of the characteristics of each smartkey will appear in the list to facilitate the first user in selecting a smartkey for the encryption operation on the file. For example, the name of the smartkey may appear in the list. The expiration information may appear in the list, Other information from the smartkey characteristics may appear in the list. The first user will select a smartkey from the list. More than one smartkey may be selected from the list.

In another embodiment, the encryption application does not present the user with a list of smartkeys. In this embodiment, the encryption application automatically encrypts and decrypts information using a smartkey returned for the user by the Key Provider after the user is authenticated. The Key Provider may use information about the authenticated user's identity to find the smartkey to return for the user. In one method the email address of the user is used to determine the smartkey for the user. Other information may be used to identify the authenticate user, such as name, employee ID or other values about a user. Using the information used to identify the user, the smartkey having the first owner information matching to the identity information used to identify the user will be returned by the Key Provider.

Next the encryption application will require no further input from the first user and will begin the automatic encryption operation by reading the characteristics of the selected smartkey. Information about the encryption algorithm, key size and encryption key will be read. Each PID or PID with URN for which a PID or PID URN characteristic exists in the smartkey data object will be read. The public key encryption will be read from each PID or PID with URN present in the data object.

Next the first encryption application will use a key generation function to receive a session key of a size matching to the key size and algorithm information read from the smartkey data object. Using the session key, the first encryption application may use an encryption algorithm function that uses an encryption algorithm matching to the encryption algorithm read from the access control characteristic of the smartkey data object. The encryption algorithm function will encrypt the file data to create an encrypted copy of the file data. The encrypted copy of the file data is placed into a .ZIP file.

Next, a key generation function is used to create a master key. Using the master key, the first encryption application may use an encryption algorithm function that uses an encryption algorithm matching to the encryption algorithm read from the access control characteristic of the smartkey data object. The encryption algorithm function will encrypt the session key. The encrypted session key is placed into a .ZIP file.

Next, a first public key from a first PID or PID with URN of a first users read from the smartkey data object is used to encrypt the master key to create a first encrypted master key for a first user. A second public key from a second PID or PID with URN of a second user read from the smartkey data object is used to encrypt the master key to create a second encrypted master key for a second user. Using the first encrypted master key, the encryption application creates a first encrypted master key characteristic and writes the first encrypted master key characteristic to the smartkey data object in the memory of the first device updating the characteristics of the smartkey. Using the second encrypted master key, the encryption application writes the second encrypted master key characteristic to the smartkey data object in the memory of the first device updating the characteristics of the smartkey. The encryption application sends the updated smartkey data object to the Key Provider where it is saved until it requested again by an encryption or decryption application. Next, the encryption application will create a first Key Provider Record as described later in this document. Information about the Key Provider is placed into the first Key Provider Record. This information may include a name or IP address of the Key Provider, or a name of the smartkey. Other information about the Key Provider may be included. The first Key Provider Record is placed into the .ZIP file.

The first user may be informed using a message presented by the first encryption application to the first user that the requested automatic encryption of the selected file has completed. The first user may then deliver the .ZIP file containing the encrypted file data to a second user. The .ZIP file may be delivered by any method such as FTP, email, DVD, Other methods may be used to deliver a .ZIP file to a second user.

A second user receiving the .ZIP file on a second device opens a decryption application to open and decrypt the encrypted file. The decryption application will open and read the .ZIP file according the ZIP specification. The encryption application will read the Key Provider Record for a first file placed by the first encryption application.

Using the Key Provider Record, the decryption application will read a first Key Provider Record present in the .ZIP file. Using the Key Provider information read from a first Key Provider Record the decryption application will identify a Key Provider and a smartkey to request from the Key Provider. Using a public login or an enterprise login for the second user, the decryption application will connect to the Key Provider After authentication is complete, the Key Provider will read all of the smartkeys it manages that can be used by the authenticated second user as indicated in the access control characteristics contained in each smartkey. A data object for a first smartkey will be transferred to the decryption application. A data object for a first smartkey include all of the characteristics of the first smartkey. A data object for a second smartkey will be transferred to the decryption application. A data object for a second smartkey include all of the characteristics of the first smartkey.

Using the name/label of a smartkey contained in a first Key Provider Record in the .ZIP file, the decryption application reads the set of smartkey data objects received from a Key Provider. The smartkey matching to the label read from the Key Provider Record will match to a first or a second smartkey data object received from the Key Provider. The matching smartkey data object contains the updated characteristics of a smartkey data object sent to the Key Provider by the encryption application.

The decryption application may prompt the user to enter a decryption password to decrypt an encrypted private key contained in a SID or SID with shash characteristic. After decrypting the private key, the decrypted private key may be used to decrypt an encrypted master key from a first encrypted master key characteristic in the smartkey data object. If a first encrypted master key cannot be decrypted using the private key, the second encrypted master key will be decrypted. Alternatively, a second user may already have a decrypted copy of the private key on the device that may be used to decrypt a first or a second encrypted master key.

Next the decryption application reads the encrypted session key information from the .ZIP file. Using the decrypted master key, the decryption application decrypts the session key. Using the decrypted session key, the decryption application will decrypt the encrypted file.

The order of the steps to encrypt and decrypt a file using a smartkey and a Key Provider may be changed. Other steps may be use that use information from other characteristics of a smartkey or other information in a Key Provider Record.

Figure 10:
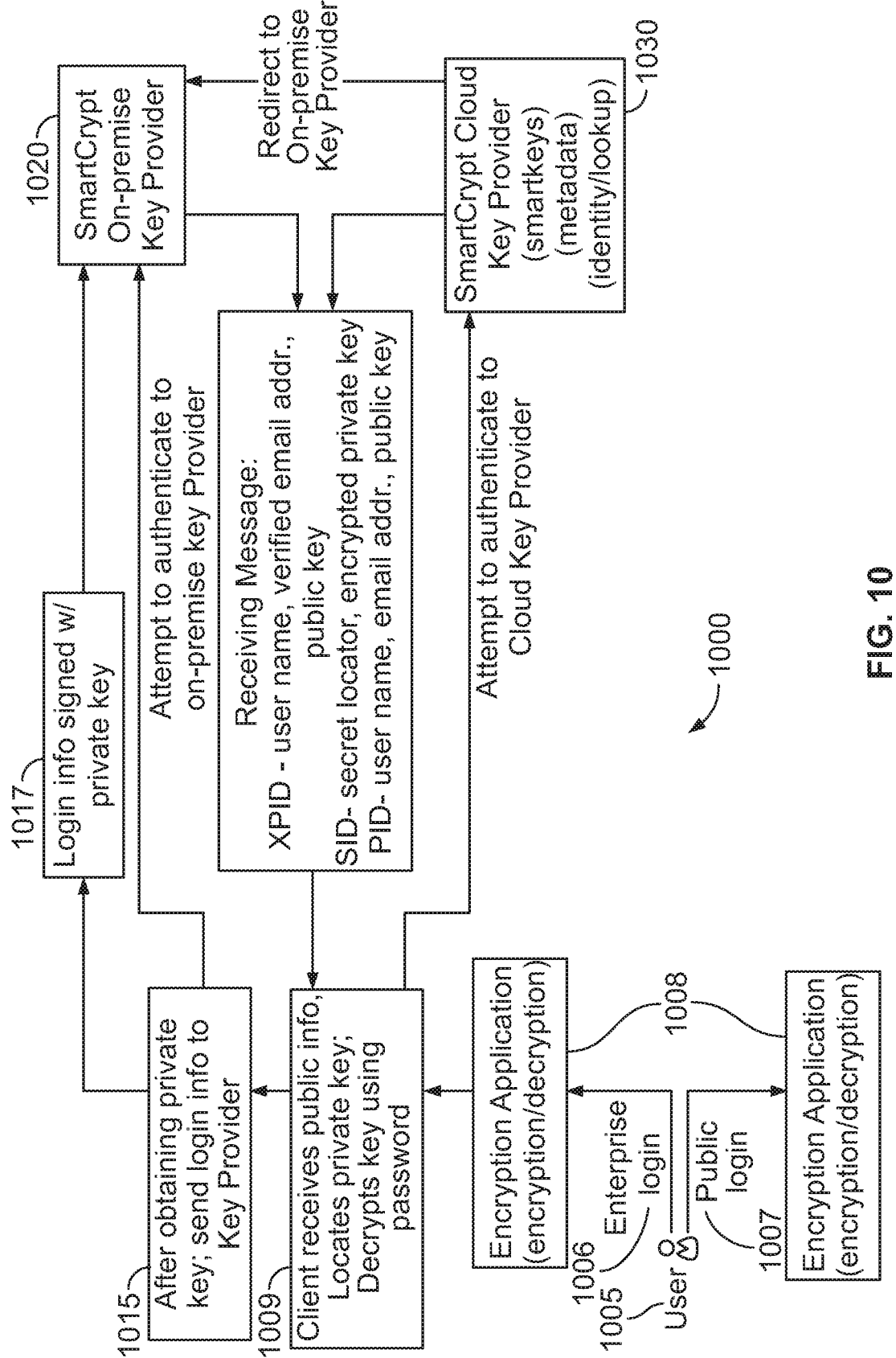
FIG. 10 illustrates a flowchart of a method for key provider authentication using the Smartkey Information Management System of FIG. 1.

FIG. 10 illustrates a flowchart 1000 of a method for key provider authentication using the Smartkey Information Management System 100 of FIG. 1. First, a user 1005 determines whether to perform a public login 1007 or an enterprise login 1006. When the user 1005 performs a public login, access is provided to the encryption/decryption application 1008, but the user may not directly access keys from an on-premises Key Provider that may be available to the user when choosing an enterprise login.

Conversely, when the user 1005 performs an enterprise login 1006 access is provided to the encryption/decryption application 1008 and a number of actions proceed automatically. First, at step 1009, the local client (encryption/decryption application) received from the user 1005 public info, such as a public key. The encryption/decryption application 1008 then locates the corresponding private key and decrypts the key using a password received from the user. Next, at step 1015, after obtaining the private key, the encryption/decryption application 1008 uses the private key to sign the login information (such as a password) sends the signed login information 1017 to the on-premises key provider 1020. The signed login information 1017 is stored on the on-premises key provider as a verification that user is allowed access to keys.

Next the encryption/decryption application 1008 attempts to authenticate the private key with one or more of the on-premises key provider 1020 and a cloud-based key provider 1030. If the private key is authenticated a message is sent from either the on-premises key provider 1020 or the cloud-based key provider 1030 to the encryption/decryption application 1008. The message includes an XPID composed of one or more of the user name, verified user e-mail address, and the user's public key. The message also includes a SID composed of one or more of a private key locator and an encrypted private key. Alternatively, the message may include a PID composed of the user's name, the user's e-mail address, and a public key.

Figure 11:
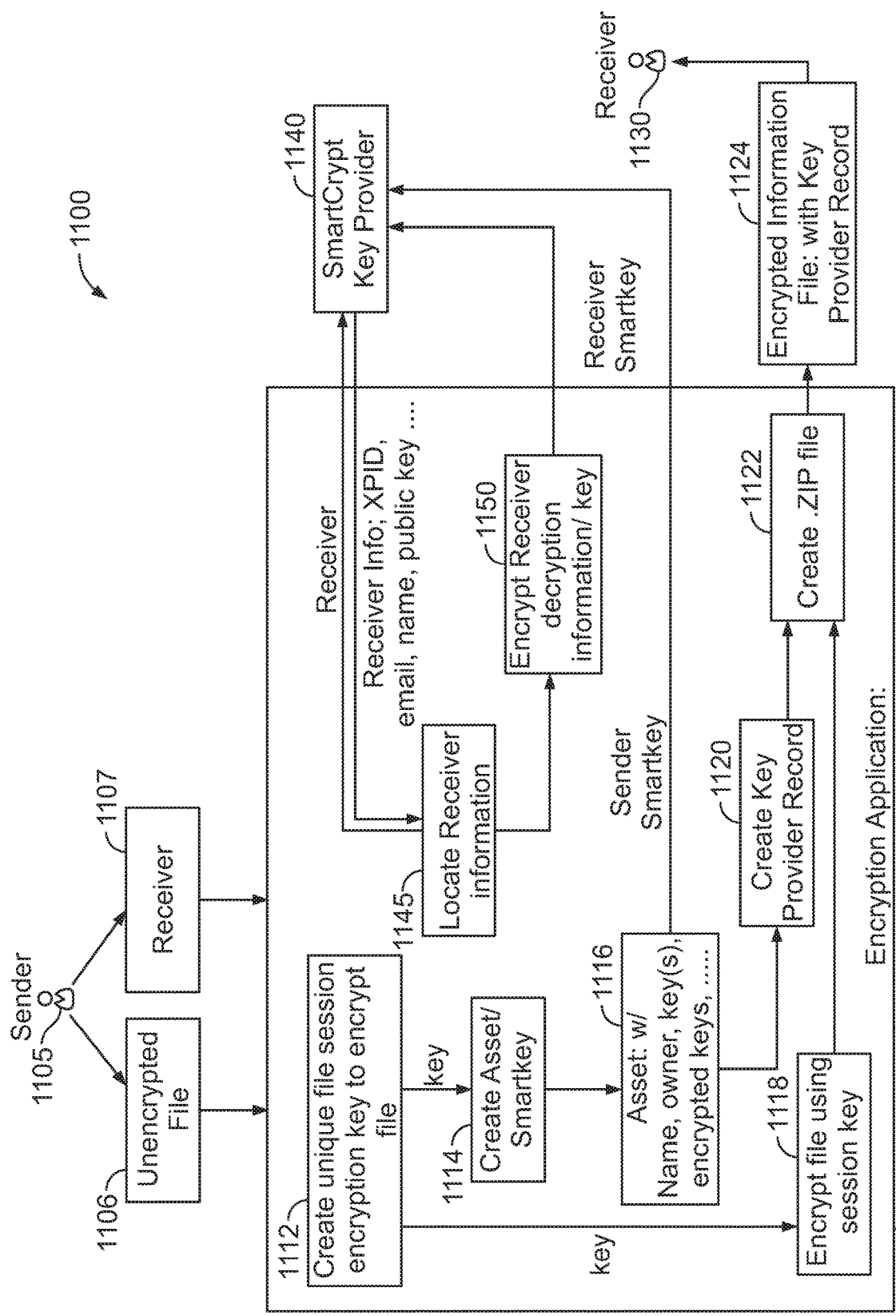
FIG. 11 illustrates a flowchart of a method for encrypting a file using an embodiment of the present invention.

FIG. 11 illustrates a flowchart 1100 of a method for encrypting a file using an embodiment of the present invention. First, a sender 1105 passes an unencrypted file 1106 and a receiver identification 1107 to the encryption/decryption application 1110. The encryption/decryption application 1110 then creates a unique file session encryption key to encrypt the file at step 1112. At step 1114, the file session encryption key is used to create an asset. The type of asset created is a smartkey. In one embodiment, the terms asset and smartkey may be used as interchangeable terms for the same object. Next, at step 1116, the smartkey data structure is populated with information including the sender's name, one or more of the sender's public keys and/or one or more private keys. Also, at step 1118, the encryption/decryption application 1110 encrypts the unencrypted file 1106 using the session key. Next, sat step 1120, the smartkey information is used to create a key provider record as further described herein. Then, at step 1122, the key provider record and the encrypted file are placed into a data archive or data structure such as a .ZIP file. Next, at step 1124, the .ZIP file including the encrypted file and the key provider record are transmitted to the receiver 1130.

Additionally, once the encryption/decryption application 1110 creates the asset, the asset is transmitted to a key provider 1140, such as a cloud-based key provider. The key provider 1140 then transmits receiver information such as XPID, e-mail, name, and/or public key to the encryption/decryption application 1110 at step 1145. The encryption/decryption application 1110 then encrypts the receiver decryption information key at step 1150 to form a receiver smartkey 1150 which is transmitted to the key provider 1140 for storage and later retrieval by the receiver 1130 when decrypting the encrypted file.

Figure 12:
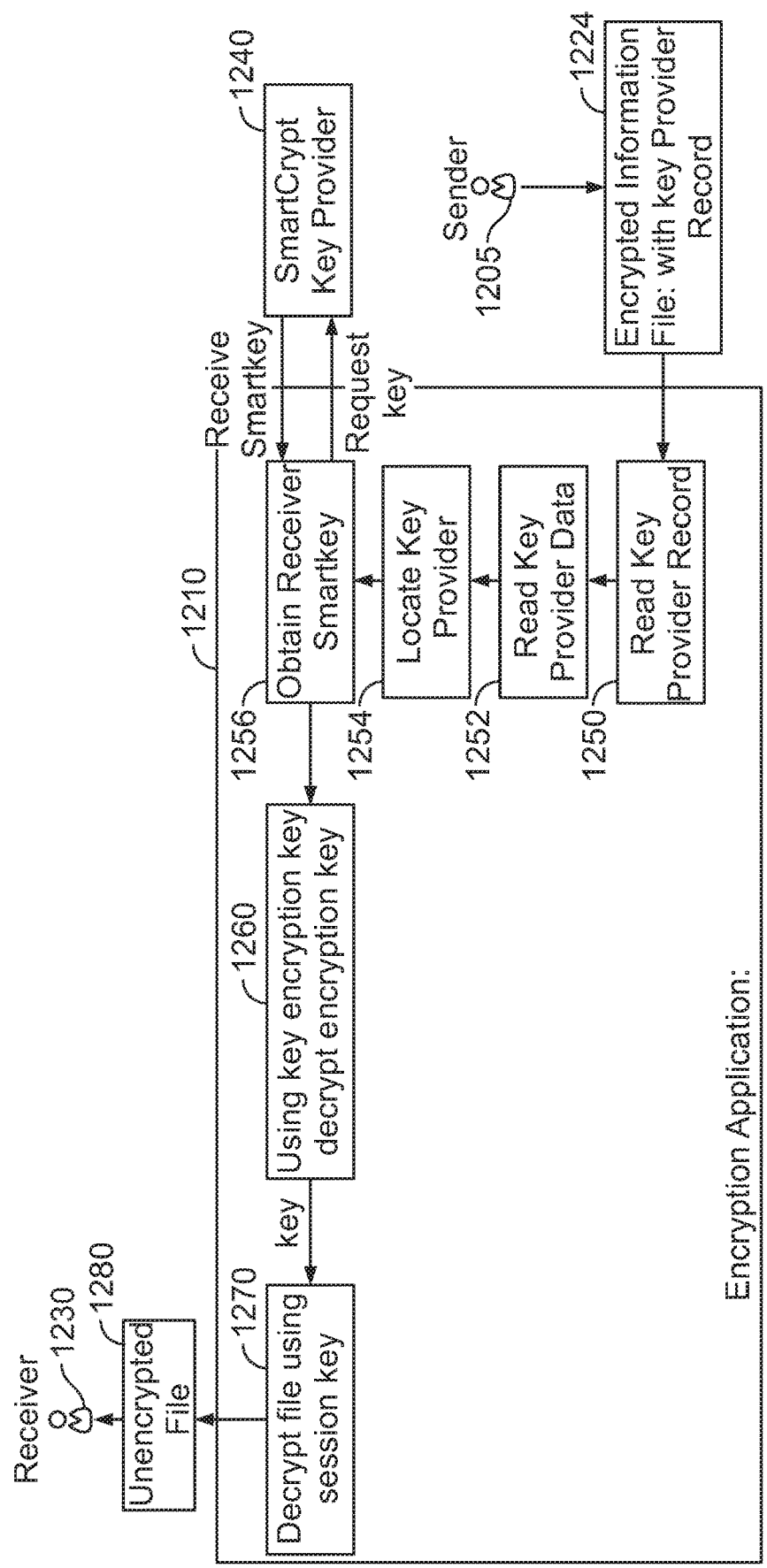
FIG. 12 illustrates a flowchart of a method for decrypting a file using an embodiment of the present invention.

FIG. 12 illustrates a flowchart 1200 of a method for decrypting a file using an embodiment of the present invention. In FIG. 12, a sender 1205 transmits a data archive such as a .ZIP archive to the encryption/decryption application 1210 of a receiver 1230 at step 1224. The .ZIP file includes an encrypted file and a key provider record. Next, at step 1250, the encryption/decryption application 1210 reads the key provider record. Then, at step 1252, the encryption/decryption application 1210 reads the key provider data. Next, at step 1254, the encryption/decryption application 1210 locates the key provider and requests and receives a smartkey. At step 1256, the encryption/decryption application 1210 sends a request to the key provider 1240 for the receiver's smartkey and then receives that smartkey from the key provider 1240. Then, at step 1260, the encryption/decryption application 1210 uses a key encryption key included in the receiver smartkey to decrypt the session key that is included in the key provider record. Finally, at step 1270, the decrypted session key is used to decrypt the encrypted file. The resulting unencrypted file 1280 is then passed to the receiver 1230.

Figure 13:
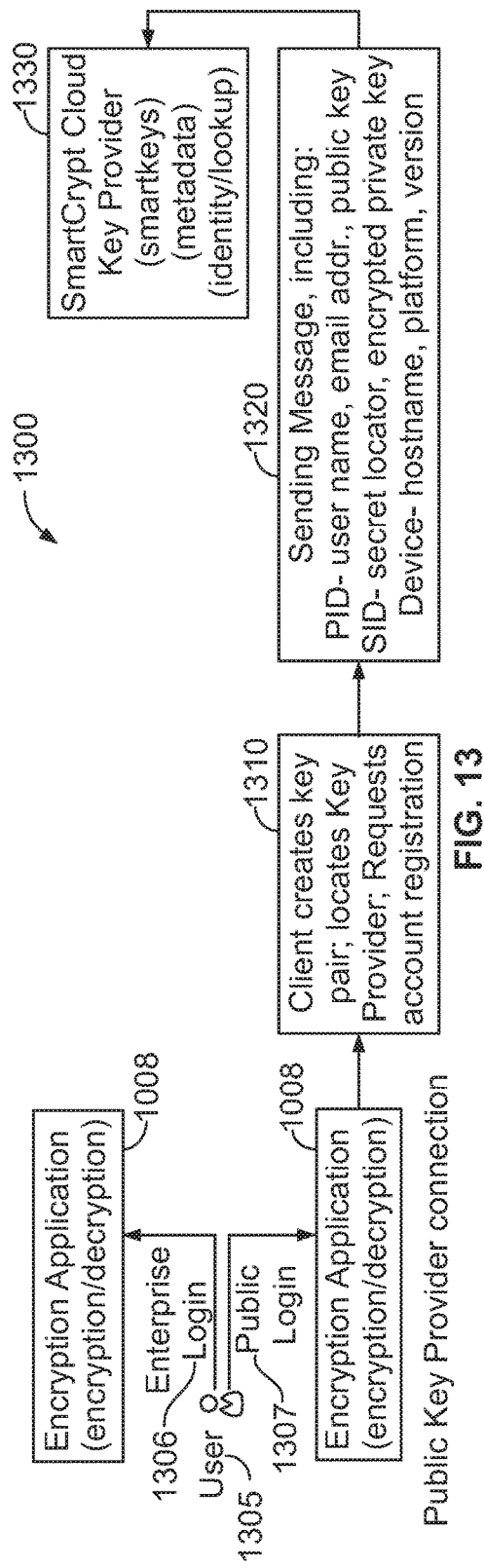
FIG. 13 illustrates a flowchart of a method for key provider authentication using the Smartkey Information Management System of FIG. 1.

FIG. 13 illustrates a flowchart 1300 of a method for key provider authentication using the Smartkey Information Management System 100 of FIG. 1. First, a user 1305 determines whether to perform a public login 1307 or an enterprise login 1306. When the user 1305 performs an enterprise login, access is provided to the encryption/decryption application 1008, and the actions described in FIG. 10 automatically take place.

Conversely, when the user 1305 performs a public login 1307, if the user has not previously accessed the Key Provider 1330, the user is automatically prompted to register an account at step 1310 that may be used to authenticate to the Key Provider 1330 and a key pair is automatically created for the user to encrypt and decrypt keys used for encryption and decryption operations. User information such as email address, unique device identifier and other information about the user and the key pair are sent at step 1320 to the Key Provider 1330 to establish authenticated access for the user.

Figure 14:
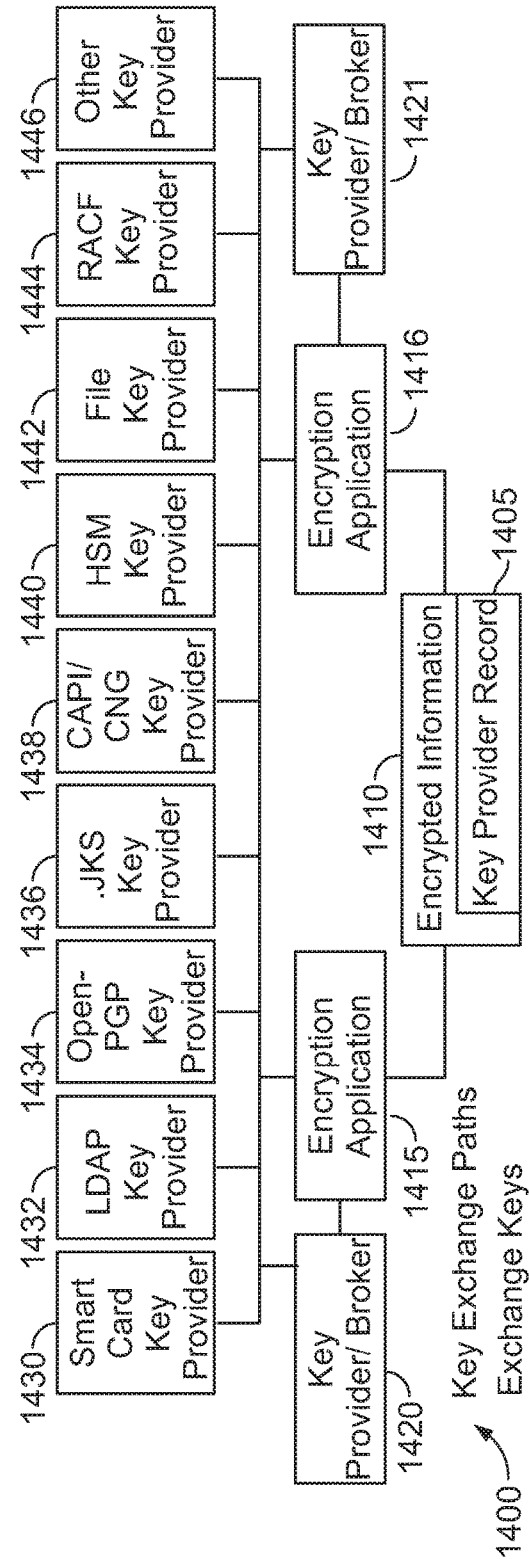
FIG. 14 illustrates a chart of several exemplary key exchange paths for exchanging one or more Smartkeys according to an embodiment of the present invention.

FIG. 14 illustrates a chart 1400 of several exemplary key exchange paths for exchanging one or more Smartkeys according to an embodiment of the present invention. As shown in FIG. 14, a key provider record may be stored in any of a large number of exemplary storage systems and/or formats. For example, the key provider record may be stored at the smart card key provider 1430 using a storage method such as (such as .PFX, .P7B, PID, SID), or at a Lightweight Directory Access Protocol (LDAP) key provider 1432, an OpenPGP Key Provider 1434, a Java Keystores (.JKS) Key Provider 1436, a Microsoft Cryptographic API (CAPI), Microsoft Cryptography API Next Generation (CNG) Key provider 1438, a Hardware Security Module (HSM) Key Provider 1440, a File Key Provider 1442, an IBM Resource Access Control Facility (RACF) Key Provider 1444, or an Other Key Provider 1446.

A SmartKey that is located in any of the Key Providers 1430-1446 may be transmitted to the Key Provider Brokers 1420, 1421 or the encryption/decryption applications 1415, 1416. Similarly, the Key Providers 1430-1446 may receive and store SmartKeys received from the Key Provider Brokers 1420, 1421 or the encryption/decryption applications 1415, 1416.

Additionally, when the encryption/decryption applications 1415, 1416 encrypt information, the encrypted information 1410 may include a Key Provider Record 1405. The Key Provider Record 1405 may include a URN that may identify the location of a SmartKey on any of the Key Providers 1430-1446.

Figure 15:
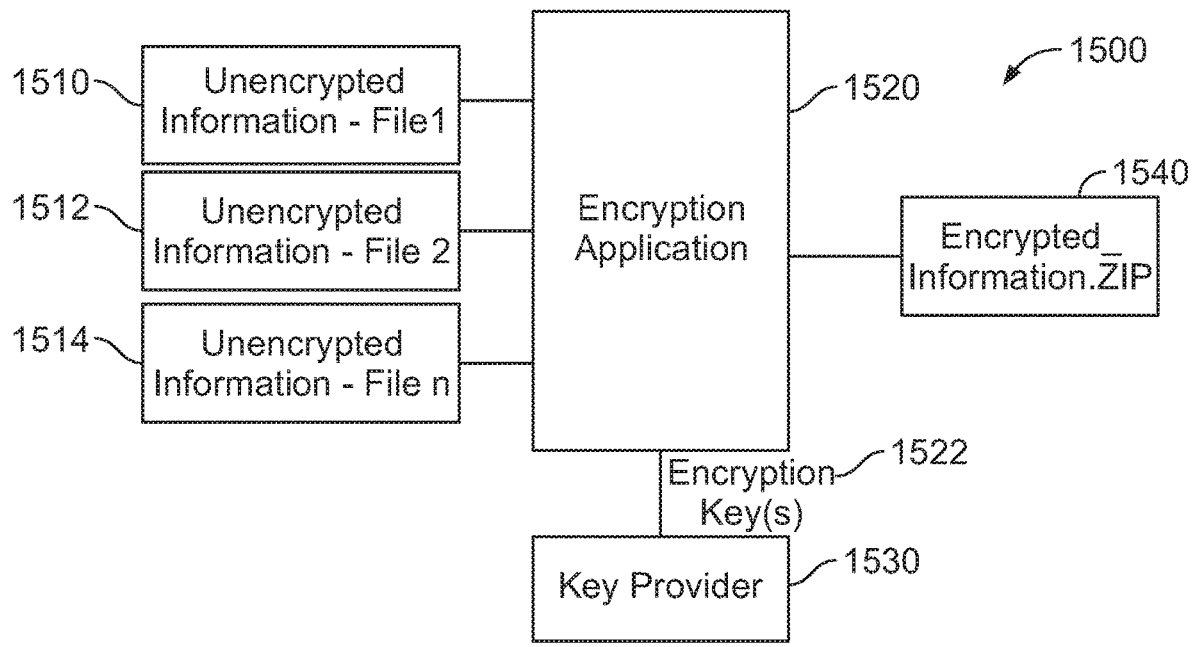
FIG. 15 illustrates a system for creating encrypted information using the .ZIP encrypted file format according to an embodiment of the present invention.

FIG. 15 illustrates a system 1500 for creating encrypted information using the .ZIP encrypted file format according to an embodiment of the present invention. As shown in FIG. 15, one or more files of unencrypted information 1510, 1512, 1514 are passed to an encryption application 1520. The encryption application 1520 also received one or more encryption keys 1522 from a key provider 1530. As further discussed herein, the encryption application 1520 uses the encryption keys to encrypt the one or more files of unencrypted information 1510, 1512, 1514 into a single .ZIP data archive 1540 including the filed in encrypted form.

Figure 16:
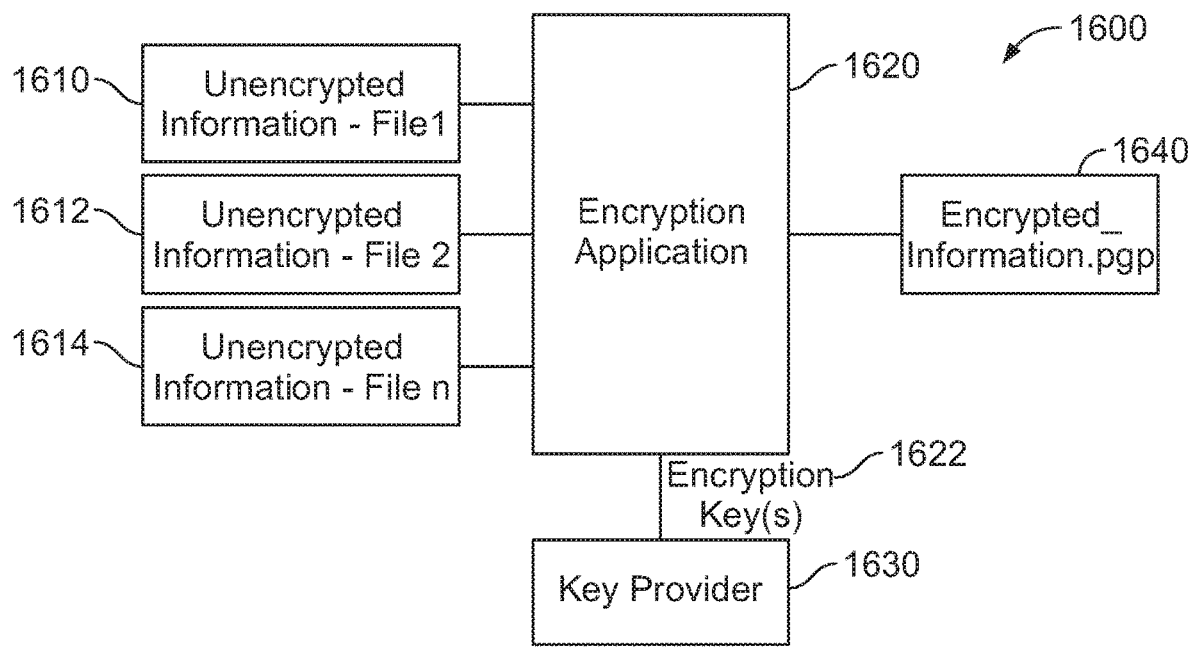
FIG. 16 illustrates a system for creating encrypted information using the OpenPGP encrypted file format according to an embodiment of the present invention.

FIG. 16 illustrates a system 1600 for creating encrypted information using the OpenPGP encrypted file format according to an embodiment of the present invention. As shown in FIG. 16, one or more files of unencrypted information 1610, 1612, 1614 are passed to an encryption application 1620. The encryption application 1620 also received one or more encryption keys 1622 from a key provider 1630. As further discussed herein, the encryption application 1620 uses the encryption keys to encrypt the one or more files of unencrypted information 1610, 1612, 1614 into a single OpenPGP data archive 1640 including the filed in encrypted form.

Figure 17:
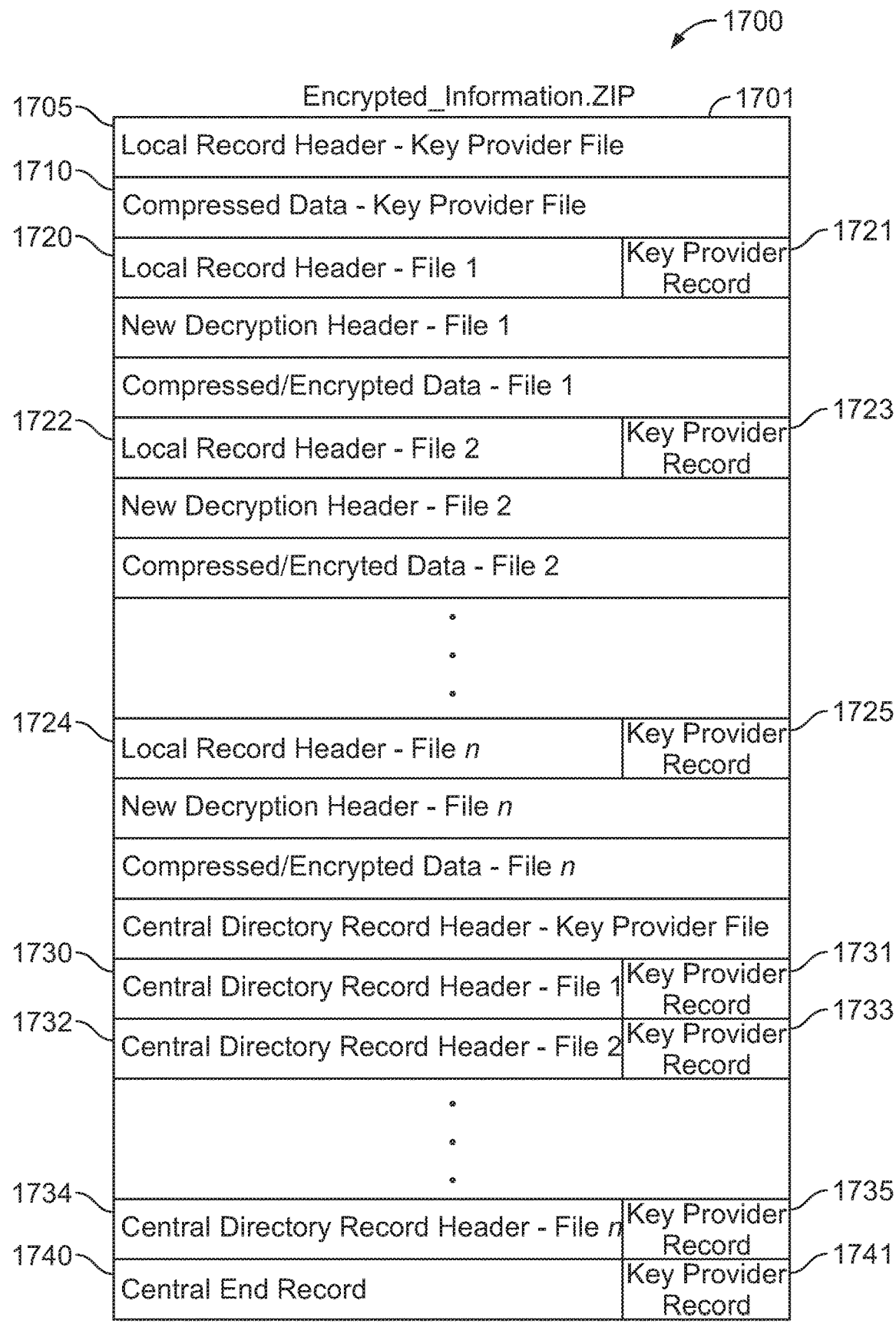
FIG. 17 illustrates an embodiment of a .ZIP archive including one or more Key Provider Records.

FIG. 17 illustrates an embodiment of a .ZIP archive 1701 including one or more Key Provider Records. As shown in FIG. 17, the .ZIP archive 1701 includes a local record header 1705 and compressed data 1710 each of which may include a key provider file. The key provider file may include information pertaining to a key provider, such as a URN including information that may be used to locate the key provider. The .ZIP archive 1701 also includes one or more local record headers 1720, 1722, 1724 for files that have been placed in the .ZIP archive, each of which may include a key provider record 1721, 1723, 1725. The key provider records 1721, 1723, 1725 may include information pertaining to a key provider, such as a URN including information that may be used to locate the key provider. The .ZIP archive 1701 also includes one or more central directory record headers 1730, 1732, 1734 for the files identified by the one or more local record headers 1720, 1722, 1724. The central directory record headers 1730, 1732, 1734 may also include a key provider record 1731, 1733, 1735 that operates as described above. Finally, the .ZIP archive 1701 also includes a central end record 1740 which may also include a key provider record 1741, which may operate as described above.

Figure 18:
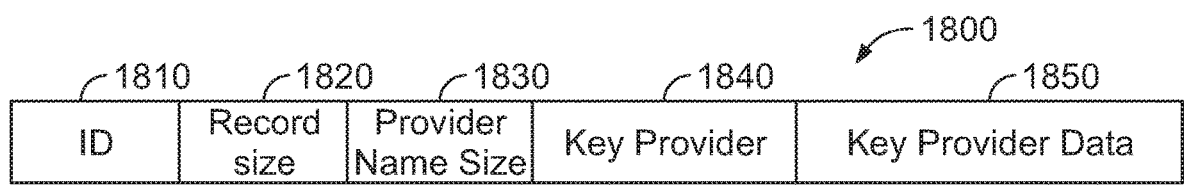
FIG. 18 illustrates an exemplary key provider record in byte or binary format.

FIG. 18 illustrates an exemplary key provider record 1800 in byte or binary format. As shown in FIG. 18, the key provider record 1800 includes an ID 1810, a record size 1820, a provider name size 1830, a Key Provider Name 1840, and Key Provider Data 1850. The ID 1810 may be a unique ID that is used to individually identify the key provider record 1800. The record size 1820 is an indication of the total size of the key provider record, expressed in bits or bytes. The provider name size 1830 provides an indication of the size of the provider name 1840 expressed in bits or bytes. The Key Provider Name 1840 includes an identification of the name of the key provider. The Key Provider Name may be a unique identifier that is used to identify a specific Key Provider. The Key Provider Data 1850 may be a URN that includes network address information that allows a network connection to be established with the key provider identified by the Key Provider Name 1840.

Figure 19:
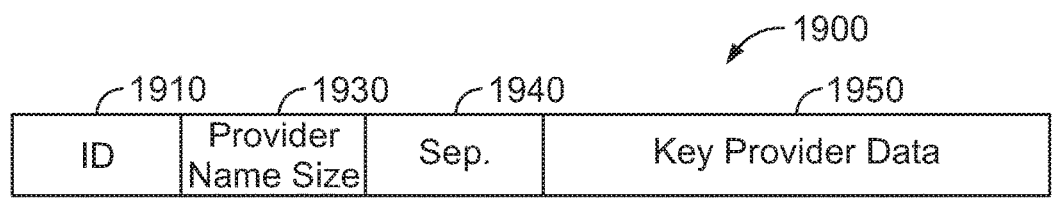
FIG. 19 is an exemplary key provider record when the key provider record is expressed in a text character format.

FIG. 19 is an exemplary key provider record 1900 when the key provider record is expressed in a text character format. As shown in FIG. 19, the key provider record 1900 includes an ID 1910, a provider name size 1930, a Key Provider Name 1940, and Key Provider Data 1950, all of which operate similarly to those described above in FIG. 18.

Figure 20:
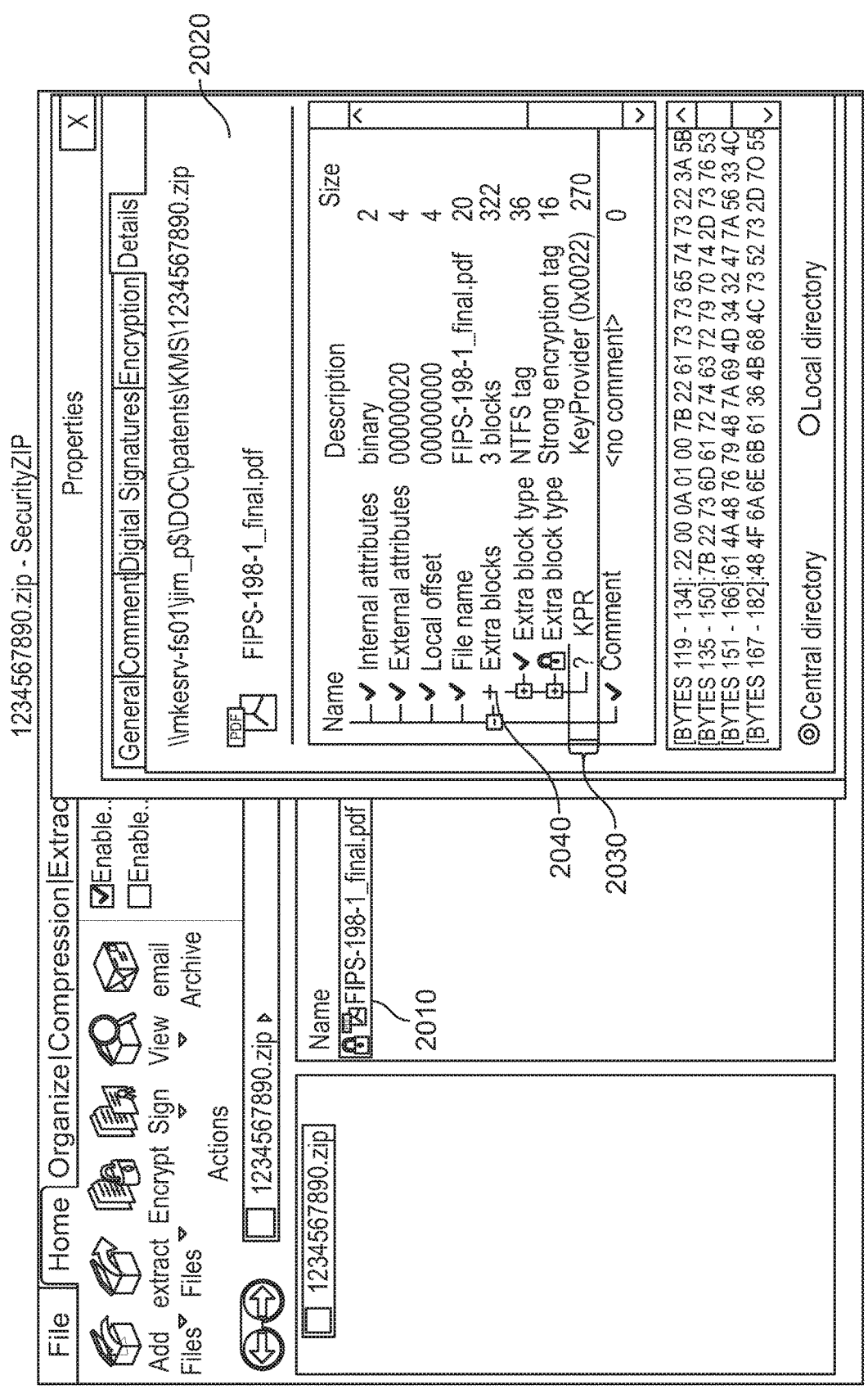
FIG. 20 illustrates an exemplary .ZIP archive file view of a Key Provider Record located in the central directory header.

FIG. 20 illustrates an exemplary .ZIP archive file view 2020 of a Key Provider Record located in the central directory header. As shown in FIG. 20, a .ZIP archive 2010 may be caused to display a file view 2020 by displaying the properties of the .ZIP archive 2010. The file view 2020 displays several file components of the central directory of the .ZIP archive 2010 including a Key Provider Record (KPR) 2030, as well as a description of the Key Provider Record and the size of the Key Provider Record. The Key Provider Record 2030 can be seen to be located in the extra blocks section 2040 of the central directory.

Figure 21:
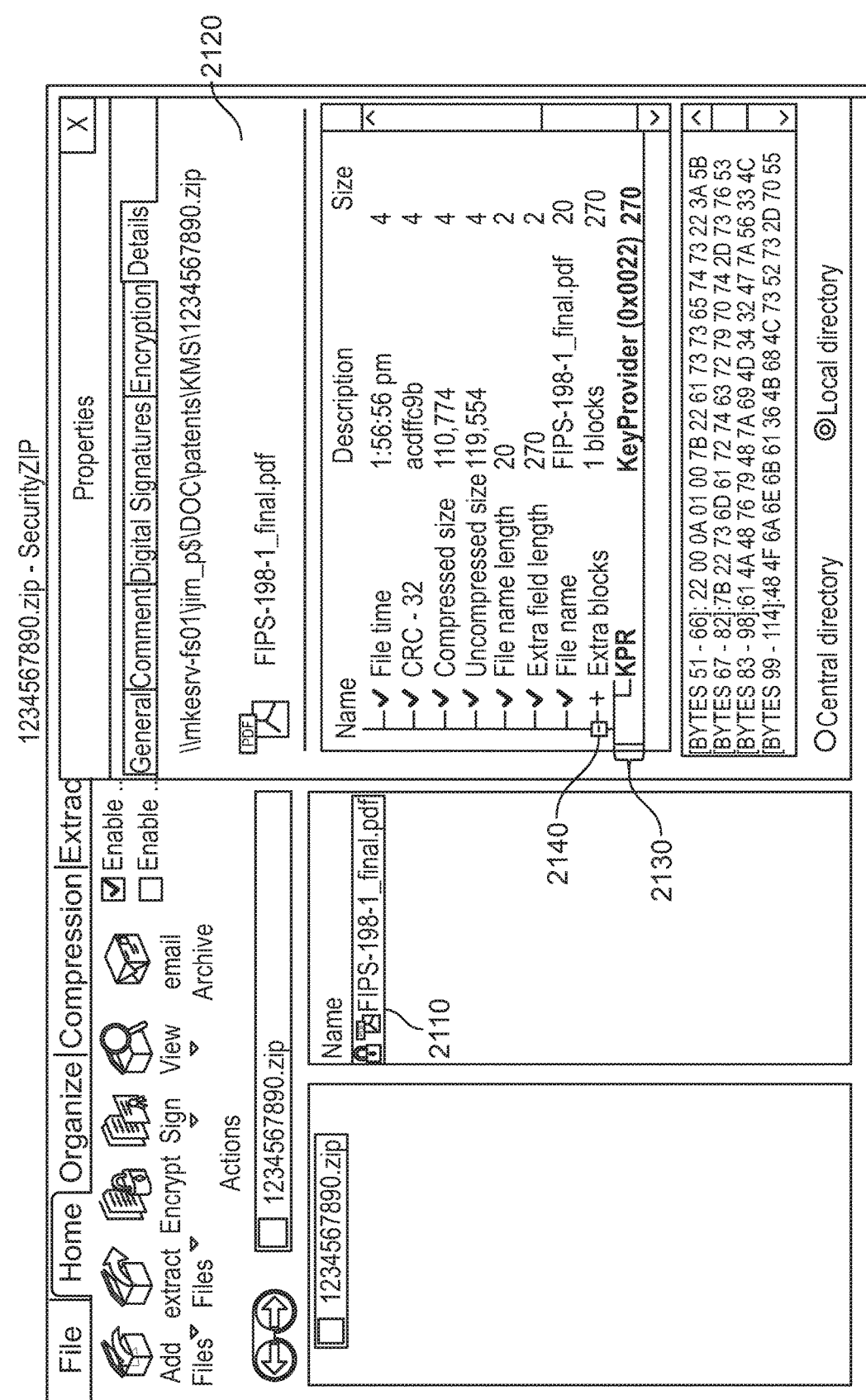
FIG. 21 illustrates an exemplary .ZIP archive file view of a Key Provider Record located in a local directory header.

FIG. 21 illustrates an exemplary .ZIP archive file view 2120 of a Key Provider Record located in a local directory header. As shown in FIG. 21, a .ZIP archive 2110 may be caused to display a file view 2120 by displaying the properties of the .ZIP archive 2110. The file view 2120 displays several file components of the local directory of the .ZIP archive 2110 including a Key Provider Record (KPR) 2130, as well as a description of the Key Provider Record and the size of the Key Provider Record. The Key Provider Record 2130 can be seen to be located in the extra blocks section 2140 of the local directory.

Figure 22:
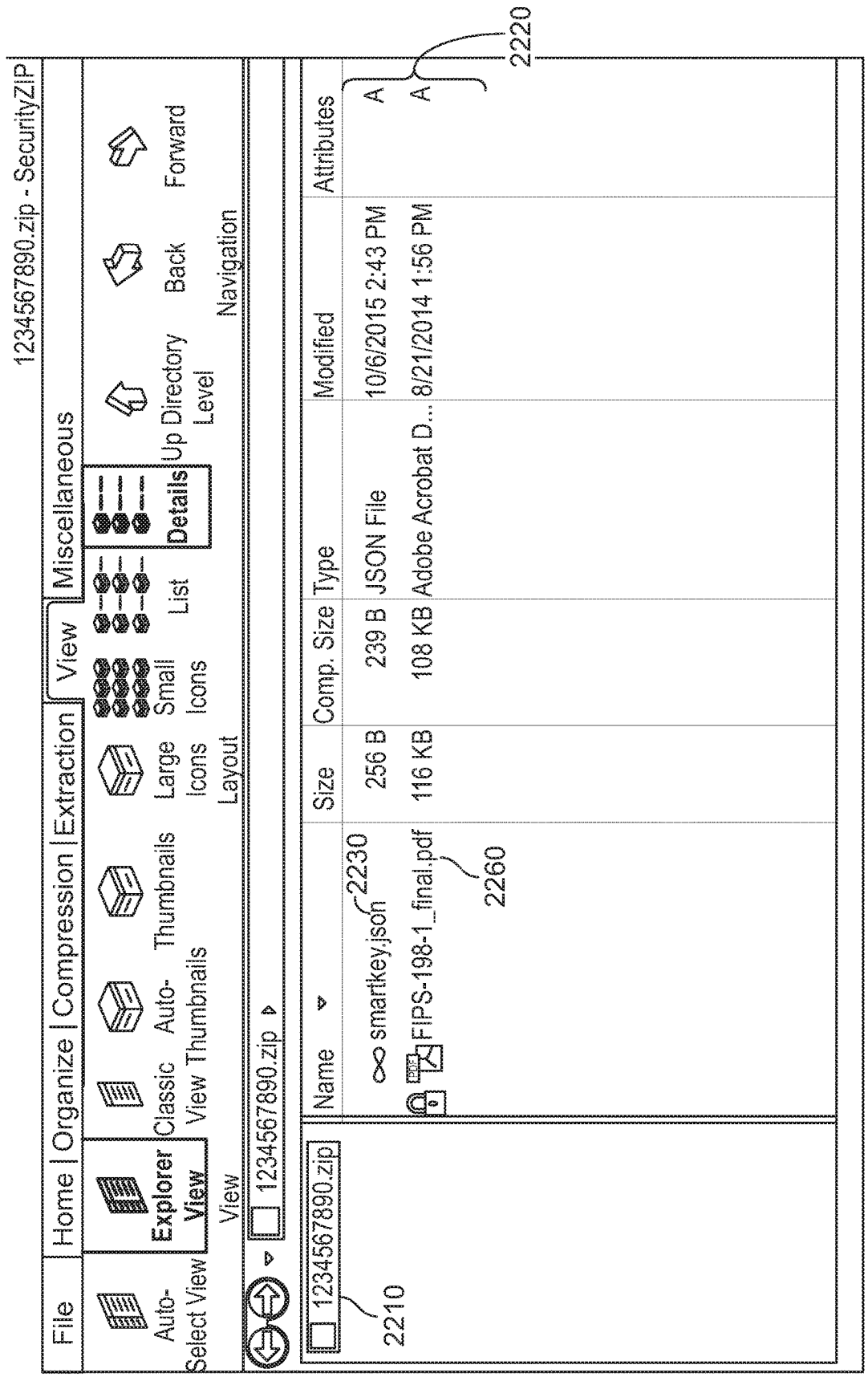
FIG. 22 illustrates an exemplary .ZIP archive file view of a Key Provider Record located in the file listing of the .ZIP archive.

FIG. 22 illustrates an exemplary .ZIP archive file view of a Key Provider Record located in the file listing 2220 of the .ZIP archive 2210. As shown in FIG. 22, the file listing 2200 includes an encrypted file 2260 and a .json file 2230 including the Key Provider Record.

FIG. 23 illustrates an exemplary .ZIP file view of a Key Provider Record 2300 located in the end of the central directory header. As shown in FIG. 23, the Key Provider record may be stored and displayed in text character format.

FIG. 24 illustrates a binary embodiment of a Key Provider Record.

As additional examples, a sample Key Provider Record for a Key Provider may be expressed in text characters as:

{"assets":[{"smartcrypt-svSaJHvyHziM42GzV3LHOjnka6KhLsRs-pUmHz6HxCW9xUSIyEJOu3PQ4JIk=:1":"V7-46204d5bd05034505b631b8ca6b8277d764b1ed cc37b329ae52160b93d089694ce339cbb2 2be55050085b460121372d881f24d5373166c7b bd2b60c256feae48"}],"owner":"pUmHz6 HxCW9xUSIyEJOu3PQ4JIk="} or as:

@safenet=aeskey1

Additionally, an exemplary Key provider Data name:value pair may be:

{"type":["type-value"],"owner":"owner-value"}

An exemplary Key Provider Data format for a key provider expressed in text characters may be:

{"Type":[{"array of Type-values"}],"owner":"owner-value"}
{"key-encrypting-key-ID":"version":"encrypted-encryption-key"}

Figure 25:
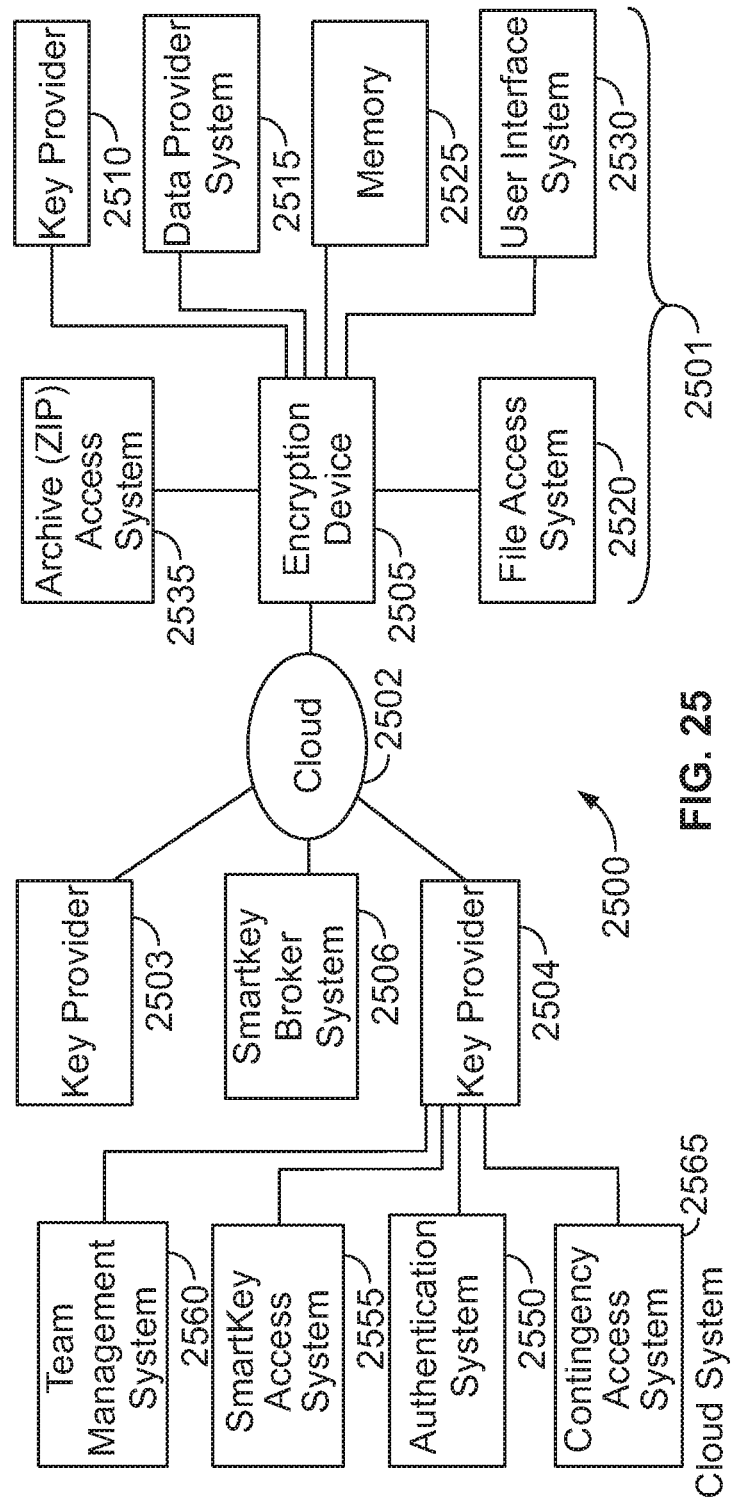
FIG. 25 illustrates a cloud-based embodiment of a Smartkey management system.

FIG. 25 illustrates a cloud-based embodiment 2500 of a Smartkey management system. FIG. 25 shows a local system 2501, a cloud system 2502, a first key provider 2503, a second key provider 2504, and a smartkey broker system 2506. The local system 2501 includes an encryption/decryption device 2505, a local key provider 2510, a data provider system 2515, a file access system 2520, a memory 2525, a user interface system 2530, and a data archive access system 2535, which may be a .ZIP access system. The local system 2501 is further detailed below in FIG. 26.

The second key provider 2504 includes an authentication system 2550, a smartkey access system 2555, a team management system 2560, and a contingency access system 2565. The key provider 2504 is further detailed below in FIG. 31. The team management system 2560 is further detailed in FIG. 32. The contingency access system 2565 is further detailed below in FIG. 33. Additionally, the smartkey broker system 2506 is further detailed below in FIG. 34.

In operation, as described herein, the local system 2501 may operate similarly to the first enterprise system 110 of FIG. 1 to create and use smart keys. The second key provider 2504 may implement team-based smart keys and contingency smart keys. The smart key broker 2506 may serve as a broker between the first key provider 2503 and the second key provider 2504 to allow smart keys to be transferred between the key providers. Additionally, the operations may take place over a distributed network such as the internet, which may be implemented as a cloud system 2502.

Figure 26:
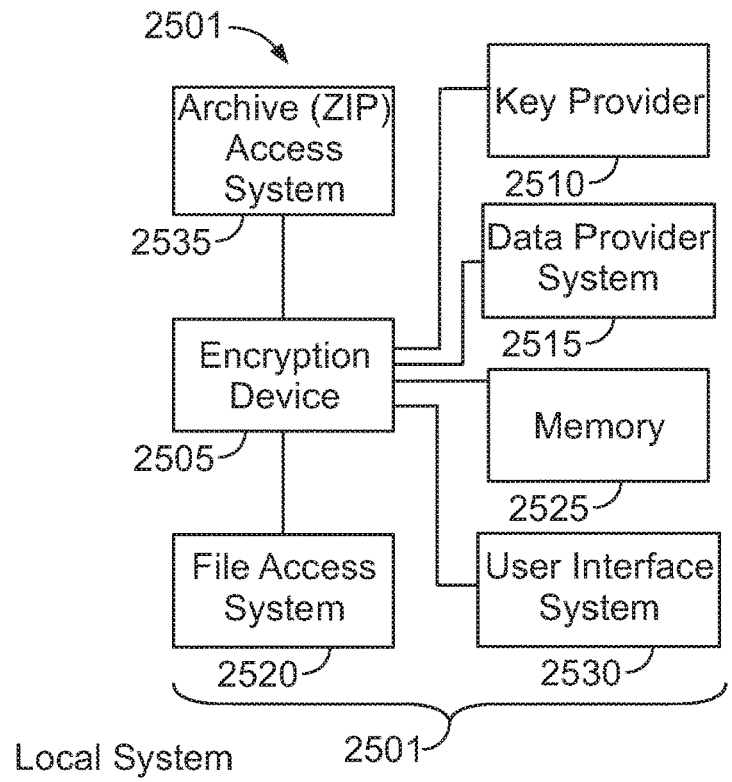
FIG. 26 illustrates the local system.

FIG. 26 illustrates the local system 2501. As described above, the local system 2501 includes an encryption/decryption device 2505, a key provider 2510, a data provider system 2515, a file access system 2520, a memory 2525, a user interface system 2530, and a data archive access system 2535, which may be a .ZIP access system.

In operation of the local control system 2501, a user may initiate interaction with the encryption/decryption device 2505 using the user interface system 2530, for example by logging in. The user may then seek to access a file that is locally stored in a data archive such as a .ZIP archive in the memory 2525 using the encryption/decryption device 2505. The encryption/decryption device 2505 may then use the file access system 2520 to locate the desired data archive in the memory 2525 and return the file to the encryption/decryption device 2505. The encryption/decryption device 2505 may then use the data archive access system 2535 to initiate interaction with the retrieved data archive. In one embodiment, the encryption/decryption device 2505 may determine that a locally stored key must be retrieved from the key provider 2510 in order to decrypt the data archive, and may then proceed to retrieve the key and decrypt the data archive to return the file. Alternatively, the encryption/decryption device 2505 may determine that it need further information from the data provider system 2515 in order to perform the decryption, such identity information of the local control system 2501, for example. This information may then be retrieved from the data provider system 2515 and provided to the encryption/decryption device 2505 in order to decrypt the data archive to retrieve the desired file.

Similarly, and as referenced above, when a smart key is created for a file, information may be received from the user interface system 2530, such as a password, and from the data provider system 2515, such as identity information for the local control system 2501. Additionally, the file itself may be retrieved from memory 2525 using the file access system 2520. Information retrieved from the user interface system 2530 and/or data provider system 2515 may be used by the encryption/decryption device 2505 to generate a smart key, which may then be stored in the key provider 2510. Additionally, a data archive may be created by the data archive access system 2535 which may include an encrypted version of the file as well as a key provider record that may allow for later identification and retrieval of the smart key.

Figure 27:
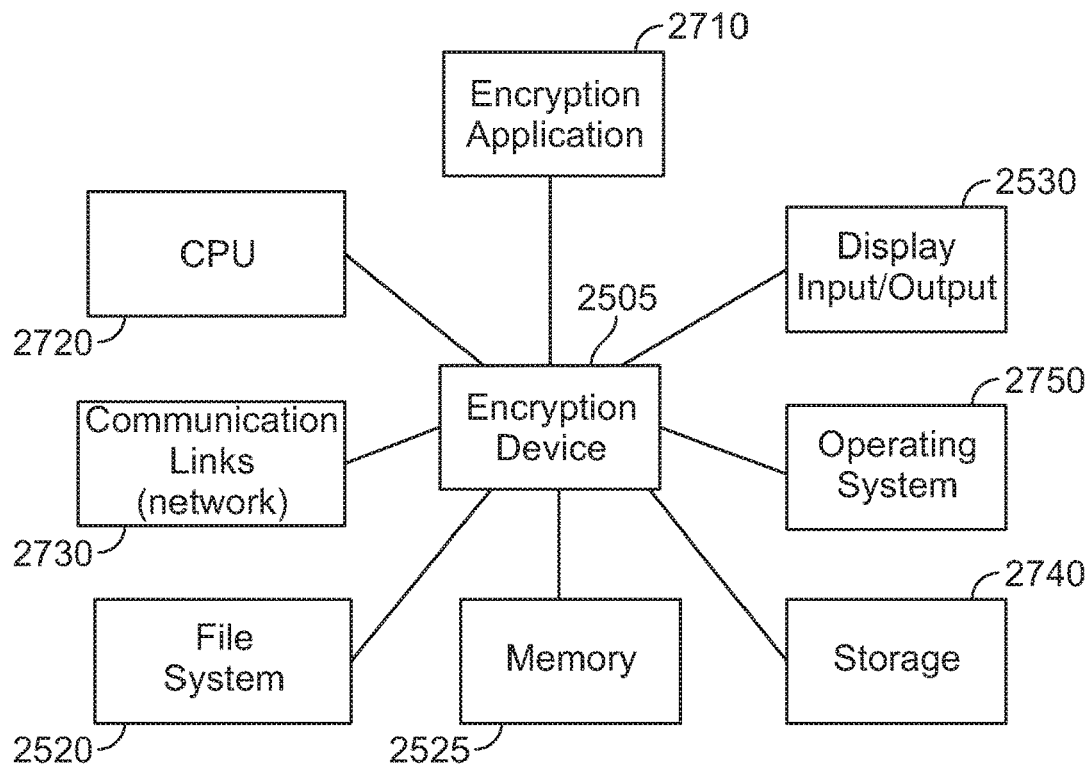
FIG. 27 illustrates the system components of an embodiment of the encryption/decryption device.

FIG. 27 illustrates the system components of an embodiment of the encryption/decryption device 2505. As shown in FIG. 27, the encryption device 2505 operates under the control of the encryption application 2710 that was previously discussed. The encryption device 2505 includes the file system 2520, memory 2525, and display input/output 2530 discussed above, but also includes a CPU 2720 operating in accordance with an operating system 2750. The encryption device 2505 is able to store and retrieve information from storage 2740 and is able to communicate with remote systems, such a key provider using communication links 2730.

Figure 28:
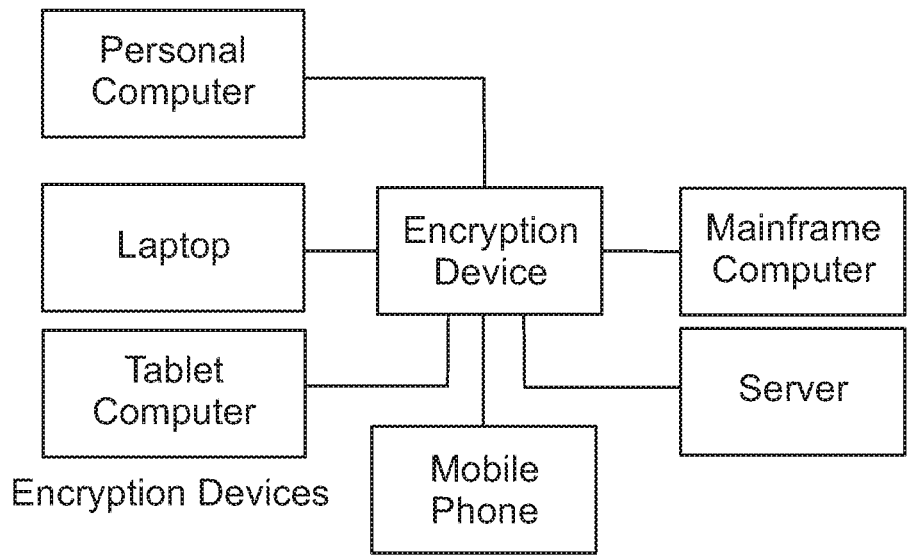
FIG. 28 illustrates several exemplary embodiments of an encryption device and/or systems that may be in communication with an encryption device including a personal computer, a laptop, a tablet computer, a mobile or smartphone a mainframe computer, and a server.

FIG. 28 illustrates several exemplary embodiments of an encryption device and/or systems that may be in communication with an encryption device including a personal computer, a laptop, a tablet computer, a mobile or smartphone a mainframe computer, and a server.

Figure 29:
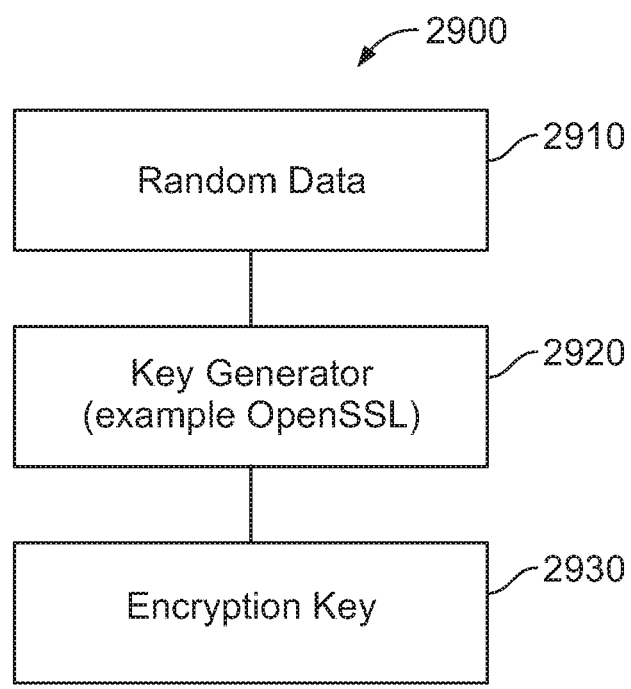
FIG. 29 illustrates a flowchart of a method of creating an encryption key such as may be performed by the encryption/decryption device of FIG. 25.

FIG. 29 illustrates a flowchart 2900 of a method of creating an encryption key such as may be performed by the encryption/decryption device 2505 of FIG. 25. As shown in FIG. 29, first at step 2910 random data is generated. Next, at step 2920, the random data is passed to a key generator such as an Open Secure Socket Layer (Open SSL) key generator where an encryption key 2930 is generated.

Figure 30:
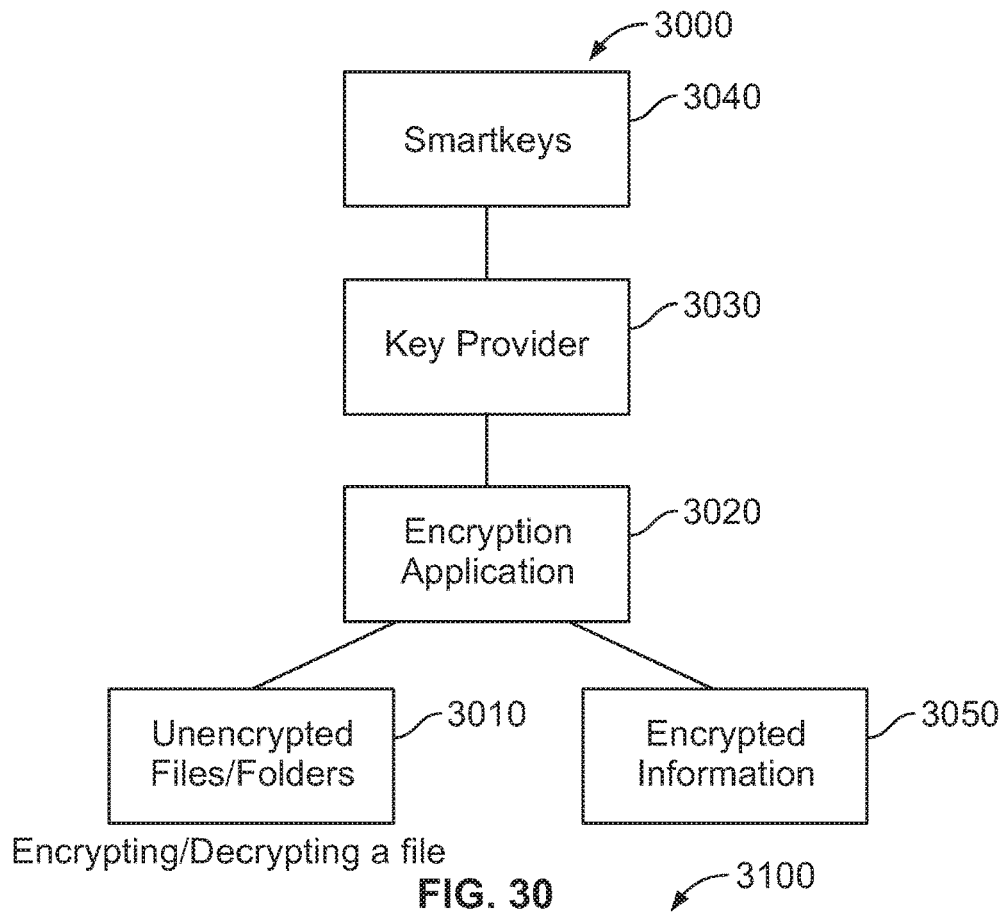
FIG. 30 illustrates a flowchart of a method for encrypting and decrypting a file.

FIG. 30 illustrates a flowchart 3000 of a method for encrypting and decrypting a file. First, at step 3010, unencrypted files and/or folders 3010 are passed to an encryption application 3020. Additionally, one or more smartkeys 3040 are retrieved from a key provider 3030 and also passed to the encryption application 3020. The encryption application 3020 then uses the one or more smartkeys 3040 to encrypt the unencrypted files and or folders 3010 to produce encrypted information 3050.

Figure 31:
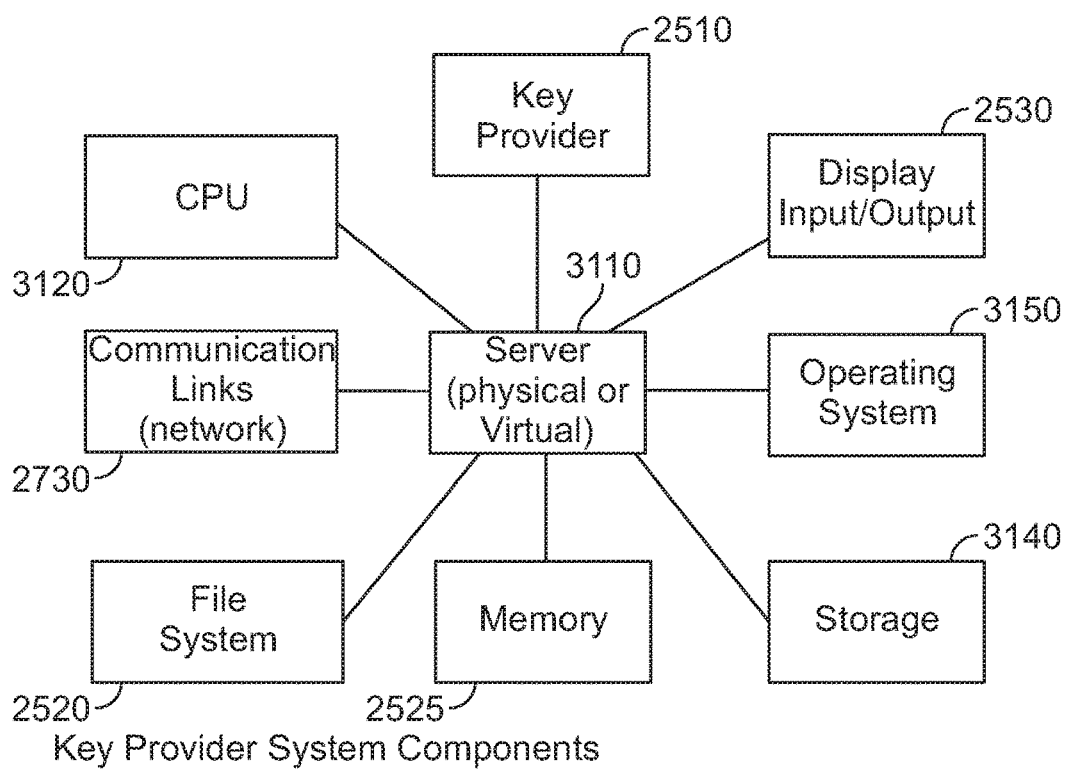
FIG. 31 illustrates the components of a key provider system, such as those shown in FIG. 25 including the local key provider, the first key provider and the second key provider.

FIG. 31 illustrates the components of a key provider system 3100, such as those shown in FIG. 25 including the local key provider 2510, the first key provider 2503 and the second key provider 2504. As shown in FIG. 31, the key provider 2510 may interact with a server 3110 such as a physical or virtual server. The key provider system 3100 also includes the file system 2520, memory 2525, and display input/output 2530 discussed above, but also includes a CPU 3120 operating in accordance with an operating system 3150. The server 3110 is able to store and retrieve information from storage 3140 and is able to communicate with remote systems, such a key provider using communication links 3130.

Figure 32:
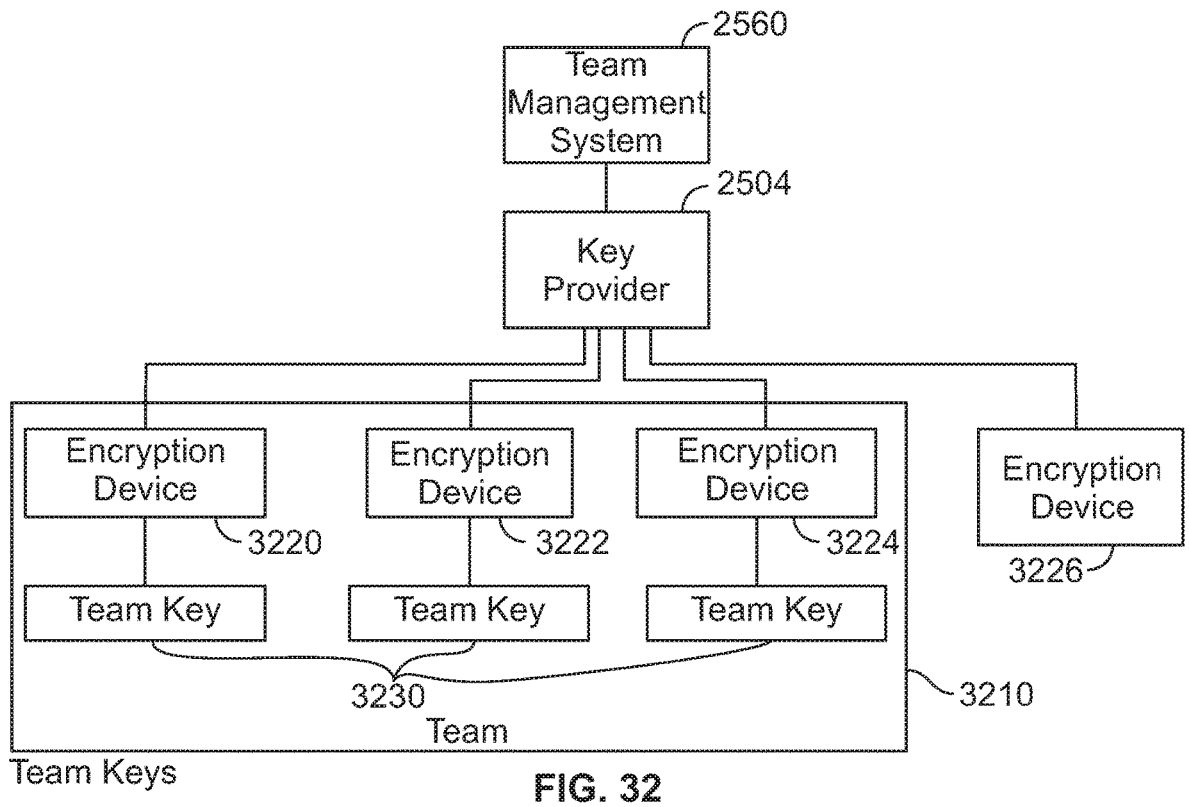
FIG. 32 illustrates a team management system as initially referenced in FIG. 25.

FIG. 32 illustrates a team management system 2560 as initially referenced in FIG. 25. The team management system 2560 includes a key provider 2504, a several encryption devices 3220, 3222, 3224, 3226, a logical team grouping 3210, and a team key 3330. In operation, as described herein, a team key may be used to give all members of a team access to a certain file or other information by establishing a team key that is available to all team members and using the team key to encrypt the information. Consequently, as shown in FIG. 32, a team key 3230 may be stored at the key provider 2504 and may be requested by an encryption devices 3220, 3222, 3224, 3226 when encrypting a file. In response to a request for access to the team key 3230, the key provider 2504 may have a stored data structure including an identification of the team members 3210, such as by e-mail address or device identity. For team key requests that match the team members identified in the stored team data structure, such as encryption devices 3220, 3222, 3224, the key provider may provide the team key 3230. For team requests that do not match the team members identified in the stored team data structure, such as encryption device 3226, the team key is not provided.

Figure 33:
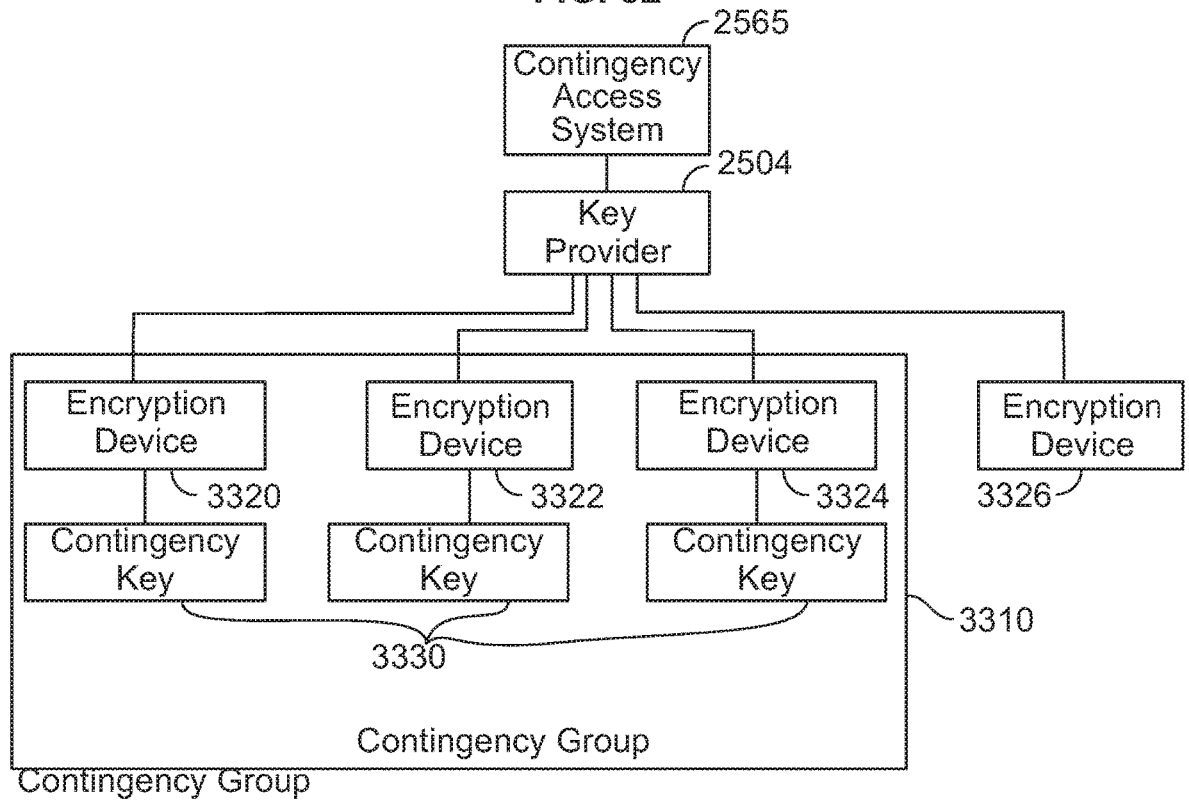
FIG. 33 illustrates a contingency key management system as initially referenced in FIG. 25.

FIG. 33 illustrates a contingency key management system 2560 as initially referenced in FIG. 25. The contingency key management system 2560 includes a key provider 2504, a several encryption devices 3320, 3322, 3324, 3326, a logical contingency key grouping 3310, and a contingency key 3330. In operation, as described herein, a contingency key may be used when encrypting files or other information so that a person other than the primary user (such as a backup person or a supervisor) may also be provided access to the files or other information.

Consequently, as shown in FIG. 33, a contingency key 3330 may be stored at the key provider 2504 and may be requested by an encryption devices 3320, 3322, 3324, 3326 when encrypting a file. Alternatively, encryption devices 3320, 3322, 3324, 3326 may provide an identification of the user encrypting files or other information to the key provider 2504. At the key provider 2504, there may be a data structure that is associated with and/or searchable by the identification of the initial user and may return one or more contingency keys when provided with the identification of the initial user.

For contingency key requests wherein a received user identifier is associated with one or more contingency keys, such as encryption devices 3320, 3322, 3324, the key provider may provide the contingency key 3330. Conversely, for contingency key requests wherein a received user identifier is not associated with one or more contingency keys, such as encryption device 3326, no contingency key is provided.

Figure 34:
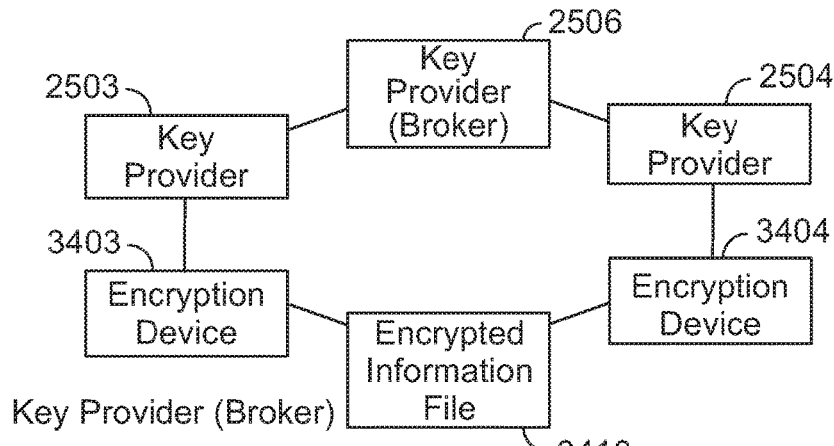
FIG. 34 illustrates a smartkey broker system as initially referenced in FIG. 25.

FIG. 34 illustrates a smartkey broker system 2506 as initially referenced in FIG. 25. The smartkey broker system 2506 includes a first key provider 2503, a second key provider 2504, a first encryption device 3403, a second encryption device 3404, and an encrypted information file 3410. In operation, a the first encryption device 3403 may be in need of a key in order to decrypt the encrypted information file 3410. The first encryption device 3403 may be in contact with the first key provider 2503, but not in contact with the second key provider 2504. For example, the second key provider 2504 may be located behind a firewall that provides very limited access to the second key provider 2504, for example only by highly verified and/or trusted applications, devices, or users. However, the smartkey broker system 2506 may be highly verified and/or trusted and consequently the second key provider 2504 may be allowed to communicate with the smartkey broker system 2506. Trust between a first key provider and a second key provider may be established using the SSL or TLS protocol following an exchange of SSL certificates created according to the published X.509 digital certificate specification to provide a highly verified communication link.

Consequently, in order to obtain a desired smartkey that may be located on the second key provider 2504, the first key provider 2503 sends a request to the smartkey broker system 2506 to retrieve the desired smartkey from the second key provider 2504. The smartkey broker system 2506 then proceeds to communicate with the second key provider 2504 to retrieve the desired key and provide the desired key to the first key provider 2503, which in turn provides the desired key to the first encryption device 3403, which uses it to decrypt the encrypted information file 3410.

Figure 35:
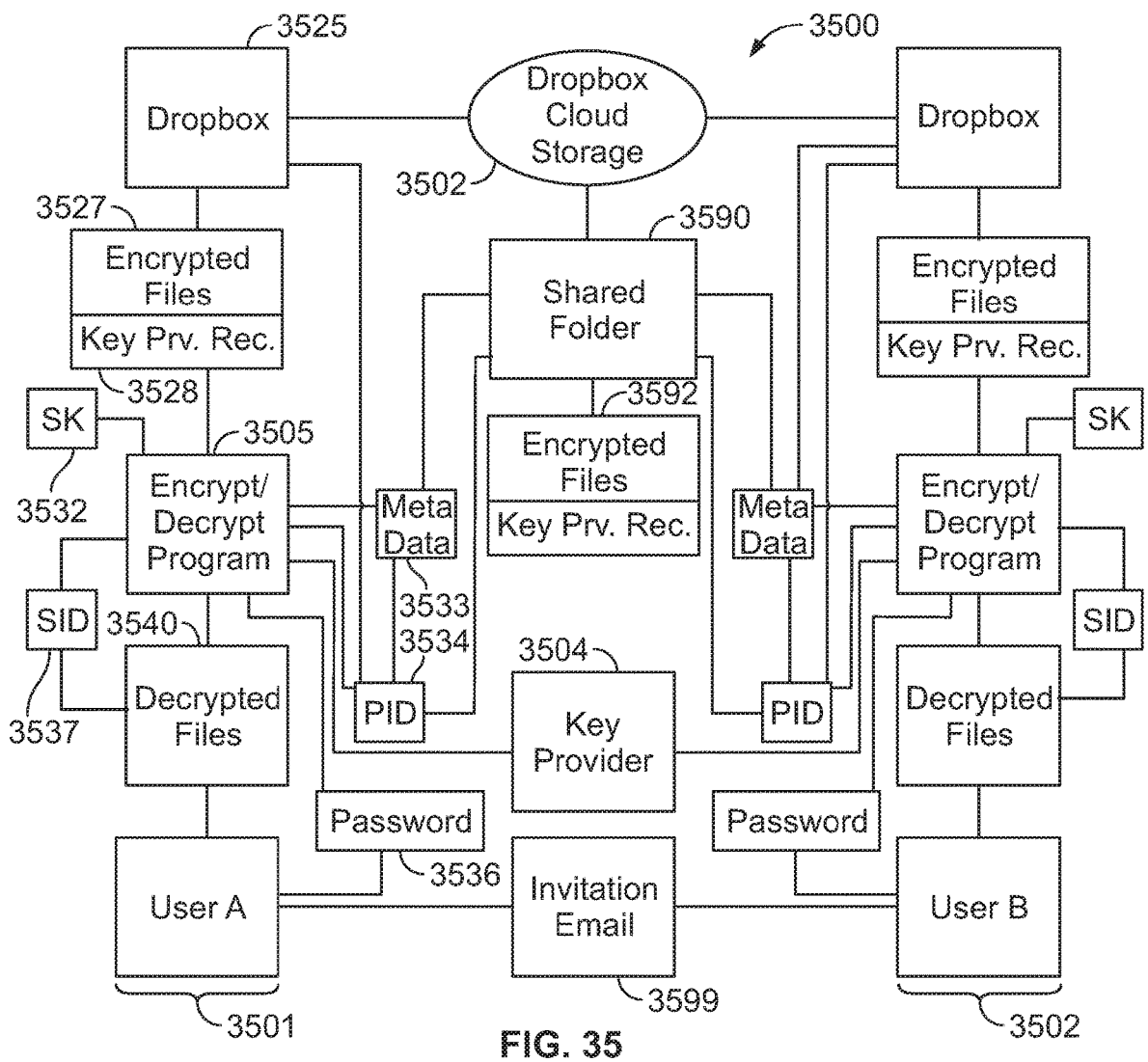
FIG. 35 illustrates an exemplary dropbox embodiment of the cloud-based Smartkey management system of FIG. 25.

FIG. 35 illustrates an exemplary dropbox embodiment 3500 of the cloud-based Smartkey management system of FIG. 25. FIG. 35 shows a first user system 3501, shared dropbox storage 3502, a second user system 3503, and a key provider 3504. The first user system 3501 includes dropbox storage 3525, including encrypted files 3527 that have been stored with one or more key provider records 3528, as well as decrypted filed 3540. Additionally, a secret key 3527, session key 3532, public key 3534, password 3536, and metadata 3533 for said first user are known.

As described herein, the encrypt/decrypt program 3505 may be employed to retrieve decrypted files 3540, and then retrieve one or more smartkeys from the key provider 3504, and then encrypt said files using said one or more smartkeys. The encrypted files 3527 may be stored locally, or may be sent to dropbox storage 3525 where they may be stored as encrypted file 3592 in a shared folder 3590.

Additionally, if the first user wishes to invite a second user to participate in the smartkey management system, the first user may send an invitation e-mail 3599 to said second user system 3502.

Figure 36:
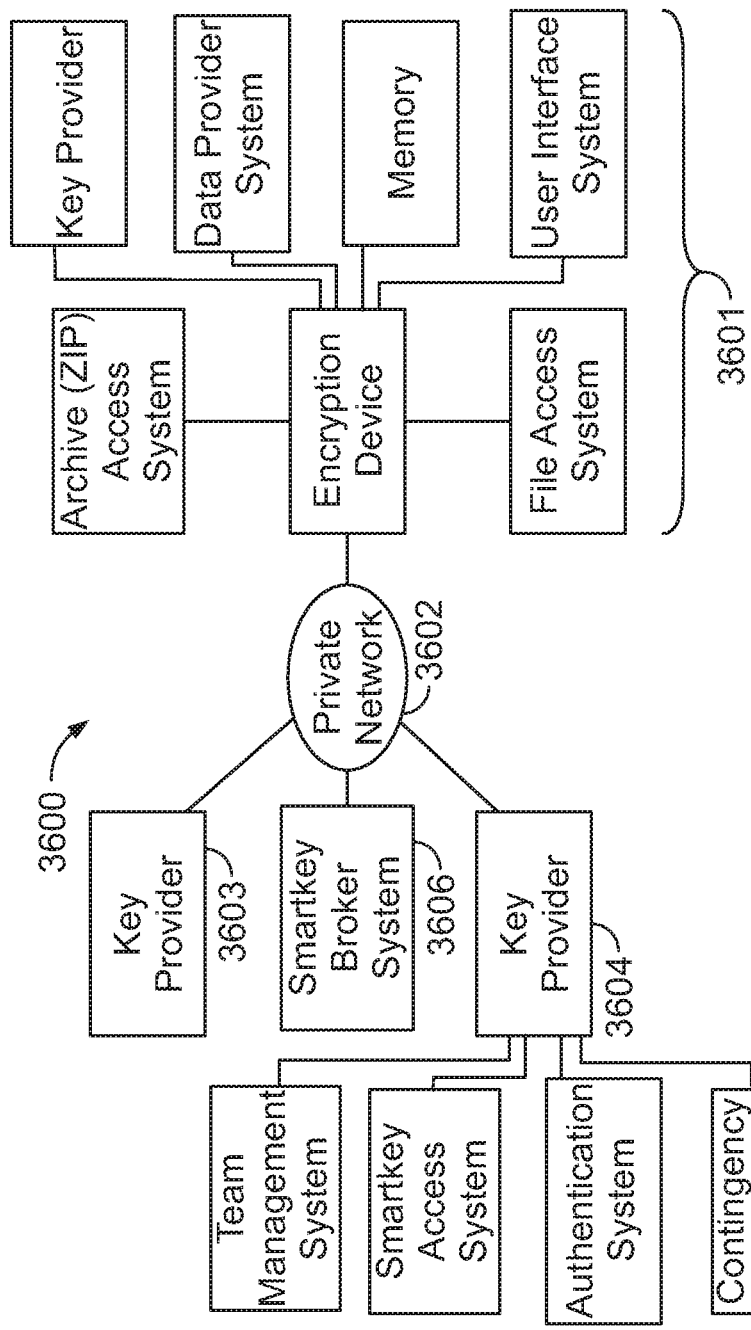
FIG. 36 illustrates a private-network embodiment of a Smartkey management system.

FIG. 36 illustrates a private-network embodiment 3600 of a Smartkey management system. The private network embodiment 3600 of FIG. 36 is generally similar to the cloud-based embodiment of FIG. 25, but uses a private network in place of the cloud. FIG. 36 shows a local system 3601, a private network system 3602, a first key provider 3603, a second key provider 3604, and a smartkey broker system 3606, all of which operate generally similarly to their corollaries shown in FIG. 25.

The encrypted format for encrypted information may be any encryption format. One example is the encrypted .ZIP format created using the SecureZIP software from the assignee of the present invention. Another encryption format is OpenPGP. Other encrypted formats may be used.

As used in one or more embodiments, some frequently used terms may include:

Session Key or SK—The SK may be a symmetric or asymmetric key used to encrypt/decrypt data. The smartkey encryption may use two types of SKs, the Private SK and the Folder SK. The Private SK is a key that may be used to decrypt data, and may be unique for each user of a smartkey.

Identity—With regard to identity, the smartkey identifies each user using a pair of keys unique to a user: the PID—the user's public key, and the SID—the user's private key.

SID file—The SID/PID pair is stored within an SID file. The SID file may be a password protected file containing the user's private and public key.

PID file—The PID file may be the file containing the user's PID, name, e-mail and other public information for the user.

PIDlist—The PIDlist may be the list of smartkey users (PIDs) that are allowed to use the smartkey.

SMOD—The SMOD may be a file with share folder properties (access level, read-only, retain/keep files, operating system or device information, URL, date, time, timestamp, owner, allowed users, size, version, location, file name, and other properties).

OK_ID—The OK_ID may contain the Dropbox ID.

.MOD—The .MOD contains moderator control information

SK file—The SK file is a file within which the shared folder's SK is asymmetrically encrypted using an allowed members PID. The SK file may be uploaded by the moderator. The SK file may be acquired and then removed by the allowed member, and is cached in the allowed members cloud cache.

The PIDs may be a personal ID that may include the user's name, e-mail and/or RSA public key. Additionally, the SK may be a symmetric key, such a s PFX file for SecureZIP encryption. The SK may also be an asymmetric key.

This method may also be integrated into software applications that operate as a "user level" process or it may operate in software that provides internet access or that operates using the internet to access or share information. Examples may be file encryption, file transfer or copy programs, email or messaging applications, productivity or workflow applications, file management and file system management applications. Other types of software applications may be used.

Software may include this method on one or more computing platforms including mainframe and server platforms running operating systems including, but not limited to, IBM z/OS, Microsoft Windows, or Linux. Other platforms on which this method may be enabled include personal computers, servers, physical or virtual server appliances, virtual machines, laptops, mobile devices, smart phones, tablets, optical or magnetic disk drives, printing devices, network storage devices, SAN, NAS, or digital imaging devices. Other computing platforms may be used.

Information may be electronic files (or resources R) that contain documents, spreadsheets, presentations, emails or messages, calendars, contact information, database files, compressed files, encrypted files, ZIP files, OpenPGP files, archive files, graphical and binary image files, pictures, text files, program files, library files, metadata, and other information that may be stored on a computer. Metadata is information about files, systems, configurations/settings or users that is used by the software and applications that process files created and used by the applications and their users. Metadata may include, but is not limited to, file names, file sizes, time and date information, location, allowed access, compression information, encryption information, encryption keys, known user or trust lists, denied user or blacklists, system state information, PID, SID, SMOD, OK_ID, .MOD, JSON files. Collectively or individually, this information may be referred to as data.

Data encryption may be applied to information in electronic files using encryption algorithms including, but are not limited to RSA, DES, 3DES, AES, Blowfish, Twofish. Other encryption algorithms may be used. Data encryption algorithms may symmetric or asymmetric keys. Data encryption algorithm may be used with any of a number of bit strengths. Data encryption algorithm bit lengths that define the strength of an algorithm such as 168 bits, 192 bits, or 256 bits, 512 bits, 1024 bits, 2048 bits and 4096 bits may be used. Other data encryption algorithm bit lengths may be used.

Data authentication may be applied to information in electronic files using authentication methods including but not limited to digital signatures such as may be applied using a public/private key pair, cyclic redundancy checks such as CRC-32, secure hash functions such as MD5, RIPEMD, SHA-1, SHA-256, SHA-384, or SHA-512, or HMAC. Other secure hash algorithms may be used.

Data compression may applied to information in electronic files using data compression algorithms including, but not limited to Deflate, PPMd, Lempel-Ziv-based algorithms including LZMA. Other data compression algorithms may be used. Data compression reduces the bytes needed to store an electronic file, making the compression copy of a file smaller than the original. When a file is compressed, the original may be removed to reduce storage requirements.

Electronic information files compressed to reduce size using data compression may be placed within compressed archive formats before being placed into cloud storage. Compressed archive formats used to compress electronic information files include, but are not limited to the .ZIP format by PKWARE, Inc., RAR, and others.

Encryption keys used within the data encryption processing of information in electronic files may be of any type commonly used. Types of encryptions keys used include but are not limited to passwords, passphrases, tokens, one-time-pads, public/private key pairs and others. Public/private key pairs may be of X.509, Elliptic curve or OpenPGP. Other encryption key specifications may be used.

One-way hash functions may include, but are not limited to MD5, RIPEMD, SHA-1, SHA-256, SHA-384, or SHA-512. Other one-way hash functions may be used.

The files and folders used within one or more embodiments of the present invention may operate on single device, on cloud storage, or on other storage method such as SAN or NAS. Files and folders used within the one or more embodiments of the present invention may reside on different devices or storage locations. For example data files may reside on user device and a cloud storage device and metadata may be placed onto separate storage from the data such as a server, or other computer storage.

One or more embodiment of the present invention may include methods used to securely share information by integration within existing sharing systems available today including, but not limited to Microsoft SharePoint or IBM Lotus Symphony. The one or more embodiments of the present invention also include methods used to securely share information by integration within other information sharing systems including but not limited to Facebook, Google+, LinkedIn, Twitter, Skype, Chatter, or Apple FaceTime.

The files and folders used within one or more embodiments of the present invention may be used or shared across systems and devices not part of an open or private network system. Files may be copied to portable media such as USB devices or CD/DVD media. Files may be attached to emails and sent to any device or computer using available mail transfer agents (MTA) such as Microsoft Exchange or sendmail. Users receiving these files may not be members or authenticated users of the present system.

The present invention includes a method of using standard .ZIP files and strong encryption technology to securely store files, and more particularly to a method of integrating existing strong encryption methods into the processing of .ZIP files to provide a highly secure data container which provides flexibility in the use of symmetric and asymmetric encryption technology. The present invention adapts the well established .ZIP file format to support higher levels of security and multiple methods of data encryption and key management, thereby producing a highly secure and flexible digital container for storing and transferring confidential electronic data. Other encryption formats may be used, including OpenPGP, Cryptographic Message Syntax (CMS) (IETF RFC 5652). Other formats may be used.

The .ZIP format, created by the assignee of the present invention, is the most common compressed and encrypted file format for the personal computer, but there are many others in use today. Any file with a ".zip" extension is most likely a compressed file in the .ZIP format. "Zipping" a file means placing the file into the .ZIP format archive which, in one embodiment, may cause it to occupy less disk space, and "unzipping" a file means extracting and possibly uncompressing a compressed file in the .ZIP format.

A .ZIP file is generally recognized as a data compression, data encryption and archiving format invented by PKWARE, Inc. The .ZIP format is a file format designed for combining data compression and encryption technology with file archiving techniques. Many commercially available software products are available for compressing or "zipping" files or other data into the .ZIP format. These .ZIP files can then be used to reconstruct the original data through the "unzipping" process. Data compression converts the contents of a file into an encoded format requiring less computer storage space or less network bandwidth than the original uncompressed file.

Archiving, in the context of a .ZIP file, is a method of storing information about the characteristics of a file in a catalogue of files, known as the Central Directory, inside the .ZIP file allowing each file to be retrieved individually by its characteristics. These characteristics include, but are not limited to file name, file size, file creation date and time.

Software programs such as PKZIP® and Smartcrypt™ written by PKWARE, Inc. are used to process files in the .ZIP format. Such programs allow one or more files of any type to be compressed and archived into a file of the .ZIP format type for efficient file storage and transmission over computer and communication networks. This format and the software programs that process .ZIP files have become ubiquitous.

Data encryption is used by many software programs to provide data privacy. Data encryption is a method of encoding data so that it cannot be reproduced in its original form unless a known key is provided. Decryption uses this known key to convert the encoding of the encrypted data back into its original state. The key is known only to the person encrypting the data or by those other people the person encrypting the data chooses to share the key with. The key serves to unlock the data so that it can again be used in its original form.

Keys are uniquely generated using data known to the person encrypting a file or other data. This known data can be a user-defined password or other random data. Several methods are commonly used for processing the keys used for data encryption. An example of one method for processing encryption keys supported by this invention uses a public/private key pair commonly associated with digital certificates as defined by the document Internet X.509 Public Key Infrastructure Certificate and CRL Profile (RFC 2459). A digital certificate is a unique digital identifier associating a public and private key pair to an assigned individual, a group, or an organization. When used for encrypting data, the public key of an individual is used to process an encryption key which only the individual in possession of the corresponding private key can use for decryption. A digital certificate is issued to an individual, a group, or an organization for a fixed period of time and can only be used during this time period. After the time period has elapsed, the digital certificate will be considered to have expired and must be reissued for a new time period.

The strength of a data encryption method is determined by its key size in bits. The larger the key size a data encryption method uses, the more resistant it is to hacking. Hacking is the unauthorized access to encrypted data. Strong encryption is a type of data encryption that uses key sizes of 128 bits or more. A number of encryption encoding methods are known today. Examples supported by the present invention include, but are not limited to Advanced Encryption Standard (AES), Data Encryption Standard (DES), Double DES, Triple DES, and others. A number of key sizes are commonly used today. Examples supported by the present invention include, but are not limited to 128 bits, 192 bits, and 256 bits.

Many software programs available today that process .ZIP files use data encryption to encrypt files after compression as they are written to the .ZIP file. The data encryption method used by these software programs uses a key size of 96 bits and is considered weak encryption by today's standards. These software programs use keys generated using user-defined password data. Weak data encryption does not provide sufficient security to computer users that store and transfer their confidential data files using the .ZIP format.

Password-based key generation has been a commonly used method of applying data encryption, however, known vulnerabilities to hacking methods such as "brute force password cracking" make this method of encryption insufficient to meet today's more advanced security needs. Another known limitation of password-based security is the lack of non-repudiation. Non-repudiation is the ability to be certain that the person who created a .ZIP file is really who they say they are and that their identity is bound to the .ZIP file they created. This cannot be achieved with symmetric encryption methods. Today, non-repudiation is an important aspect of security because data is frequently transferred using the Internet which can be easily used to silently intercept and alter data. It is critically important to be certain of the identity of data that is exchanged electronically.

Therefore, a need exists to improve the level of security available to programs that process .ZIP files. This improved level of security makes use of the standard encryption technologies available today.

One or more embodiments of the present invention adapt the well established .ZIP file format to support higher levels of security and multiple methods of data encryption and key management, thereby producing a highly secure and flexible digital container for storing and transferring confidential electronic data.

One or more embodiments of the present invention provide a method of integrating existing key management methods into the processing of .ZIP files to provide a highly secure data container which provides flexibility in the use of encryption technology.

The method of the present invention includes using strong encryption when creating .ZIP files that allow for different encryption methods to be selected to meet the security needs of a given computer user. Strong encryption algorithms are preferably used in conjunction with either password (symmetric) or any form of public/private key (asymmetric) encryption methods. The symmetric method preferably includes a password defined by the user, while the asymmetric method preferably includes a public/private key associated with digital certificates to process encryption keys. This allows one or more passwords and one or more public keys to be used individually, or in combination at the same time when creating a secure .ZIP file. This is required since secure .ZIP files are frequently distributed, or otherwise made accessible, to multiple recipients for decryption. Today, some of those recipients may require password access while others may require certificate access.

The method of the present invention also supports non-repudiation using the identity support available with digital signatures that can be generated using public/private key technology. This non-repudiation function also preferably supports time-stamping methods for fixing the creation of a digital signature in time.

The method of the present invention further supports the encryption of file characteristics for each file inside a .ZIP file. This further increases the level of security available to .ZIP file users. Currently, .ZIP software programs encrypt only the contents of the files in a .ZIP file. The additional characteristics for each file such as its name, size, etc. remain unencrypted. To remove the possibility that this unencrypted data for a file could be made available to a hacker, this information may preferably also be encrypted as an option.

Public keys such as those associated with digital certificates used for encrypting .ZIP file data preferably resides on a user's local computer in a file or a database, on an external device such as a Smart Card or other removal device, or in a shared data repository such as a directory service served by an LDAP server. This process will provide standard methods of checking whether a digital certificate is valid for use. These methods preferably include, but are not limited to standard methods of certificate validation, such as searching certificate revocation lists (CRL), certificate trust lists (CTL), and online checking via the internet using Online Certificate Status Protocol (OCSP) or Simple Certificate Validation Protocol (SCVP).

The method of the present invention also preferably defines data storage locations within the established .ZIP file format specification for storing information on the encryption parameters used when a file was encrypted and on the keys needed when a file is to be decrypted. One such example of these data storage locations is that they will include a field to identify that a new strong encryption method has been applied to a file in the .ZIP file. The strong encryption record will be defined within a central directory storage area for each encrypted file. The central directory is a storage location defined in the .ZIP file format which serves as a table of contents for the entire .ZIP file. An entry is made into the central directory for each file added to a .ZIP file. A decryption record will be defined for storing the information needed to initialize and start the decryption process. This decryption record will be placed immediately ahead of the encrypted data for each file in a .ZIP file. This example is not the only method of storing this data as other storage methods can be defined.

The present invention provides many advantages or benefits over the prior art. One benefit is the ability to use a wider range of encryption methods instead of supporting only a single encryption method. A second benefit is that the encryption of individual files using advanced public/private keys provides a significantly higher level of security to computer users. A third benefit is that encryption of .ZIP file data can be implemented using a range of commonly available cryptographic toolkits. A fourth benefit is that the present invention supports using packaged, or readily available encryption algorithms to provide state-of-the-art security. A fifth benefit is the availability of non-repudiation using digital signatures through the use of public/private key technology. A sixth benefit is that the invention ensures a high degree of interoperability and backward compatibility by extending the current .ZIP file format.

Various other features, objects, and advantages of the invention will be made apparent to those skilled in the art from the following detailed description, claims, and accompanying drawings.

The .ZIP file format specification published by PKWARE Inc. is attached hereto and is incorporated herein by reference. The current version of the .ZIP file format describes an implementation of the use of strong encryption based on a key generated using a password. This describes one example of a structure and layout of the records and fields suitable for processing secure .ZIP files as defined by the present invention. The complete description of this file format will not be included here since this information is generally well known and only the portions pertaining to the new records and fields defined by examples to illustrate storing strong encryption data will be discussed.

The present invention extends the original .ZIP file format with the addition of management.

An example of implementing a new strong encryption key management method is discussed below. This example identifies several new records and fields that must be defined within the .ZIP file format.

Alternate storage formats can be defined for implementing the flexible security support within ZIP files. One such alternative is to use other fields, either existing or newly defined to denote that a strong encryption method was applied to a .ZIP archive. Another alternative could be to use additional storage fields in addition to those defined in the above example, or to use the fields as defined, but ordered differently within each record. Still other implementations may use fewer, or more, records or fields than are defined by the above example or the records and fields may be placed in other physical locations within the .ZIP file.

Alternate processing methods can also be defined for implementing the flexible security support within .ZIP files. One such alternative is to implement the encryption process for each file using another public/private key technology such as that defined by the OpenPGP Message Format as documented in RFC 2440/4880. Another alternative could be to use a more direct form of encryption key generation where the file session key is directly used for encrypting each file. This method would not use the indirect form described in the above example where the file As mentioned previously in the specification, the security module provides for secure storing and/or transfer of files. Digital signatures identify the origin of a file (also known as signing the file) and allow verification of the origin of the file (also known as authenticating the file). In this regard, digitally signing a file may allow detection of whether the integrity of the file has been compromised. Another option for securing data is the use of encryption. Encrypting a file may deny access to the contents of a file by unauthorized users. Options for securing data may be configured to allow a user to select a type of security to be applied to data as the data is compressed or stored (without compression) into an archive. Digital signatures and/or encryption may protect data from tampering and/or unauthorized access. Several methods of securing data using digital signatures and/or encryption are provided. Other methods of securing data may exist, as known to those skilled in the art.

In an embodiment of the present invention, when creating an archive, a user may digitally sign and/or encrypt individual files in the archive. A user may also digitally sign and/or encrypt the central directory of an archive. When extracting files from an archive, a user may authenticate and/or decrypt those files. Signing and/or encrypting data may provide security for data files within an archive. Signing and/or encrypting functionality may be based on PKCS No. 7, and/or related public key encryption standards. Basing signing and encrypting functionality on such standards may ensure compatibility with security functionality in other applications available on a computing device. Other signing and encryption methods may be used as known to those skilled in the art.

Before a user may digitally sign and/or encrypt a file, the user must first have a digital certificate, or other public/private key credential with which to sign and/or encrypt the file. An example of a public/private key system supported by an embodiment of the present invention is defined by the internet standard specification: RFC 2459—Internet X.509 Public Key Infrastructure Certificate and CRL Profile. Another example of a public/private key system supported by an embodiment of the present invention is defined by the internet standard: RFC 4880—OpenPGP Message Format. Another example of a public/private key system supported by an embodiment of the present invention is elliptic curve cryptography based on the algebraic structure of elliptic curves over a finite field in which finding the discrete logarithm of a random elliptic curve element with respect to a publicly known base point is considered mathematically infeasible. Other public/private key systems may exist, as known to those skilled in the art.

Public/private key encryption uses a key pair. A key pair includes a public key and a private key. The public key of the pair is associated with a digital certificate, or other form of credential to uniquely identify an individual or organization. The digital certificate is used to bind the identity of the individual or organization with the public encryption key. The individual or organization whose identity is bound to the digital certificate is considered to be the owner of the key. The owner of the key is the individual or organization that is authorized to use the key for decrypting encrypted data. The private key of the pair is held in confidence by the owner. When encrypting data intended for the owner of a key, the public key is used within the encryption process to encrypt data for that owner. The data may only be decrypted by the owner using his/her private key.

In an embodiment of the present invention, when encrypting data into an archive, multiple public keys may be used in the encryption process to create an encrypted archive. An owner of a public key used for encryption may decrypt the data in the encrypted archive using the owner's private key. Anyone not in possession of a private key corresponding to one of the public keys used to encrypt the data may not decrypt the data in the encrypted archive.

A public/private key in the form of an X.509 digital certificate may be obtained from VeriSign or Thawte or from another certificate authority. A certificate authority is an organization that issues a digital certificate on behalf of an individual or organization. A public/private key in the form of a PGP key pair may be created using software programs available on the Internet. Other sources of public/private keys may exist, as known to those skilled in the art.

Storage of Digital Certificates

In an embodiment of the present invention, public/private keys used for signing, authenticating, encrypting and/or decrypting archives may be stored using various storage methods. One example of a storage method is a certificate store hosted by the underlying operating environment, such as the Microsoft Windows Certificate Store, IBM RACF (Resource Access Control Facility) and IBM ACF2 (Access Control Facility 2), for example. A second example of a storage method is a Smart Card or USB storage device. A third example of a storage method is a biometric device such as a fingerprint reader or a retina scanner. A fourth example of a storage method is an LDAP (Lightweight Directory Access Protocol) directory store. Other methods of certificate storage may exist, as known to those skilled in the art.

In an embodiment of the present invention, an archive encrypted using a public key(s) may be created by employing the following steps. First, the files to be encrypted may be selected and a name and location for a new archive may be specified. Then, the individuals or organizations that are authorized to decrypt the encrypted archive may be selected. Key material may then be generated using random data. A master encryption key may be derived by the compression/extraction engine 40 using the key material. A first session key for a first file in the archive to be encrypted may be derived using the master encryption key. Then, the first file may be encrypted using the first session key and the encrypted data for the first file may be placed into the archive. A second session key for a second file in an archive to be encrypted may be derived using the master encryption key. Then, the second file may be encrypted using the second session key and the encrypted data for the second file may be placed into the archive. This process may continue for all files in the archive.

The public key for a first individual or organization that is authorized to decrypt the encrypted archive may be obtained from the certificate storage location. A copy of the key material may be encrypted using the public key of the first individual or organization authorized to decrypt the encrypted archive. The public key for a second individual or organization that is authorized to decrypt the encrypted archive may be obtained from the certificate storage location. A copy of the key material may be encrypted using the public key of the second individual or organization authorized to decrypt the encrypted archive. The encrypted key material of the first and second individuals or organizations authorized to decrypt the encrypted archive may be placed into the archive.

To decrypt an archive that is encrypted using a public key(s) the following steps may be followed. The encrypted archive may be received by an individual or organization authorized to decrypt the archive. The private key for the individual or organization may be obtained from the certificate storage location. The private key may be used to decrypt the encrypted key material. The decrypted key material may be used to derive a master decryption key. A first session key for a first file in the archive to be decrypted may be derived using the master decryption key. Then the first file may be decrypted using the first session key. A second session key for a second file in the archive to be decrypted may be derived using the master decryption key. Then the second file may be decrypted using the second session key. This process may continue for all files in the archive.

Digital Certificate

As mentioned previously, encryption, decryption, digital signing and/or authentication of digital signatures may be used in accordance with embodiments of the present invention. In order to enable such features, a digital certificate may be required. A digital certificate having a public and a private key may be issued by a certificate authority to an individual or organization. A certificate authority verifies the identity and trustworthiness of the individual or organization and then provides them with a digital certificate as proof of this trust. After receiving a digital certificate, the individual or organization may then use that certificate as proof of their identity when conducting business using a computing device. The digital certificate of an individual or organization and the digital certificates of other users may be required when conducting business using computing devices.

Repository

Many computing platforms available today provide a repository for storing digital certificates. A certificate repository may reside on a computing device. A certificate repository that resides on a computing device may only be used on that computing device and may not be used on another computing device. One example of a certificate repository that resides on a computing device that may not be used on another computing device is the Microsoft Windows Certificate Store, for example.

A user may use their own digital certificate and the digital certificate(s) of others when they are conducting business on a computing device on which a certificate repository resides. A user may use their own digital certificate and the digital certificate(s) of others when they are creating an archive. A user may use their own digital certificate for encrypting, decrypting, digitally signing and/or authenticating an archive. When encrypting or authenticating an archive, a user may use the public key contained within a digital certificate. When decrypting or digitally signing an archive, a user may use the private key associated with their own digital certificate. A user may use digital certificates of others when encrypting and/or authenticating an archive. A user may never access or use a private key of another individual or organization.

An embodiment of the present invention provides a method for accessing digital certificates from a repository that resides on a computing device when creating, modifying and/or extracting an archive. The steps a user may follow when accessing digital certificates from a repository that resides on a computing device when creating an encrypted archive are as follows. First, a certificate authority issuing a digital certificate to a user may create the digital certificate and deliver it to the user. Then, the user receiving the digital certificate may place the digital certificate into a certificate repository that resides on a computing device. The user may also obtain the digital certificates of others and place them into the certificate repository that resides on the computing device.

In an embodiment of the present invention, to create an encrypted archive, a user may specify a name and location for the archive. The individuals or organizations that are authorized to decrypt the encrypted archive may be selected. Key material may be generated using random data. A master encryption key may be derived by the compression/extraction engine 40 using the key material. A first session key for a first file to be encrypted may be derived using the master encryption key. Then, the first file may be encrypted using the first session key and the encrypted data for the first file may be placed into the archive. A second session key for a second file to be encrypted may be derived using the master encryption key. Then, the second file may be encrypted using the second session key and the encrypted data for the second file may be placed into the archive. This may be repeated until all files are encrypted and placed into the archive.

The digital certificate for a first individual or organization that is authorized to decrypt the encrypted archive may be obtained from a certificate repository residing on a computing device. The public key for a first individual or organization that is authorized to decrypt the encrypted archive may be extracted from the first digital certificate obtained from the certificate repository residing on the computing device. A copy of the key material may be encrypted using the public key of the first individual or organization authorized to decrypt the encrypted archive.

The digital certificate for a second individual or organization that is authorized to decrypt the encrypted archive may be obtained from the certificate repository residing on the computing device. The public key for a second individual or organization that is authorized to decrypt the encrypted archive may be extracted from the second digital certificate obtained from the certificate repository residing on the computing device. A copy of the key material may be encrypted using the public key of the second individual or organization authorized to decrypt the encrypted archive. The encrypted key material of the first and second individuals or organizations authorized to decrypt the encrypted archive may be placed into the archive.

To decrypt an archive that is encrypted using a digital certificate stored in a certificate repository that resides on a computing device, the following steps may be followed. The encrypted archive may be received by an individual or organization authorized to decrypt the file. The private key for the individual or organization may be obtained from the certificate repository residing on the computing device. The private key may be used to decrypt the encrypted key material. The decrypted key material may be used to derive a master decryption key. A first session key for a first file to be decrypted may be derived using the master decryption key. Then the first file may be decrypted using the first session key. A second session key for a second file to be decrypted may be derived using the master decryption key. Then the second file may be decrypted using the second session key. This procedure may be repeated until all files in the archive are decrypted.

Not all computing platforms available today provide a certificate repository residing on the computing device. An embodiment of the present invention provides an integrated method for storing digital certificates on a computing device. This method may support importing, exporting, viewing and/or deleting digital certificates from a certificate repository that resides on the computing device.

In an embodiment of the present invention, a digital certificate for an individual or organization authorized to decrypt an encrypted archive may be used on more than one computing device. This may be the case when a computing device is used by more than one user. In such a situation, only one copy of a private key associated with the digital certificate for a user should ever exist. To ensure security is maintained when a user uses more than one computing device or when a computing device is used by more than one user, copies of the digital certificate for a user and the associated private key may not be placed into the certificate repository residing on each computing device a user may use.

Portable Certificate Storage

An embodiment of the present invention provides methods for storing a digital certificate and an associated private key for a user onto a portable certificate storage device that may be carried by a user and used on various computing devices. To use a portable certificate storage device on a computing device, a user may plug the portable certificate storage device into a device receiver on the computing device. The device receiver may provide access to the portable certificate storage device from the computing device. Examples of portable certificate storage devices include a Smart Card and a USB (Universal Serial Bus) Token, for example. Other portable certificate storage devices may exist, as known to those skilled in the art.

An embodiment of the present invention provides a method for accessing a digital certificate from a portable certificate storage device when creating, modifying and/or extracting an archive. The steps a user may follow when accessing a digital certificate from a portable certificate storage device when creating an encrypted archive may be as follows. First, a certificate authority issuing a digital certificate to a user may create a digital certificate and deliver the digital certificate to the user. Then the user may place the digital certificate into a portable certificate storage device that may be plugged into a device receiver on a computing device the user is using.

In an embodiment of the present invention, to create an encrypted archive, a first user may specify a name and location for a new archive. A first individual or organization that is authorized to decrypt the encrypted archive may be selected. The digital certificate for the first user may reside on a portable certificate storage device plugged into a device receiver on the computing device the first user is using. The first user and the first individual or organization authorized to decrypt the encrypted archive may be the same user. A second individual or organization that is authorized to decrypt the encrypted archive may be selected. The digital certificate for the second individual or organization may reside in a different certificate storage location.

Key material may be generated using random data. A master encryption key may be derived by the compression/extraction engine 40 using the key material. A first session key for a first file to be encrypted may be derived using the master encryption key. Then the first file may be encrypted using the first session key and the encrypted data for the first file may be placed into the archive. A second session key for a second file to be encrypted may be derived using the master encryption key. Then the second file may be encrypted using the second session key and the encrypted data for the second file may be placed into the archive. This procedure may be repeated for each file the user wishes to encrypt and place in the archive.

The public key for the first user may be extracted from a digital certificate for the first user that may be obtained from the portable certificate storage device plugged into a device receiver on the computing device the first user is using. A copy of the key material may be encrypted using the public key of the first user. The public key for the second individual or organization that is authorized to decrypt the encrypted archive may be extracted from a digital certificate obtained from a different certificate storage location. A copy of the key material may be encrypted using the public key of the second individual or organization authorized to decrypt the encrypted archive. The encrypted key material of the first user and the second individual or organization authorized to decrypt the encrypted archive may be placed into the archive.

To decrypt an archive that is encrypted using a digital certificate stored in a portable certificate storage device the following steps may be followed. The encrypted archive may be received by a user authorized to decrypt the file. The private key for the individual or organization may be obtained from the portable certificate storage device plugged into the device receiver of the computing device the user is using. The private key may be used to decrypt the encrypted key material. The decrypted key material may be used to derive a master decryption key. A first session key for a first file to be decrypted may be derived using the master decryption key. Then the first file may be decrypted using the first session key. A second session key for the second file to be decrypted may be derived using the master decryption key. Then the second file may be decrypted using the second session key. This procedure may be repeated until all encrypted files in an archive are decrypted.

LDAP Storage

In another embodiment of the present invention, the Lightweight Directory Access Protocol (LDAP) may be used to access information in a repository. LDAP is a standard protocol used for accessing information stored in a global, or shared repository. Many types of information may be stored in a shared repository. Examples of information commonly available from a shared repository using the LDAP protocol are names, telephone numbers and/or email addresses, for example. A shared repository may also be used to store digital certificates that do not reside on a computing device. Other types of information may be stored in a shared repository, as known to those skilled in the art.

An embodiment of the present invention may integrate with existing LDAP repositories to support encrypting and/or digitally signing an archive. When encrypting and/or digitally signing an archive, access to an encryption key may be required. An encryption key may be a password, a public key and/or a private key that is stored in an LDAP repository and that is associated with an individual, for example. The encryption key used to encrypt data for an individual or organization that is authorized to decrypt the encrypted archive may be extracted from the LDAP storage location using information commonly known about the individual(s). The encryption key may also be used to decrypt data. An example of information commonly known about an individual is their email address. Other information about an individual may be used to extract an encryption key from an LDAP repository, as known to those skilled in the art.

In an embodiment of the present invention, a user may create an archive encrypted using an encryption key(s) stored in an LDAP repository in the following manner. First, the files to be encrypted may be selected and a name and location for the new archive may be specified. The email address for a first individual or organization that is authorized to decrypt the encrypted archive may be selected. The email address for a second individual or organization that is authorized to decrypt the encrypted archive may be selected.

Key material may be generated using random data. A master encryption key may be derived by the compression/extraction engine 40 using the key material. A first session key for a first file to be encrypted may be derived using the master encryption key. Then the first file may be encrypted using the first session key and the encrypted data for the first file may be placed into the archive. A second session key for a second file to be encrypted may be derived using the master encryption key. Then the second file may be encrypted using the second session key and the encrypted data for the second file may be placed into the archive. This procedure may be repeated until all files that may require encryption are encrypted.

The email address for the first individual may be used to extract the corresponding encryption key for the first individual from the LDAP repository. A copy of the key material may be encrypted using the encryption key of the first individual or organization authorized to decrypt the encrypted archive. The email address for the second individual may be used to extract the corresponding encryption key for the second individual from the LDAP repository. A copy of the key material may be encrypted using the encryption key of the second individual or organization authorized to decrypt the encrypted archive. The encrypted key material of the first and second individuals or organizations authorized to decrypt the encrypted archive may be placed into the archive.

To decrypt an archive that is encrypted using an encryption key (or keys) stored in an LDAP repository the following steps may be followed. The encrypted archive may be received by an individual or organization authorized to decrypt the file. The encryption key for the individual or organization may be obtained from the LDAP repository. The encryption key may be used to decrypt the encrypted key material. The decrypted key material may be used to derive a master decryption key. A first session key for a first file to be decrypted may be derived using the master decryption key. Then the first file may be decrypted using the first session key. A second session key for a second file to be decrypted may be derived using the master decryption key. Then the second file may be decrypted using the second session key. This procedure may be repeated to decrypt any number of encrypted files.

Multi-Factor Authentication

A digital certificate used to allow interaction with an archive may reside in a storage location that includes additional layers of security to protect the digital certificate from unauthorized access. Using such layers of security may be referred to as multi-factor authentication. Multi-factor authentication may require something a user has, something the user knows, and/or something the user is, in order to allow access to a digital certificate, for example. Something a user has may be a portable Smart Card and/or a USB Token that must be in the possession of an authorized user, for example. Something a user knows may be a password and/or a PIN code, for example. Something a user is may rely on physical characteristics of the user such as facial characteristics, voice patterns and/or fingerprints and other biometric characteristics, for example. Other ways to apply multi-factor authentication may exist, as known by those skilled in the art.

Biometric

In an embodiment of the present invention a multi-factor authentication method may utilize biometric information, such as facial characteristics, voice patterns and/or fingerprints, for example. Steps a user may follow to implement such multi-factor authentication system may be as follows. First, a certificate authority issuing a digital certificate to a user may create the digital certificate and deliver it to the user. Then, the user may place the digital certificate into the certificate storage location. The user may provide a recording of a physical characteristic used for protecting access to the certificate. The recorded characteristic of the user may be captured using a facial scan, an iris scan, a retina scan, a voice recording, and/or a fingerprint scan, for example. Access to the digital certificate may then be restricted to users that provide the captured characteristic. Other biometric data may be used to control access to a digital certificate, as known to those skilled in the art.

In an embodiment of the present invention, a multi-factor authentication system that utilizes biometric information may be implemented as follows. First, to create an encrypted archive, a first user may specify a name and location for the new archive. A first individual or organization that is authorized to decrypt the encrypted archive may be selected. The digital certificate for the first user may reside in a certificate storage location having biometric access control. The first user and the first individual or organization authorized to decrypt the encrypted archive may be the same user. A second individual or organization that is authorized to decrypt the encrypted archive may be selected. The digital certificate for the second individual or organization may reside in a different certificate storage location.

Key material may be generated using random data. A master encryption key may be derived by the compression/extraction engine 40 using the key material. A first session key for the first file to be encrypted may be derived using the master encryption key. Then the first file may be encrypted using the first session key and the encrypted data for the first file may be placed into the archive. A second session key for the second file to be encrypted may be derived using the master encryption key. Then the second file may be encrypted using the second session key and the encrypted data for the second file may be placed into the archive.

The public key for the first user may be extracted from a digital certificate for the first user that may be obtained from certificate storage location having biometric access control. A copy of the key material may be encrypted using the public key of the first user. The public key for the second individual or organization that is authorized to decrypt the encrypted zip file may be extracted from a digital certificate obtained from a different certificate storage location. A copy of the key material may be encrypted using the public key of the second individual or organization authorized to decrypt the encrypted zip file. The encrypted key material of the first user and the second individual or organization authorized to decrypt the encrypted zip file may be placed into the archive.

To decrypt an archive that is encrypted using a digital certificate stored in a certificate storage location having biometric access control the following steps may be followed. The encrypted archive may be received by a user authorized to decrypt the file. The private key for the user may be requested. The user may be asked to provide the physical characteristic required to access the user's private key. The characteristic may be a facial scan, a voice recording, and/or a fingerprint scan of the use, for example. After the successful authentication of the user's physical characteristic, the private key for the individual or organization may be obtained from the certificate storage location having biometric access control. The private key may be used to decrypt the encrypted key material. The decrypted key material may be used to derive a master decryption key. A first session key for the first file to be decrypted may be derived using the master decryption key. Then the first file may be decrypted using the first session key. A second session key for the second file to be decrypted may be derived using the master decryption key. Then the second file may be decrypted using the second session key.

Special Circumstances Decryption

Security provisions may also require backup plans, whereby access to data may only be provided under special circumstances. An embodiment of the present invention may allow a user to encrypt files for selected individuals and/or organizations and for a specific encryption key holder designated to decrypt data only under special circumstances. The special circumstances when a specific encryption key holder may decrypt data may include: the loss of the key or keys of all other individuals authorized to decrypt an archive; investigations into the possible loss, theft, and/or misuse of property; and/or other circumstances where a special key may be needed as a contingency key, and/or backup key, for example. Other special circumstances may exist where a specific encryption key holder may decrypt data, as known to those skilled in the art.

Contingency Key

In an embodiment of the present invention, the use of a contingency key to encrypt an archive may occur automatically, as described here. A user creating an archive for one or more intended recipients may not need to select the key of the contingency key holder. The archive management or encryption application program may support a configuration option that, when set, may always use the encryption key of the contingency key holder when creating or modifying an archive. The use of the contingency key may be set and/or changed by the holder of the contingency key. Other users that may encrypt and decrypt archives may not select whether the contingency key is used when encrypting.

In an embodiment of the present invention, more than one encryption key may be designated as a contingency key. In this embodiment, all contingency keys set within the configuration options may be used when encrypting an archive.

The following are the steps a user may follow to create an archive encrypted using a contingency key. First, the holder of a contingency encryption key may set the program options to identify that a contingency key is to be used when encrypting, and then the user may identify which key(s) is the contingency key. Then a second user that is not the holder of a contingency key may create a new archive. The second user may select files to be encrypted and specify a name and location for the new archive. The individuals or organizations that are authorized to decrypt the encrypted archive may be selected by the second user.

Key material may be generated using random data. A master encryption key may be derived by the compression/extraction engine 40 using the key material. A first session key for a first file to be encrypted may be derived using the master encryption key. Then the first file may be encrypted using the first session key and the encrypted data for the first file may be placed into the archive. A second session key for a second file to be encrypted may be derived using the master encryption key. Then the second file may be encrypted using the second session key and the encrypted data for the second file may be placed into the archive. This procedure may be repeated for any number of files a user wishes to encrypt.

The public key for a first individual or organization that is authorized by the second user to decrypt the encrypted archive may be obtained from the certificate storage location. The public key for a second individual or organization that is authorized by the second user to decrypt the encrypted archive may be obtained from the certificate storage location. The public key for a first contingency key holder authorized to decrypt the encrypted archive may be obtained from the certificate storage location. The public key for a second contingency key holder authorized to decrypt the encrypted archive may be obtained from the certificate storage location.

A copy of the key material may be encrypted using the encryption key of the first individual or organization authorized to decrypt the encrypted archive. A copy of the key material may be encrypted using the encryption key of the second individual or organization authorized to decrypt the encrypted archive. A copy of the key material may be encrypted using the encryption key of the first contingency key holder authorized to decrypt the encrypted archive. A copy of the key material may be encrypted using the encryption key of the second contingency key holder authorized to decrypt the encrypted archive. The encrypted key material of the first and second individuals or organizations authorized to decrypt the encrypted archive may be placed into the archive. The encrypted key material of the first and second contingency key holders authorized to decrypt the encrypted archive may be placed into the archive.

To decrypt an archive that is encrypted using an encryption key(s) for an authorized contingency key holder. The encrypted archive may be received by a contingency key holder. The encryption key for the contingency key holder may be obtained from the certificate storage location. The encryption key of the contingency key holder may be used to decrypt the encrypted key material. The decrypted key material may be used to derive a master decryption key. A first session key for a first file to be decrypted may be derived using the master decryption key. Then the first file may be decrypted using the first session key. A second session key for a second file to be decrypted may be derived using the master decryption key. Then the second file may be decrypted using the second session key. This procedure may be repeated to decrypt any number of encrypted files.

Multiple and Segmented Contingency Keys

An embodiment of the present invention may allow a user to specify multiple contingency keys when creating an encrypted archive. Each contingency key may belong to a separate individual who may be designated as the key holder for a key. Alternatively, responsibility for a single contingency key may be divided among more than one individual. Each individual may be responsible for holding only a portion, or segment, of the key. Use of the key for decryption may require assembling all segments to produce the complete undivided contingency key. After the contingency key is reassembled from the segments, it may be used to decrypt an encrypted archive. If any segment of the contingency key may not be used to reassemble the contingency key, the contingency key may not be used to decrypt an encrypted archive.

The following are steps a user may follow to create an archive encrypted using a segmented contingency key. First, the holder of a contingency key may set program options to identify that a contingency key is to be used when encrypting, and then the user may identify which key(s) is the contingency key. Next, the holder of a contingency key may set program options to specify that the contingency key is a segmented contingency key. Next, the holder of the contingency key may specify the number of segments the contingency key is to be divided into. Then, a second user that is not the holder of a master key may create a new archive. The second user may select files to be encrypted and specify a name and location for the new archive. The individuals or organizations that are authorized to decrypt the encrypted archive may be selected by the second user.

Key material may be generated using random data. A master encryption key may be derived by the compression/extraction engine 40 using the key material. A first session key for a first file to be encrypted may be derived using the master encryption key. Then, the first file may be encrypted using the first session key and the encrypted data for the first file may be placed into the archive. A second session key for a second file to be encrypted may be derived using the master encryption key. Then the second file may be encrypted using the second session key and the encrypted data for the second file may be placed into the archive. This procedure may be repeated to encrypt any number of files.

The public key for the first individual or organization that is authorized by the second user to decrypt the encrypted archive may be obtained from the certificate storage location. A copy of the key material may be encrypted using the encryption key of the first individual or organization authorized to decrypt the encrypted archive. The public key for the second individual or organization that is authorized by the second user to decrypt the encrypted archive may be obtained from the certificate storage location. A copy of the key material may be encrypted using the encryption key of the second individual or organization authorized to decrypt the encrypted archive.

A copy of the key material may be divided into a first segment and a second segment. The public key for a first contingency key holder authorized to decrypt the encrypted archive may be obtained from the certificate storage location. The first segment of the divided key material may be encrypted using the encryption key of the first contingency key holder authorized to decrypt the encrypted archive. The public key for a second contingency key holder authorized to decrypt the encrypted archive may be obtained from the certificate storage location. The second segment of the divided key material may be encrypted using the encryption key of the second contingency key holder authorized to decrypt the encrypted archive.

The encrypted key material of the first and second individuals or organizations authorized to decrypt the encrypted archive may be placed into the archive. The encrypted first segment of the key material may be placed into the archive. The encrypted second segment of the key material may be placed into the archive.

To decrypt an archive that is encrypted using a segmented contingency key, the following steps may be followed. The encrypted archive may be received by a holder of a first segment of a segmented contingency key and by a holder of a second segment of a segmented contingency key. The private key of the holder of the first segment of a segmented contingency key may be obtained from the certificate storage location. The first segment of the divided key material may be decrypted using the private key of the holder of the first segment of the contingency key. The private key of the holder of the second segment of a segmented contingency key may be obtained from the certificate storage location. The second segment of the divided key material may be decrypted using the private key of the holder of the second segment of the segmented contingency key.

The decrypted first segment of the divided key material and the decrypted second segment of the divided key material may be rejoined into the key material. The rejoined key material may be used to derive a master decryption key. A first session key for the first file to be decrypted may be derived using the master decryption key. Then the first file may be decrypted using the first session key. A second session key for the second file to be decrypted may be derived using the master decryption key. Then the second file may be decrypted using the second session key.

Password

An embodiment of the present invention also provides a method of using a password for encrypting data. A password is a user-defined key that is used to encrypt data. Only the person(s) in possession of the password may decrypt data that was encrypted using the password.

To create an archive that is encrypted using a password, the following steps may be followed. First, the files to be encrypted may be selected and a name and location for the new archive may be specified. A password may be provided by the user, for example. A password may be provided by the user by entering the password into a dialog, or by other methods, for example. Other methods of providing a password may exist as known to those skilled in the art.

Key material may be generated using random data and the password provided by the user. A master encryption key may be derived by the compression/extraction engine 40 using the key material. A first session key for a first file to be encrypted may be derived using the master encryption key. Then the first file may be encrypted using the first session key and the encrypted data for the first file may be placed into the archive. A second session key for a second file to be encrypted may be derived using the master encryption key. Then the second file may be encrypted using the second session key and the encrypted data for the second file may be placed into the archive. This procedure may be repeated to encrypt any number of files.

To decrypt an archive that is encrypted using a password, the following steps may be followed. First, an encrypted archive may be received by an individual or organization authorized to decrypt the file. The password that was used to encrypt the archive may be provided by the user. The password may be provided by the user by entering the password into a dialog, or by other methods, for example.

The password may be used to decrypt the encrypted key material. The decrypted key material may be used to derive a master decryption key. A first session key for the first file to be decrypted may be derived using the master decryption key. Then a first file may be decrypted using the first session key. A second session key for a second file to be decrypted may be derived using the master decryption key. Then the second file may be decrypted using the second session key. This procedure may be repeated to decrypt any number of encrypted files.

In an embodiment of the present invention, a password may be used in conjunction with a public key(s) for encryption. A password and/or public key(s) may be used to encrypt individual files in an archive and/or a central directory. A password may be used in conjunction with a private key(s) for decryption. A password and/or private key(s) may be used to decrypt individual files in an archive and/or a central directory.

Central Directory

The .ZIP format is described in an APPNOTE, which documents the records and fields that make up a .ZIP archive. A copy of the APPNOTE may be found at http://www.pkzip.com/company/standards/appnote/.

The .ZIP archive format defines a local header record and a central header record. There is one local header record and one central header record stored in a .ZIP archive for each file stored in the archive. The local and central header records store characteristics of each file in a .ZIP archive. These characteristics include file name, compression method, file creation date, original uncompressed file size, compressed file size and/or other characteristics. The central directory is the section of a .ZIP archive that is used to store the central header records.

When encrypting a file in a .ZIP archive in the method described above, the content of each file is encrypted. The characteristics in the local and central header records are not encrypted. An unencrypted file name or other characteristic may leave a user open to a man-in-the-middle attack. A man-in-the-middle attack is a type of attack where a person not authorized to access data in an encrypted .ZIP archive uses information gained through deception or through the exposure of unencrypted characteristics to decrypt an encrypted .ZIP archive. The present invention provides a method for increasing the security of a user's data by encrypting file characteristics. The characteristics that are encrypted include file name, uncompressed file size, compressed file size, compression method, file creation date, and other characteristics.

In an embodiment of the present invention, a user may encrypt the central directory of a .ZIP archive in the following manner. First, a user may encrypt each file as the file is stored into the .ZIP archive. As each file is placed into the .ZIP archive, a local header record for that file may be placed into the .ZIP archive. The characteristics in the local header that may be used in a man-in-the-middle attack may be set to random values or to zero. The characteristics in the local header record that are set to zero include the file name, original file size, compressed file size, and/or compression method. After each file and the local header record for each file is placed into the .ZIP archive, the central header records for each file may be placed into the central directory. Then the central directory may be encrypted. The central directory may be compressed before being encrypted.

Multiple Passwords

Password encryption methods typically use a single password to encrypt data. The password may then be shared between all individuals authorized to decrypt the data. There may be no individual identity that may be associated with a password, unless the password is known only to one individual. An embodiment of the present invention provides a method for creating an archive encrypted using multiple passwords. The method of this invention associates a unique password with each individual that is authorized to decrypt an encrypted archive that is to be shared by more than one person.

To create an archive that is encrypted using multiple passwords, the following steps may be followed. First, the files to be encrypted may be selected and a name and location for the new archive may be specified. The individuals or organizations that are authorized to decrypt the encrypted archive may be selected.

Key material may be generated using random data. A master encryption key may be derived by the compression/extraction engine 40 using the key material. A first session key for the first file to be encrypted may be derived using the master encryption key. Then the first file may be encrypted using the first session key and the encrypted data for the first file may be placed into the archive. A second session key for the second file to be encrypted may be derived using the master encryption key. Then the second file may be encrypted using the second session key and the encrypted data for the second file may be placed into the archive. This procedure may be repeated to encrypt any number of files.

The password for a first individual or organization that is authorized to decrypt the encrypted archive may be obtained from a password storage location. A copy of the key material may be encrypted using the password of the first individual or organization authorized to decrypt the encrypted archive. The password for a second individual or organization that is authorized to decrypt the encrypted archive may be obtained from a password storage location. A copy of the key material may be encrypted using the password of the second individual or organization authorized to decrypt the encrypted archive. The encrypted key material of the first and second individuals or organizations authorized to decrypt the encrypted archive may be placed into the archive.

To decrypt an archive that is encrypted using multiple passwords, the following steps may be followed. The encrypted archive may be received by an individual or organization authorized to decrypt the file. The password for the individual or organization may be obtained from the password storage location. The password may be used to decrypt the encrypted key material. The decrypted key material may be used to derive a master decryption key. A first session key for the first file to be decrypted may be derived using the master decryption key. Then the first file may be decrypted using the first session key. A second session key for the second file to be decrypted may be derived using the master decryption key. Then the second file may be decrypted using the second session key. This procedure may be repeated to decrypt any number of encrypted files.

Digital Signatures

Similar to the manner in which a public key may be used to encrypt data which may be decrypted using a specific private key, a private key may be used to encrypt data that may be decrypted using a specific public key. The method of encrypting data with a private key may be used in the digital signature process. A digital signature may be used to validate that a data object and/or file has not been altered since it was digitally signed. A digital signature may also verify the identity of a user that applied his/her digital signature to a file.

In an embodiment of the present invention, a digital signature may be applied to files as they are placed into an archive. A digital signature may be applied to the central directory of an archive as the central directory is created and/or modified. When files are extracted from the archive, the digital signatures the archive contains may be validated to ensure the contents of the archive have not been altered and/or to authenticate the identity of the user that created the archive.

In an embodiment of the present invention, the files and central directory of an archive may be digitally signed by more than one individual or organization. The application of additional digital signatures may be used to indicate that those individuals or organizations that digitally sign an archive have verified and accept the contents of the archive.

To create an archive that is digitally signed using multiple digital signatures, the following steps may be followed. First, the files to be digitally signed may be selected and a name and location for the new archive may be specified. The private key for the first individual or organization that is digitally signing the archive may be located from the certificate storage location. A cryptographic hash value may be calculated for the contents of the first file to be digitally signed. The cryptographic hash value may be encrypted using the first private key. The first file and the first encrypted hash value may be placed into the archive. A cryptographic hash value may be calculated for the contents of the second file to be digitally signed. The cryptographic hash value may be encrypted using the first private key. The second file and the second encrypted hash value may be placed into the archive. A file may also be compressed and/or encrypted before it is placed into an archive.

After each file and the local header record for each file are placed into the archive, the central header records for each file may be placed into the central directory. Then a cryptographic hash value may be calculated for the central directory. The cryptographic hash value of the central directory may be encrypted using the first private key. Then the central directory and the encrypted hash value of the central directory may be placed into the archive. The central directory may also be compressed and/or encrypted before it is placed into an archive.

The private key for the second individual or organization that is digitally signing the archive may be located from the certificate storage location. No changes to the first file, the second file, or the central directory of the archive may be made by the second individual. A cryptographic hash of the first file may be calculated and may then be encrypted using the private key of the second individual. A cryptographic hash of the second file may be calculated and then may be encrypted using the private key of the second individual. A cryptographic hash of the central directory may be calculated and may then be encrypted using the private key of the second individual. The encrypted hash value of the first file encrypted with the second private key, the encrypted hash value of the second file encrypted with the second private key, and the encrypted hash of the central directory encrypted with the second private key may be placed into the .ZIP archive.

Devices

As mentioned previously in the specification, embodiments of the present invention may be implemented in connection with various devices that run various operating systems. For example, in embodiments of the present invention, an encryption application may operate with a host application that runs on a personal computer, a Portable Digital Assistant (PDA), laptop, tablet computer, a mobile phone, digital watch, a portable music device, a gaming device, a portable storage device, a cable or satellite television receiver, an internet connected device, and/or a digital camera. It may be desirable to implement the components of the system 10 in connection with other devices that run host applications, as known to those skilled in the art.

An embodiment of the present invention provides for an encryption application operating with a host application that runs on a personal computer. A personal computer may provide a user with a laptop and/or a desktop workstation. Personal computers may operate using an operating system such as Windows, Mac OS, or Linux, for example. User applications available on a personal computer that may serve as host applications for an encryption application may include file managers, such as Microsoft Windows Explorer, internet browsers, such as Microsoft Internet Explorer, email programs, such as Microsoft Outlook, and/or other productivity applications, such as Word, Excel and AOL Instant Messenger, for example. Other host applications that run on personal computers may exist, as known to those skilled in the art.

An embodiment of the present invention provides for an encryption application operating with a host application that runs on a mobile device. A mobile device such as a tablet computer may provide a user with a portable office environment. A mobile device may operate using an operating system such as Android or Apple iOS, for example. User applications available on a mobile that may serve as host applications for an encryption application may include file managers, internet browsers, email programs and/or other productivity applications, for example. Other operating systems that run on mobile devices may be used.

An embodiment of the present invention provides for an encryption application operating with a host application that runs on a mobile phone. A mobile phone provides a user with a portable communications device. Mobile phones may operate using an operating system such as Apple iOS, Android, Windows Smartphone or Palm OS, for example. User applications available on a mobile phone that may serve as host applications for an encryption application may include file managers, internet browsers, email programs and/or other productivity applications, for example. Other host applications that run on mobile phones may exist, as known to those skilled in the art.

An embodiment of the present invention provides for an encryption application operating with a host application that runs on a portable music device. A portable music device provides a user with a portable entertainment and communications device. One example of a portable music device is an MP3 player. Another example of a portable music device is an Apple iPod. Portable music devices may operate using an operating system such as iPod OS or Linux, for example. User applications available on a portable music device that may serve as host applications for an encryption application may include file managers, internet browsers, email programs and/or other productivity applications, for example. Other host applications that run on portable music devices may exist, as known to those skilled in the art.

An embodiment of the present invention provides for an encryption application operating with a host application that runs on a gaming device. A gaming device provides a user with a portable entertainment device. One example of a gaming device is a Microsoft XBox. Gaming devices may operate using an operating system such as Microsoft Windows, for example. User applications available on a gaming device that may serve as host applications for an encryption application may include file managers, internet browsers, email programs and/or other productivity applications, for example. Other host applications that run on gaming devices may exist, as known to those skilled in the art.

An embodiment of the present invention provides for an encryption application operating with a host application that runs on a portable storage device. A portable storage device provides a user with a portable data storage and transfer device. One example of a portable storage device is a USB (Universal Serial Bus) Drive. Portable storage devices may interoperate with an operating system such as Microsoft Windows, Mac OS or Linux, for example. User applications available on a portable storage device that may serve as host applications for an encryption application may include file managers, internet browsers, email programs and/or other productivity applications, for example. Other host applications that run on portable storage devices may exist, as known to those skilled in the art.

An embodiment of the present invention provides for an encryption application operating with a host application that runs on a cable or satellite television receiver. A cable or satellite television receiver provides a user with an entertainment device. Cable or satellite television receivers may operate using an operating system such as Microsoft Windows, Linux or JAVA, for example. User applications available on a cable or satellite television receiver that may serve as host applications for an encryption application may include file managers, internet browsers, email programs and/or other productivity applications, for example. Other host applications that run on cable or satellite television receivers may exist, as known to those skilled in the art.

An embodiment of the present invention provides for an encryption application operating with a host application that runs on an internet connected device. An internet connected device provides a user with a function specific device. A function specific device may perform a specific function such as monitoring and controlling the operation of climate control equipment such as a furnace or air conditioner. Internet connected devices may operate using an operating system such as Microsoft Windows, Linux or JAVA, iOS or Android for example. User applications available on an internet connected device that may serve as host applications for an encryption application may include file managers, databases, log files, and/or other applications useful on the internet connected device, for example. Other encryption applications that run on internet connected devices may exist, as known to those skilled in the art.

An embodiment of the present invention provides for an encryption application operating with a host application that runs on a digital camera. A digital camera provides a user with a portable entertainment device. Digital cameras may provide the user with features similar to operating systems such as Microsoft Windows Smartphone or JAVA. User applications available on a digital camera that may serve as host applications for an encryption application may include file managers, internet browsers, email programs and/or other productivity applications, for example. Other host applications that run on digital cameras may exist, as known to those skilled in the art.

An embodiment of the present invention provides for an encryption application operating with a host application that read and/or write files and/or folders. Examples of host applications that read and/or write files and/or folders are word processing applications, such as Microsoft Word or OpenOffice, and database applications, such as Oracle and DB2, for example. Other host applications that read and/or write files and/or folders may exist, as known to those skilled in the art.

One embodiment of the present invention provides for an encryption application operating as a standalone application that encrypts and/or decrypts files and/or folders. Characteristics of standalone application are that it operates directly on an operating system on a computer. Provide input and output functions to read and write data to and from a memory on a computer. Provide user interface elements to a user to specify parameters for operation of the application. One example of a standalone encryption application that encrypts and decrypts files and folders is SecureZIP by PKWARE. A second example of an encryption application is Viivo by PKWARE. A third example of an encryption application is Smartcrypt by PKWARE. Other standalone encryption applications that encrypt and decrypt files and folders may exist, as known to those skilled in the art.

One embodiment of the present invention includes data encryption to protect information in files and folders on open and private networks. An example of an open network is one where computers connect to the public internet and may interact with any other computer in the cloud. An example of a private network is one where computers are connected to a defined set of computers on a network and connection to the public internet is not allowed, or may be restricted by network protection methods such as a firewall. The process of encrypting or decrypting data combines an encryption key with an encryption algorithm within an encryption application to perform the encryption or decryption of information. Encryption keys may be used for encryption operations of data encryption and of digital signing.

An encryption application may be hosted or standalone. A hosted encryption application operates within another application. An encryption application may run on any type of standard computing device such as a Personal Computer, tablet computer, mobile device or phone, server, or mainframe computer. Other computing devices may be used. Many types of encryption keys may be used within an encryption application to encrypt and decrypt information. One example of a type of encryption key used by the present invention is a password. Another example is a public/private key pair as may be part of an X.509 digital certificate, OpenPGP key pair or an elliptic curve key pair. A third example of an encryption key is a symmetric key such as a 128 bit or 256 bit key as may be used by symmetric encryption algorithms such as the Advanced Encryption Standard (AES). Other encryption algorithms may be used.

Encryption keys may be created on a computer using methods such as a Certificate Authority that issues keys to users and applications. Another method for creating an encryption key is to use a cryptographic strength key generation program such PKWARE Key Maker, GnuPG or OpenSSL. Encryption keys may be created on users computing device or on computer server. Other methods of key generation may be used.

Once an encryption key is created it may be stored using different methods. Storage of a key provides a location in a computer memory where the encryption key can placed when not in use and from which it can be retrieved when needed to encrypt or decrypt information for a user or application. Storing a key allows it to be easily reused when needed. Encryption keys may be one-time keys generated as needed. This type of key typically is not stored.

An encryption application obtains a copy of an encryption key to combine with an encryption algorithm to encrypt and decrypt information. A encryption keys may be included within an encryption application using a method known to those skilled in the art as a "hard-coded" key. This method is generally considered insecure and other methods for obtaining an encryption key are needed. An encryption key may be provided using command parameters to an encryption application. Other methods of providing an encryption key to application may be used.

An encryption key may be stored using different storage methods. These storage methods may include file storage (such as .PFX, .P7B, PID, SID), LDAP repositories, file and folder hierarchies, Microsoft Cryptographic API (CAPI), Microsoft Cryptography API Next Generation (CNG), IBM RACF, Computer Associates Top Secret/ACF2, Java Keystores (.JKS), OpenPGP keyrings, OpenPGP SKS-keyservers, Smart Cards, or USB Security Tokens.

An encryption key may be stored within a security appliance. A security appliance is a virtual or physical system providing for the secure storage of encryption keys. Security appliances are also commonly known as Hardware Security Modules (HSM). Characteristics of an HSM typically include a management UI to manage operation of the appliance. Storage to store keys and information about the users that may use the encryption keys. A network interface to access the HSM over network connections. Security methods to protect access to the encryption keys. Security methods may include both hardware and software methods to prevent tampering and unauthorized access to the HSM. Examples of security appliances for storing encryption keys include SafeNet Luna, SafeNet KeySecure, SafeNet DataSecure, Townsend Alliance Key Manager, Thales e-Security nShield, and Amazon CloudHSM. Other methods of storing an encryption key using a security appliance may be used.

An encryption application may use encryption keys stored using different encryption key storage methods. An encryption key of one type may be stored using different methods by different vendors of encryption key storage method solutions. An example is an OpenPGP key. An OpenPGP key from the provider Symantec is stored in a keyring file in a folder having the name PGP. An OpenPGP key from the open source software provider GnuPG is stored in a keyring file in a folder having the name gnupg. Another example is an X.509 public/private key pair may be stored for a user on a Windows operating system under the folder %APPDATA%\Microsoft\Crypto\RSA\User-SID\ or under the folder %APPDATA%\Microsoft\Crypto\Keys. User-SID is a Microsoft Windows value known as a Security ID. Encryption keys on Windows operating systems may also be stored in different locations.

An encryption application may encrypt and decrypt information using different types of encryption keys. An encryption application may encrypt and decrypt information to be accessed by more than one user or application that may create or consume this information in an unencrypted form. One example of an application that may consume information in an unencrypted for is a data extract application that receives data records from a database management system such as Microsoft SQL Server. The data extract application may provide the unencrypted data records to an encryption application to create encrypted information. The data extract application alternatively include may include encryption application software hosted within the data extract application that is used to create encrypted information directly.

Applications and users using encrypted information may possess more than one encryption key used for the encryption and decryption of information by an encryption application for the user or application to use. Applications and users using encrypted information may possess more than one type of encryption key used for the encryption and decryption of information by an encryption application for the user or application to use.

Collectively, all of the storage locations and storage methods from where an encryption key may be obtained for use within an encryption application can be referred to as Key Providers. Key Providers provide encryption key management. One characteristic of a Key Provider is that it provides a method for storing encryption keys in a memory on a computer. Another characteristic of a Key Provider is that it may provide a method to create an encryption key. Another characteristic of a Key Provider is that it may provide a method to destroy an encryption key making it unusable for further use in encryption and decryption operations. Another characteristic of a Key Provider is that it may provide a method to allow or deny access to an encryption key. Another characteristic of a Key Provider is that it may provide a method to receive keys from a user, an application or from another Key Provider. Another characteristic of a Key Provider is that it may provide a method to deliver an encryption key to a user, an application or to another Key Provider. Key Providers known in the art may include other characteristics. A Key Provider may not include all of these characteristics.

In one embodiment a Key Provider may create an encryption key using random data generated on a computer. Providing this random data to a key generator program to create a key. One example of a key generator program is OpenSSL. Other key generator programs may be used.

In one embodiment, a Key Provider may destroy an encryption key by deleting the file used to store the encryption key on a Key Provider. In another embodiment a Key Provider may remove an encryption key from a database in which it may be stored on a Key Provider.

In one embodiment, a Key Provider may provide a list of users to an owner of an encryption key. A list of users may be provided using a User Interface system. An owner of an encryption key may select users from the list that may use the encryption key thereby allowing access to the encryption key by the selected users. An owner of an encryption key may add other users to a list of users allowed to use an encryption key thereby changing the users allowed to use an encryption key. An owner may remove users from a list of users allowed to use an encryption key. An owner may remove a user from a list of users allowed to use an encryption key thereby denying a user access to use an encryption key. Other methods for allowing and denying access to an encryption key may be used.

A Key Provider may provide storage for more than one type of encryption key. A Key Provider may provide encryption keys for more than one user or application. A Key Provider may provide encryption keys for a group of users or applications. A group of users or applications may be called a team. A team may use the same key to encrypt and decrypt information. An encryption key for a group or team is called a team key. An encryption application may use encryption keys obtained from more than one Key Provider.

A Key Provider may operate on a physical computer hardware or on a virtual computing device. The physical or virtual computer may run one of a variety of operating systems including Microsoft Windows, Windows Server, Linux, IBM z/OS. Other operating systems may be used.

A Key Provider may use more than one method for making encryption keys available for use by encryption applications. One method for obtaining an encryption key is to open the file containing the key and reading the contents into an encryption application. Another method for obtaining and encryption key is to use the HTTP Key Server Protocol (HKP) for delivering an encryption key over the internet. An example for obtaining an encryption key using HKP is to issue a request for an encryption key by its Key ID using a command over HTTP such as http://keys.keyserver.com:11371/pks/lookup?op=get&search=0x1234ABCD.

Another method for obtaining an encryption key is to use the standard Lightweight Directory Access Protocol (LDAP) to obtain the encryption key from an LDAP repository such as Microsoft Active Directory. Another method for obtaining an encryption key for use by an encryption application is to use the OASIS standard Key Management Interface Protocol (KMIP). These methods provide published standard interfaces for obtaining an encryption key from a Key Provider. Other published standard methods may be used.

A Key Provider may use a proprietary method for obtaining an encryption key from a Key Provider. A proprietary method may be known only by the Key Provider and no published public standard may exist. An encryption application obtaining an encryption key from a proprietary Key Provider will be informed of the procedure for obtaining keys from that Key Providers key storage using instructions from the manufacturer of the Key Provider.

A Key Provider may operate from anywhere in relation to users, applications and encryption applications that may obtain keys from the Key Provider. In a preferred embodiment, a Key Provider may reside on a server located in the Cloud as is utilized by Cloud Computing. The Key Provider operates from a data center in the Cloud. Applications, users and encryption applications obtain encryption keys over an open internet connection. Alternatively, a Key Provider may be located on the same computing device on which an encryption application may run.

In a second embodiment, a Key Provider may reside in a data center located within an enterprise, or private network environment. This method may be called an on-premise. An on-premise Key Provider may also be called an isolated, or island-mode Key Provider. Applications, users and encryption applications may obtain encryption keys from an on-premise Key Provider over a private network connection maintained within the enterprise or private network environment.

In a third embodiment, users, applications and encryption applications may obtain encryption keys from both cloud and on-premise Key Providers. In a fourth embodiment, users, applications and encryption applications may obtain keys from a first on-premise Key Provider operating on a local private network and may obtain encryption keys from an second on-premise Key Provider operating on a different private network not accessible to the local private network of the users, applications and encryption applications obtaining encryption keys from the first on-premise Key Provider. In this embodiment, sharing, or brokering of keys may occur through a third Key Provider operating in the cloud which is able to exchange keys with both the first and second on-premise Key Providers. The third Key Provider may obtain an encryption key from the first Key Provider and provide it to the second Key Provider for use by users, applications and encryption applications obtaining encryption keys from the second Key Provider.

Use of a brokering Key Provider may occur automatically when an encryption or decryption operation requests a smartkey from a first Key Provider, but the first Key Provider is not managing the requested key because the smartkey is managed on a second Key Provider. A first Key Provider may store addresses in a table in a DBMS used to manage smartkeys on the first Key Provider. The address table may hold the internet path to a third Key Provider. A third Key Provider may store addresses in a table in a DBMS used to manage smartkeys on the third Key Provider. The address table may hold the internet path to a first Key Provider and a second Key Provider. The third Key Provider may also not manage the smartkey requested from a first Key Provider. The second Key Provider may mange the smartkey requested from a first Key Provider.

The first Key Provider reads through the smartkeys it manages. Unable to find the requested smartkey, it will automatically read the stored address table of other Key Providers it knows about because of the information in the DBMS. The table may include the address of a third Key Provider. The first Key Provider will automatically request the smartkey from a third Key Provider.

A third Key Provider may read through the smartkeys it manages. Unable to find the requested smartkey, it will automatically read the stored address table of other Key Providers it knows about because of the information in the DBMS. The table may include the address of a second Key Provider. The third Key Provider will automatically request the smartkey from a second Key Provider.

A second Key Provider may read through the smartkeys it manages. Finding the requested smartkey, it will automatically return the requested smartkey to the third Key Provider. Receiving the requested smartkey from a second Key Provider, the third Key Provider will return the requested smartkey to a first Key Provider. The action performed by the third Key Provider to request a smartkey from a second Key Provider on behalf of a first Key Provider and returning a smartkey from a second Key Provider to a first Key Provider a is brokering.

In another embodiment, a table of known Key Providers may alternatively be stored in a file. In another embodiment, a first Key Provider may broadcast it is operational. A second Key Provider may listen on the internet for a broadcast. Receiving a broadcast that a first Key Provider is operational, a second Key Provider may maintain a list of other Key Providers that have broadcast they are operational. In another embodiment, a URN for a Key Provider managing a smartkey may be stored with the PID URN or SID shash URN.

In one embodiment an encryption application may obtain encryption keys from a first Key Provider but may not obtain encryption keys directly from a second Key Provider. For example, the first and second Key Providers may be on separate networks that cannot connect to each or the first and second Key Providers may simply not allow connection requests from each other due to a lack of trust between the Key Providers networks. A third Key Provider that is able to communicate over a network to obtain encryption keys from both a first Key Provider and a second Key Provider may act as a broker of encryption keys between the first and second Key Providers allowing the first and second Key Providers to exchange keys indirectly through the third Key Provider. An encryption application using a first Key Provider may obtain an encryption key indirectly from the second Key Provider using the third Key Provider to broker obtaining the encryption key. The third Key Provider may obtain the encryption key from the second Key Provider transferred over the internet as a file. The file may be transferred over the internet using methods that include such as FTP, SFTP, or PSFTP. Other transfer methods may be used to transfer a file containing an encryption key including RCP, SCP, Dropbox and others.

The file format for delivering the encryption key file over the internet is Public Key Cryptography Standard number 7 (PKCS #7) which defines a standard format for holding a public key. After obtaining an encryption key from the second Key Provider as a PKCS #7 file, the third Key Provider provides the PKCS #7 file to the first Key Provider. The first Key Provider then is able to provide the encryption key to the encryption application for creating an encrypted information file. Other methods may be used to transfer encryption key files over the internet, Other file formats may be used for holding an encryption key including ASCII Armor, .JKS. OpenPGP keyring files, .CER. .DER, SID, PID, XPID, PKCS #12 and Privacy Enhanced Mail (PEM) and others.

A Key Provider may provide additional functions. One example is authentication of users and of applications using a method of login with a user ID and password assigned to a user by an administrator of the system. In another example a password may be defined by a user. Authentication may be performed by connecting over a network connection to an Active Directory server. Authentication may also include the use of multi-factor authentication methods. Other authentication methods may be used.

Key Provider Record (KPR)

Key Provider Record Layout (Byte Format):

ID—A sequence of bytes (example 2 bytes) marking that the bytes that follow are identified as a Key Provider Record (example marker value is 0x0022, other values may be used).

Record Size—A number represented by a sequence of bytes (example 2 bytes) storing the value in bytes of the remaining number of bytes in the Key Provider Record Provider Name Size—A number represented by a sequence of bytes (example 1 byte) storing the length in bytes of the name of the Key Provider (may be zero).

Key Provider—A sequence of bytes storing the name of the Key Provider. The number of bytes in this sequence matches to the value stored as the "Provider Name Size". An empty (zero bytes) Key Provider field may indicate use of a "default" known Key Provider. A known Key Provider is one that an encryption application is already informed on how to obtain encryption keys and that is used by default by the encryption application when an encryption key is needed.

Key Provider Data—A sequence of bytes storing the information for obtaining an encryption key from a Key Provider. Each Key Provider may store different information as Key Provider Data.

Key Provider Record (character format):

ID—A sequence of characters representing a record marker indicating the characters that follow are identified as a Key Provider Record. One example is the character '@'. Other character sequences may be used. More than one character may be used for an ID.

Key Provider—A sequence of characters storing the name of the Key Provider.

Separator (Sep)—A sequence of characters serving as a field separator that marks the separation between the fields of a Key Provider Record. One example is the character '='. Other character sequences may be used. More than one character may be used for a separator.

Key Provider Data—A sequence of characters storing the information for obtaining an encryption key from a Key Provider. Each Key Provider may store different information as Key Provider Data.

A Key Provider may provide an encryption key used by more than one encryption application. An encryption application may obtain encryption keys from more than one Key Providers. An encryption application may use an encryption key obtained indirectly by a user or other application that obtains an encryption key from a Key Provider and them provides the encryption key to the encryption application. An encryption application may obtain an encryption key directly from a Key Provider without receiving the encryption key from another user or application. A first encryption application may open encrypted information encrypted by a second encryption application.

One embodiment of the present invention includes a method to store information used by an encryption application for obtaining an encryption key from a Key Provider storing an encryption key needed to encrypt or decrypt information. Information needed to identify and access a Key Provider storing an encryption key will be stored in a Key Provider Record (KPR). A Key Provider Record will be used by an encryption application to locate and obtain an encryption key. Information needed to locate and obtain an encryption key may be different for one Key Provider than it is for another Key Provider.

Information in a Key Provider Record used to locate and obtain an encryption key from a Key Provider may include these attributes. An ID attribute identifying the information is a Key Provider Record. When this ID is encountered by an encryption application, it will inform the encryption application that the information that follows is information needed for locating and obtaining an encryption key from a Key Provider. An ID may take the form of a binary value. One example of a binary value that may be used as an ID is hexadecimal 0x0022. Other binary values may be used.

In one embodiment, an encryption application may obtain from a Key Provider Record a label identifying a private key located on an HSM. Using the label, an encryption application may make a request using KMIP that identifies the key requested and a password to be used by the Key Provider to encrypt the key before delivering it to the encryption application. This request is sent to the Key Provider using HTTPS over an internet connection. The Key Provider receiving this request retrieves the private key located in storage of the Key Provider. The Key Provider places the encryption key into a file formatted using Public Key Cryptography Standard 12 (PKCS #12). PKCS #12 is an encrypted file format. The password received from the encryption application is used in the encryption process for creating the PKCS #12 file. Receiving the PKCS #12 file over HTTPS from the Key Provider, the encryption application may decrypt the PKCS #12 file to obtain the encryption key.

In another embodiment Key Provider Record information may be represented using the ASCII character set. When an ASCII character set is used, the ID may take the form of a character value such as '@'. Other character values may be used. Other character sets may be used such as UTF-8. An ID may not always be used as other methods may be used by an encryption application to identify that a set of attributes are a Key Provider Record.

A binary format Key Provider Record may preferably be used for storing Key Provider information within encrypted information files that are themselves composed predominately of binary data. A character format Key Provider Record may preferably be used within encrypted information files having storage capabilities for ASCII data. An encrypted information file may include a binary format Key Provider Record and a character format Key Provider Record.

The information within a Key Provider Record may include a size attribute. A size attribute may be represented using two byte binary value holding the size of the remaining attribute information in the Key Provider Record. A size attribute can be used to assist with processing other attributes within the record. A size attribute may not always be used as other methods may be used to determine the size of the Key Provider Record information.

A Key Provider Record may include an attribute holding a name used to identify a Key Provider. A Key Provider may be identified using a manufacturer name, a location, or other identifying information about a Key Provider. The attributes of the Key Provider record identify the characteristics needed to obtain an encryption key from the named Key Provider. An example of a Key Provider Name used within a Key Provider Record is the value "safenet". A Key Provider Record named for the Key Provider "safenet" for example would be used by an encryption application to obtain encryption keys from a SafeNet HSM. A Key Provider name attribute may not always be used as other methods may be used to identify a Key Provider.

A Key Provider Record may include a Key Provider Name Size attribute. A Key Provider Name Size attribute should include as its value the length of the name placed into the Key Provider Name attribute. For example, Key Provider Name Size of 7 is stored when a Key Provider Name attribute is set to "safenet". A Key Provider Name Size may be zero, indicating a Key Provider Name attribute is not present in a Key Provider Record. A Key Provider Name Size value may not always be present in a Key Provider Record. For example, A Key Provider Record stored using ASCII character representation may include a Key Provider Name preceded in the Key Provider Record by an ID value of '@' and followed by a Separator value of '='. In this case the Key Provider Name can be determined using the '@' and '=' attributes as field delimiters.

A Key Provider Record may include an attribute representing Key Provider Data. A Key Provider Data attribute holds information used when obtaining an encryption key from a Key Provider. Information stored within a Key Provider Data attribute that is used for obtaining an encryption key from one Key Provider may be different than the information stored in a Key Provider Data attribute for another Key Provider. For example the Key Provider Data attribute for one Key Provider may store only the information of an encryption key name. A second Key Provider may use a Key Provider Data attribute storing values for all of the attributes presently defined.

Information stored within a Key Provider Data attribute may include the following information. The type of key representing an ID for the type of key to obtain from the Key Provider. The name of the encryption key to be obtained from the Key Provider. The name of a key encryption key used to protect the encryption key used to encrypt information. The types of keys the Key Provider may provide if more than one type of key may be obtained from a Key Provider. Encrypted key information that holds an encrypted copy of an encryption key used to encrypt information. The name of the owner of the encryption key. Signature information used to verify the authenticity of the encryption key. Signature information used to verify the authenticity of the Key Provider Data information. Connection information that may include a URL, IP address or other information to identify where to find a Key Provider and how to connect to it. Alternate connection information may be included to provide an alternate method for obtaining encryption keys should a primary connection be unavailable. An example of alternate connection information may include but is not limited to a URL, an IP address or the name of another Key Provider. Connection type information that may define available connection protocols that can be used to communicate with the Key Provider such as HTTP, HTTPS, TLS and others. Secure connection key information used to authenticate or encrypt a secure communication connection to a Key Provider. An example of a secure connection key is an SSL certificate used to establish an SSL connection across a network interface. Contact information may hold information identifying the Key Provider and how to contact them to resolve problems obtaining encryption keys. Contact information for a Key Provider may include an email address, telephone number, a website URL, a building address or other information for contacting a Key Provider. Expiration information including a time period during which a Key Provider Record is valid for use. Restriction information may also be present to restrict access by domain, region, or other characteristics that may be used to define restricted use of an encryption key. A public key belonging to a public/private key pair. Other information about a Key Provider may be included in a Key Provider Data attribute.

In one embodiment an example of a key encrypting key is a password. A password may be provided by a user to an encryption application. An encryption key used for encrypting or decrypting encrypted information may be provided by a Key Provider using this password. An encrypted encryption key may be placed into a Key Provider Data. Another example of a key encryption key is a public key. Other types of encryption keys may be used for a key encryption key.

Key Provider Data information may include information for more than one encryption key that may be obtained from a Key Provider. For example, an encrypted information file may be encrypted for more than one recipient. Each recipient may hold a different key used for accessing the encrypted information. Both recipients' encryption keys may be obtained from the same Key Provider. Key Provider Data may reside for both recipients encryption keys in the same Key Provider Record.

Key Provider Data included within a Key Provider Record may be stored in one or more formats. For example, the Key Provider Data for a Key Provider Record may be stored as character delimited text data. Delimiters may be common separators such as a comma ',' or a semicolon ':' character. Other types of separators may be used. Key Provider Data may be stored using the W3C Extensible Markup Language (XML) format. In the preferred embodiment, Key Provider Data may be stored using Java Script Object Notation Data Interchange Format (JSON) as is described in the Internet and Engineering Task Force (IETF) RFC7159.

An encrypted information file may be encrypted using more than one encryption key. A Key Provider Record may be present in an encrypted information file for each encryption key used to encrypt the encrypted information file.

In a preferred embodiment, the Key Provider Record will be stored within the encrypted information file. The Key Provider Record may be stored encrypted, or unencrypted. Storing the Key Provider Record within the encrypted information file will make it available to any encryption application that may be used for accessing encrypted information.

A preferred embodiment of the present invention includes a method by which a Key Provider Record as defined by the present invention may be stored within an encrypted information file that is in the .ZIP file format. The .ZIP file format is a well-known file format published by the assignee of the present invention. Information placed into a .ZIP file may be compressed, encrypted, or both compressed and encrypted. Other capabilities of the .ZIP file format may be used. The specification for the .ZIP encrypted file format commonly referred to as APPNOTE.TXT—.ZIP File Format Specification version 6.3.4 and is available on the internet at https://pkware.cachefly.net/webdocs/APPNOTE/APP-NOTE-6.3.4.TXT. The Key Provider Record of one embodiment of the present invention may be used with .ZIP files created using any version of the .ZIP format specification.

A .ZIP file is a file containing records and fields used to store files and folders. A .ZIP format file includes a local header record used to store information about each file and folder placed into a .ZIP file. A local header record precedes each file and folder placed into a .ZIP file. A .ZIP format file includes a central directory record replicates the information stored in each local header. One central directory record exists for each file and folder placed into a .ZIP file. A central directory record includes additional information about each file that is not contained in a local header record.

The last record of a .ZIP file is called the end of central directory record. This record as is described in APPNOTE.TXT defines information about the .ZIP file and includes information to locate the first central directory record. Central directory records are in turn used to locate local header records which are then used to locate files or folders contained in a .ZIP file. Other records as defined in the PKWARE APPNOTE.TXT specification may also exist in a .ZIP file.

In one embodiment the present invention includes a method for an encryption application that can write encrypted information to a file in the .ZIP format to write a Key Provider Record for each file encrypted into the .ZIP file. In the preferred embodiment, a Key Provider Record may be written to the local header for each file and folder. More than one Key Provider Record may be written to the local header for each file and folder. A Key Provider Record may be written to the central directory header for each file and folder. More than one Key Provider Record may be written to the central directory header for each file and folder. A Key Provider Record may be written for each encryption key used to encrypt a file. In another embodiment, one Key Provider Record may be written. The one Key Provider Record may contain the Key Provider information for each encryption key used to encrypt a file.

An encryption application may create an encrypted information file in the .ZIP format using the following procedure. The names and locations of the files or folders to encrypt are received by an encryption application through standard methods. These methods include providing parameters for each file name, providing a file list, drag-and-drop, or selection from a file selection dialog. Other methods of providing file names to an application may be used.

The recipients that will be able to access the encrypted information file are provided to an encryption application through standard methods. These methods include providing parameters for each recipient, providing a list of recipients as a file, drag-and-drop, or selection from a recipient list dialog. Other methods of providing recipients to an application may be used. A recipient is a user, a group of users, an application, or a group of applications that will be able to open the encrypted information file using an encryption key.

Additional parameters may be provided to an encryption application. These additional parameters may define input sources and output destinations for where an encryption application may store and retrieve information. Additional parameters may include information on encryption algorithms, key providers or other settings needed for creating an encrypted information file.

After receiving the information needed to create an encrypted information file, an encryption application may encrypt the files and folders to be placed into the encrypted information file. The encryption application will encrypt the information in the files or folders by creating an encrypted copy of the files or folders in the memory of a computing device. The encryption processing will occur using the method used for the type of encryption specified by the parameters provided to the encryption application. Encryption processing using common encryption algorithms such as AES is known and will not be described in detail herein. Encryption processing for other encryption algorithms may be used.

Encryption processing for creating an encrypted information file uses encryption keys allowing each recipient to decrypt the encrypted information file. More than one key may be used for encryption processing. Encryption keys are obtained from Key Providers using one or more of the methods described above for obtaining an encryption key.

For each Key Provider where an encryption key has been obtained, a Key Provider Record is created in a memory on a computing device. A Key Provider Record may be created using these steps. Other steps may be apparent for creating a Key Provider record.

In one embodiment a marker value of 0x0022 is stored into a memory storage location on a computing device. An example of another marker value that may be used is 0x0023. Another example of another marker value is 0xA1B1. Other values for marker values may be used.

A size value for the remaining length of the Key Provider Record is stored into a memory location after the marker value. A size of the name representing a Key Provider for the first encryption key is stored into a memory location after the size value for the remaining length of the Key Provider Record. The name of the Key Provider is stored into a memory location after the size value of the Key Provider Name size. Finally, the Key Provider data for the first encryption key is stored into a memory location after the Key Provider Name. The steps for creating Key Provider Data are discussed below.

The above steps may be repeated for each encryption key used in the encryption processing. In one embodiment, the Key Provider Record information for a second encryption key is stored in a memory storage location. A memory storage location for the Key Provider Record information for a second encryption key may be stored following a memory location for storing a first Key Provider Record information for a first encryption key. In another embodiment a first Key Provider Record information for a first encryption key may be stored in a memory location following a memory location for storing a second Key Provider Record information for a second encryption key. A first Key Provider Record information and second Key Provider Record information may be stored in memory in any order and in any location with relation to each other.

In one embodiment, to create the encrypted information file, the encryption application stores the Local Header information for the first file in accordance with the .ZIP file format specification. The Local Header information for the first file is stored in the memory storage location on a computing device identified by the output storage location provided to the encryption application. This output storage location can be referred to as the output file. The extra field length value for the Local Header information for the first file is adjusted to include the combined size in bytes of each of the Key Provider Records created for the first file. The Key Provider Records created for each encryption key are copied from their stored memory location to the output file. Next the remaining information including the encrypted information for the first file is placed into the output in accordance with the .ZIP file format specification.

The above steps performed may be repeated for each additional file or folder to be placed into the output file. Next, the extra field length value in the central directory header record for the first file is updated to include the combined size of each Key Provider Record for the first file. The central directory header record for first file is then placed into the output file. Each Key Provider Record stored in memory for the first file is placed into the output file. These steps may be repeated for each additional file or folder placed into the output file.

Other records may then be placed into the output file in accordance with the .ZIP file format. Then the end of central directory record is placed into the output file in accordance with the .ZIP file format.

An additional embodiment includes encrypting the central directory records before being placed into the output file. If the central directory is encrypted before being placed into the output file, the file name value in the local header for each file or folder is obscured to hide its true value. A method for obscuring a file name is to replace the characters stored for a file name with random hexadecimal values. Hiding the true name of a file provides a security benefit that can be referred to a file name encryption. Additional fields in the local header may be obscured such as size or method of compression. Other methods of obscuring information in the local header may be used.

If the central directory is encrypted, the steps for the placing of the end of central directory into the output file may be modified as follows. First a Key Provider Record is created for each of the encryption keys used to encrypt the central directory. The Key Provider Record is created as a character format record.

To create a character format Key Provider Record first, the marker character '@' is stored in a memory location on a computing device. Next, the name for the Key Provider is placed into a memory location after the marker. Next a separator value of '=' is placed into a memory location after the Key Provider name. Next the Key Provider Data is place into a memory location after the separator. The steps for creating Key Provider Data are discussed below. These steps may be repeated for each additional encryption key used for encrypting the central directory information.

The size value in the end of central directory .ZIP file comment length field is revised to include the combined size in bytes of the Key Provider Records holding information for obtaining each of the encryption keys used for encrypting the central directory information. The end of central directory information is placed into the output file. Then the Key Provider records are copied from memory to the output file.

In another embodiment, a Key Provider Record may be placed only in the end of central directory record of the output file. In this embodiment, a Key Provider Record is not placed into a local header of the output file. A Key Provider Record is not placed into a central directory header record of the output file. A central directory is not encrypted. Encryption keys obtained using Key Provider Data stored only within the end of central directory record may be used to encrypt all encrypted information in the output file. In another embodiment, encryption keys obtained using Key Provider Data stored only within the end of central directory record may be used to encrypt one or more encrypted information file or folder in the output file. In another embodiment, more than one Key Provider Record may be placed into an end of central directory record of the output file. In another embodiment a Key Provider Record may be stored in a Local Header only. In another embodiment a Key Provider Record may be store in a Central Directory Header. In another embodiment a Key Provider Record may be stored in a Local Header and in an end of central directory record. In another embodiment a Key Provider Record may be stored in a Central Directory Header and in an end of central directory record. In another embodiment a Key Provider Record may be stored in a Local Header and in a file in an encrypted information file. In another embodiment a Key Provider Record may be stored in a Central Directory Header and in a file in an encrypted information file. In another embodiment an Key Provider Record may be stored in an end of central directory record and in a file in an encrypted information file. In another embodiment a Key Provider Record may be stored in a Local Header, a Central Directory Header, an end of central directory record and in a file in an encrypted information file. In another embodiment a Key Provider Record may be stored in another location in an encrypted information file.

In another embodiment, a Key Provider Record may be stored as a file within the output file. In this embodiment, the file containing the Key Provider Record information preferably is the first file in the output file. Key Provider Records are not placed into the Local Header, Central Directory Header, or the End of Central Directory records of the output file.

In another embodiment, a Key Provider Record may be stored within a separate file different than the output file that contains the encrypted information. In this embodiment the Key Provider Record information is not placed into the output file that contains the encrypted information. The format of this file may use different formats. For example, the Key Provider Record information may be stored as text with comma's, semicolons, or a line separator (an example is a linefeed character of \n) separating the attributes. Other examples of a format of this file include Java Script Object Notation (JSON) or XML. Other formats for this file may be used.

A Key Provider Record may be used when opening an encrypted information file. The steps an encryption application may perform to decrypt an encrypted file that is stored within an encrypted information file using an encryption key obtained using a Key Provider Record include the following.

Using methods for reading information from a file in the .ZIP format, locate the local header record for the file to be decrypted. Locate the bytes of the marker value for the Key Provider Record. If the bytes containing the value 0x0022 are located, then locate the bytes of the remaining record size. Place the sequence of bytes matching to the remaining record size into a computer memory. Using the sequence of bytes placed into a computer memory locate the byte containing the size of the Key Provider Name. Using the size of the Key Provider Name, locate the name of the Key Provider. Using the remaining sequence of bytes that follow the Key Provider name, locate the Key Provider Data. Using the Key Provider Data information, obtain the encryption key from the Key Provider. Using the encryption key obtained from the Key Provider, decrypt the encrypted file.

In another embodiment, locate the central directory header record for the file to be decrypted. Locate the bytes of the marker value for the Key Provider Record. If the bytes containing the value 0x0022 are located, then locate the bytes of the remaining record size. Place the sequence of bytes matching to the remaining record size into a computer memory. Using the sequence of bytes placed into a computer memory locate the byte containing the size of the Key Provider Name. Using the size of the Key Provider Name, locate the name of the Key Provider. Using the remaining sequence of bytes that follow the Key Provider name, locate the Key Provider Data. Using the Key Provider Data information, obtain the encryption key from the Key Provider. Using the encryption key obtained from the Key Provider, decrypt the encrypted file.

In another embodiment, locate the end of central directory header record. Locate the character marker value for the Key Provider Record. If the character marker '@' for the Key Provider Record is located, then locate the separator character '='. If the separator character is located then locate the Key Provider Name using the sequence of characters between the marker character and the separator character. Using the remaining sequence of characters that follow the separator character, locate the Key Provider Data. Using the Key Provider Data information, obtain the encryption key from the Key Provider. Using the encryption key obtained from the Key Provider, decrypt the encrypted files in the encrypted information file.

In another embodiment, locate the central directory header record for the file containing the Key Provider Record. Using the central directory header record locate the starting location for the local header record for the file containing the Key Provider Record. Using the local header record locate the starting location for the Key Provider Record information file. Place the Key Provider Data from the Key Provider Record information file into a memory location on a computer. Using the Key Provider Data information, obtain the encryption key from the Key Provider. Using the encryption key obtained from the Key Provider, decrypt the encrypted files in the encrypted information file.

Key Provider Data

Key Provider Data as included in in one embodiment of the present invention may be used to inform a user, an application, or an encryption application about an encryption key used with encrypted data. Key Provider Data can inform of what encryption key is used, from where the encryption key may be obtained, and how it may be obtained. Key Provider Data can inform of other aspects of encryption keys. One Key Provider may use different Key Provider Data than is used by another Key Provider.

In one embodiment of the present invention a Key Provider Record may include a Key Provider Data holding only minimal information. One example with minimal information is a Key Provider Record holding the information in character format of @safetnet=aeskey. In this example a Key Provider Record includes an initial marker '@' indicating a Key Provider Record. Following this marker is a provider name (safenet) identifying a Key Provider where an encryption key may be obtained. Following a provider name is a separator '='. Following a separator is a Key Provider Data with minimal information (aeskey). A Key Provider Data with minimal information may be used when an encryption application may be programmed to obtain keys from a Key Provider that uses only a name of an encryption key.

In another embodiment of the present invention, A Key Provider Record may include Key Provider Data information made up of {name:value} pairs. In this example "name" stores a type of information for a Key Provider. Value stores the value for this information type. A value may include one or more elements forming an array of elements stored in the Key Provider Data information.

One example of information about a Key Provider that may be stored in Key Provider Data is {assets:elements}. The name "assets" identifies the type of information stored in a Key Provider Data attribute for a Key Provider. The value "elements" identifies the values for an asset. An asset for a Key Provider may define characteristics of a type of encryption key stored by the Key Provider. One example of an asset is a "smartkey". A Key Provider may store more than one type of encryption key and may use other names to identify Key Provider Data for other types of encryption keys. A different Key Provider may not recognize a type of "assets". A value for an asset may include an element or an array of elements that describe the information for obtaining an asset encryption key from a Key Provider.

One example of an element value for an asset for a Key Provider Data is information including a key encrypting key ID, a version indicator for the element and an encrypted encryption key. A key encrypting key ID identifies an encryption key searchable within the stored data of a Key Provider. A key encrypting key ID may include a name assigned by the owner of an asset. A key encrypting key ID may include a Uniform Resource Name (URN) assigned by the Key Provider. Version identifies a version of an asset or an element. Other versions of assets may be made up of other information values. An encrypted encryption key is an encrypted copy of an encryption key that may be decrypted after obtaining a copy of the key identified by the key encrypting key ID. After decrypting the encrypted encryption key using the key encrypting key, the encryption application may use the decrypted copy of the encrypted encryption key to decrypt the encrypted information file. Other elements may be included for an asset.

Another example of information about a Key Provider that may be stored in Key Provider Data is {owner:ownername}. The name "owner" identifies information about the owner of an encryption key. The value for an "owner" identifies a user that may allow or deny use of an encryption key by other users or applications. The value for an "owner" may be stored in any form defined by a Key Provider. One example of an Owner value is "pUmHz6HxCW9xUSIyEJOu3PQ4JIk=". The Owner value describes for a Key Provider information on an encryption key owner searchable within the data of a Key Provider as in index for locating an encryption key. Owner information may be stored in a number of forms including as text, as an email address such as bob.smith@xyz.com, a URN, or as an encoded format such as a message digest resulting from a hash algorithm operation on the owner name.

In another embodiment of the present invention, a Key Provider Record may be used with other encrypted file formats that may benefit from a Key Provider Record providing information for locating an encryption key from a Key Provider. Examples of other encryption formats include Adobe Portable Document Format (.PDF), OpenPGP (.pgp, .gpg), Secure/Multipurpose Internet Mail Extensions (S/MIME), Voltage SecureFile (.vsf), SAP Crystal Reports Encrypted Report File (.rpz), ZixCorp Encrypted File (.zix), Box encrypted files (.box), nCrypted Cloud Secure Container files, WinRAR files (.rar), 7z files (.7z) and, ARJ files (.arj). Other encrypted formats may be used.

In another embodiment, the Key Provider Record may be stored in a file different from the encrypted information file. In this embodiment the information for the Key Provider Record may be written to a separate file in the memory of a computing device. An encryption application uses the information in the separate file to obtain from a Key Provider an encryption key used to access data in an encrypted information file. Other methods for storing Key Provider Record information may be used.

Smartkey Encryption

Another embodiment of the present invention includes an encryption key concept that combines information about encryption recipients, key encryption keys, Key Provider storage and encryption keys into a smartkey. A smartkey removes from encryption processing the difficulties of selecting recipients, identifying their encryption keys, exchanging encryption keys for performing encryption operations, and managing encryption keys.

Smartkey encryption uses an encryption application able to create encrypted information files according to the .ZIP format and which can create and store a Key Provider Record into the encrypted information file and a Key Provider for storing smartkeys. A smartkey encryption application connects to a Key Provider to obtain smartkeys. Connection may occur over a public or private network connection.

A Key Provider for smartkey encryption keys may operate as an island within a private network. A Key Provider for smartkey encryption keys may operate as a satellite within a network. A satellite Key Provider provides smartkeys for users within the network accessible to the Key Provider and may also exchange smartkeys with a cloud Key Provider. A Key Provider for smartkey encryption keys may operate in the cloud. A cloud Key Provider may share, or broker smartkeys between smartkey Key Providers that may not be on the same network.

A user or application using smartkey encryption first authenticates to a smartkey Key Provider. Authentication may occur using standard methods of user authentication, including using a loginID and password, Active Directory authentication, or multi-factor authentication. Other authentication methods may be used including OAuth, OpenID, Single-Sign-On, IPSec, Smart Card, PAM, OpenPAM, LinuxPAM, access tokens. Other methods may be used.

The first time a user uses smartkey encryption, a public/private key pair is created. This key pair may be created within a smartkey encryption application running on the user's computer or on the Key Provider where the user has been authenticated. The private key will be stored using encryption. Key pair information may be stored using methods including PID, SID, XPID and other methods for storing key information.

Private key encryption may use an encryption key that is received from the user as a password. Private key encryption may use an encryption key that is received from a smartkey Key Provider. In another embodiment private key encryption may use an encryption key that is random data generated on a computer. Other encryption keys may be used to encrypt the private key.

In one embodiment, private key encryption may occur by receiving a private key from a key generation program on a computer. Receiving a password from a user. Combining the private key and password using an encryption algorithm to create an encrypted private key. An encrypted private key may be created in the format of PKCS #12.

Information about users authenticated to a smartkey Key Provider is stored in computer memory on a smartkey Key Provider. Storage may be performed using methods including file storage, file and folder hierarchies within a file system, or within a structured database management system (DBMS) on the smartkey Key Provider, Other storage methods may be used.

Information stored on a smartkey Key Provider includes user identities, recipients, key pairs of user's, key pairs of smartkey Key Provider administrators, teams, groups and other information. This smartkey Key Provider information may be called assets.

Assets may have owners. An owner is a smartkey user that creates an asset. An owner may name an asset with a label that helps the owner and other users that may use the asset to identify it. An owner may allow or deny other smartkey user's access to an asset.

In one embodiment, a Key Provider may provide a list of users to an owner of an asset. A list of users may be provided using a User Interface system. An owner of an asset may select users from the list that may use the asset thereby allowing access to the asset by the selected users. An owner of an asset may add other users to a list of users allowed to use an thereby changing the users allowed to use an asset. After a user is selected to add, a local copy of a smartkey for an asset may be copied to the system of the added user. The identity of the added user is stored with the asset information maintained on a Key Provider. An owner may remove users from a list of users allowed to use an asset. An owner may remove a user from a list of users allowed to use an asset thereby denying a user access to use an asset. After a user is selected to be removed, a local copy of a smartkey for an asset may be removed from the system of the removed user. The identity of the removed user is removed from stored asset information maintained on a Key Provider. Other methods for allowing and denying access to an asset may be used.

A user with access to an asset may create encrypted information files for any users allowed access to an asset. Access to an asset provides a user access to an encryption key needed to decrypt encrypted information. Access to an asset may change over time by changing the users allowed to access an asset. Changing access to an asset over time is performed using allow or deny operations as discussed above. A user that can access an asset at one point in time may be denied access to that asset at another point in time. At a point in time when access to an asset is denied for a user, the user cannot access encrypted information encrypted using the asset. When access to an asset is allowed, a user may use the asset when using an encryption application for creating encrypted information for the user and for other users allowed access to the asset.

Asset information may be stored within an encrypted information file using a Key Provider Record. A smartkey encryption application used by a user to access information in an encrypted information file reads the Key Provider Record to access the Key Provider Data. Using the information in the Key Provider Data to obtain the key encryption key ID. Using the key encryption key ID, the smartkey encryption application will communicate with the smartkey Key Provider to obtain the key encryption key.

Communication with a smartkey Key Provider may use an SSL or TLS connection over a network interface to transfer a key encryption key. A key encryption key may be transferred using an SSL or TLS connection to transfer a file containing the key encryption key using a transfer method such as FTP, SFTP, or PSFTP. Other transfer methods may be used to transfer a file containing a key encryption key including RCP, SCP, Dropbox and others.

The file containing the key encryption key may be formatted using Public Key Cryptography Standard 12 (PKCS #12). In another embodiment, the file containing the key encryption key may be formatted using Public Key Cryptography Standard 7 (PKCS #7). Other formats may be used for containing a key encryption key including ASCII Armor, .JKS, OpenPGP keyring files, .CER, .DER, SID, PID, XPID. Privacy Enhanced Mail (PEM) and others.

The private key of the key encrypting key is obtained to decrypt the encrypted encryption key. Decryption of the encrypted encryption key may be performed by the user smartkey encryption application, or by the smartkey Key Provider. After the encrypted encryption key is decrypted, it is used by the smartkey encryption application to decrypt an encrypted information file.

An encrypted encryption key may decrypt to any encryption key type. One example of a decrypted encrypted encryption key is a password. A password may be defined by a user created an encrypted information file. A password may be defined by a smartkey encryption application using a secure random number generator. Another example is a private key as may be found in an X.509 or OpenPGP key pair.

A smartkey encryption application may be used to encrypt information for individual users or for groups of users. Information encrypted for a group may be encrypted using a password. The password is encrypted once using the public key for each member of the group forming one encrypted encryption key for each group member. Each encrypted encryption key is stored using a Key Provider Data within a Key Provider Record.

In another embodiment, a smartkey encryption application may be used to encrypt and decrypt information for a group using a password. The password is encrypted once using a public key for the group forming one encrypted encryption key for the group. The one encrypted encryption key is stored using a Key Provider Data within a Key Provider Record. Each user allowed access to the private key may decrypt the encrypted information key and then use the decrypted private key to decrypt the encrypted information. Access to the private key of the group may be configured for a user on the smartkey Key Provider.

In another embodiment, a private key is encrypted to form an encrypted encryption key. Each user allowed access to the private key may decrypt the encrypted information key and then use the decrypted private key to decrypt the encrypted information. Access to the private key may be configured for a user on the smartkey Key Provider.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A smartkey-based computer file access system, said system including:
   a user computer system operating a smartkey encryption/decryption application, wherein said smartkey encryption/decryption application receives:
   a smartkey team name data for a team;
   a first user password data; wherein said first user is a member of said team
   a second user password data; wherein said second user is a member of said team
   a team public key data; and
   a team private key data,
   wherein said smartkey encryption/decryption application forms a smartkey electronic data structure including:
   said smartkey team name data in unencrypted form;
   a team encrypted master key data, wherein said team encrypted master key data is formed by said smartkey encryption/decryption application by determining a master key data derived from random data and encrypting said master key using said team public key data;
   a first user password-accessible team encrypted master key data comprising:
   said team public key data; and
   said team private key data, encrypted by said first user password to form a first user encrypted team key data; and
   a second user password-accessible team encrypted master key data comprising:
   said team public key data; and
   said team private key data, encrypted by said second user password to form a second user encrypted team key data,
   wherein said smartkey encryption/decryption application receives an electronic data file,
   wherein said smartkey encryption/decryption application forms a session key associated with said electronic data file and encrypts said data file to form an encrypted data file using said session key,
   wherein said smartkey encryption/decryption application encrypts said session key using said team encrypted master key data and stores the result as a team encrypted session key data in said smartkey electronic data structure; and
   a smartkey provider computer system, wherein said smartkey encryption/decryption application initiates the transmission of said smartkey electronic data structure from said user computer system to said smartkey computer provider system,
   wherein said smartkey electronic data structure is stored at said smartkey computer provider system and a second user computer system operating an instance of said smartkey encryption/decryption application, wherein said second user computer system receives:
   a target smartkey team name data;
   said encrypted data file; and
   a user password data representing a user to be allowed to decrypt said encrypted data file, wherein said user is a member of said team,
   wherein said second computer system transmits said target smartkey team name data to said smartkey provider system,
   wherein said smartkey provider system searches a plurality of stored smartkey electronic data structures, identifies a smartkey electronic data structure including smartkey team name data matching said target smartkey team name data, and transmits said smartkey data structure to said second computer system,
   wherein said second computer system uses said user password data to decrypt said user password-accessible encrypted team key data to obtain said team private key data,
   wherein said second computer system uses said team private key data to decrypt said team encrypted master key data to obtain said master key data,
   wherein said second computer system uses said master key data to decrypt said team encrypted session key data to obtain said session key data, and
   wherein said second computer system uses said session data to decrypt said encrypted data.

2. The system of claim 1 wherein a plurality of data files are encrypted using a plurality of different session keys and said plurality of different session keys are stored in the smartkey electronic data structure.

3. The system of claim 2 wherein the smartkey electronic data structure stores said plurality of session keys in a plurality of session key locations inside said smartkey electronic data structure, wherein each session key location is associated with a specific one of said plurality of data files.

* * * * *